United States Patent [19]

Ra et al.

[11] Patent Number: 5,484,349

[45] Date of Patent: Jan. 16, 1996

[54] STEPLESS AUTOMATIC VARIABLE TRANSMISSION

[75] Inventors: Jong O. Ra, Seoul; Joon Y. Lim, Kyungki; Wan M. Yoo, Incheon, all of Rep. of Korea

[73] Assignee: Hae Sung Engineering Co., Ltd., Rep. of Korea

[21] Appl. No.: 393,691

[22] Filed: Feb. 24, 1995

Related U.S. Application Data

[62] Division of Ser. No. 166,921, Dec. 10, 1993, Pat. No. 5,415,597.

[30] Foreign Application Priority Data

May 29, 1993 [KR] Rep. of Korea ............... P93-9404
Jun. 9, 1993 [KR] Rep. of Korea ........... U.M.93-9946 U

[51] Int. Cl.⁶ ........................................ F16H 3/62
[52] U.S. Cl. ..................... 475/275; 475/104; 475/284
[58] Field of Search ........................ 475/104, 113, 475/269, 271, 275, 277, 278, 284, 288, 338, 339, 59, 67

[56] References Cited

U.S. PATENT DOCUMENTS

| | | |
|---|---|---|
| 2,239,973 | 4/1941 | Ravigneaux . |
| 2,775,144 | 12/1956 | Kelbel . |
| 3,063,309 | 11/1962 | Grattan . |
| 3,648,544 | 3/1972 | Tanaka .................. 475/71 |
| 3,863,524 | 2/1975 | Mori et al. ............... 475/278 X |
| 4,056,986 | 11/1977 | Hobbs ..................... 475/92 X |
| 4,658,672 | 4/1987 | Michael . |
| 5,062,923 | 11/1991 | Ra et al. . |
| 5,322,488 | 6/1994 | Ra et al. .................. 475/330 |
| 5,326,334 | 7/1994 | Ra et al. . |
| 5,330,395 | 7/1994 | Ra et al. .................. 475/330 |

*Primary Examiner*—Rodney H. Bonck
*Assistant Examiner*—Peter Kwon
*Attorney, Agent, or Firm*—Merchant, Gould, Smith, Edell, Welter and Schmidt

[57] ABSTRACT

A stepless automatic variable transmission with gears in a state of constant meshing which is operational without the need for disengaging or changing the gears such that the rotational output power can be varied to effect a neutral, low speed, medium speed, high speed, overdrive or reverse rotation by selecting a stepless automatic speed change method or a manual speed change method, and which includes a speed change system, an overdrive system and a speed change controlling system.

The assembly of speed change system (10, 110, 310, 410, 510, 610), the overdrive system (50, 360, 660, 760) and the speed change controlling system (80, 180, 380, 680, 780) can vary with each of the systems combined to result in numerous stepless automatic variable transmissions. To effect speed changes low speed, medium speed, overdrive, and reverse rotation brake means are used. Also, either the manual speed change method or the automatic speed change method can be selected.

9 Claims, 40 Drawing Sheets

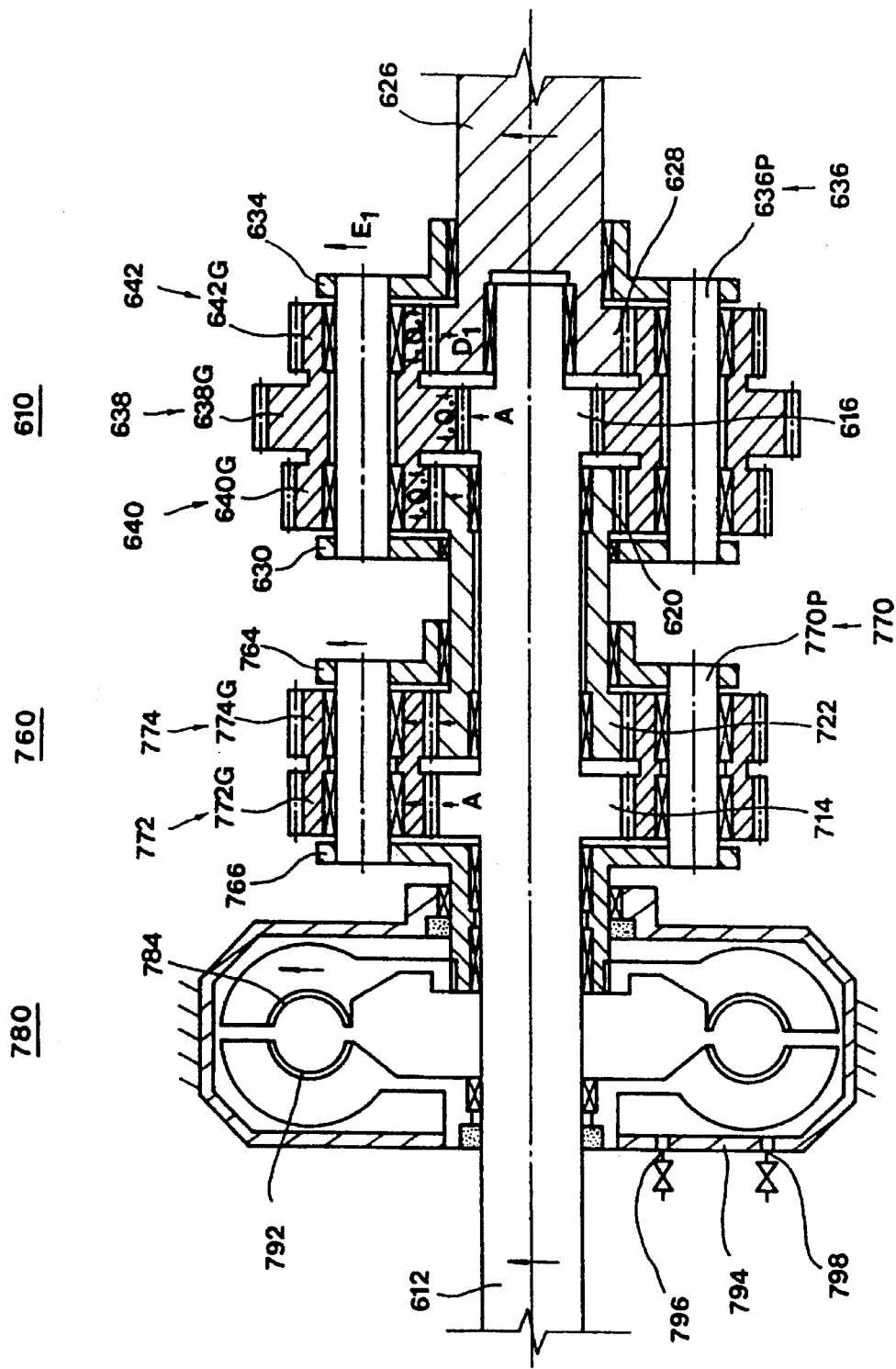

5,484,349

STEPLESS AUTOMATIC VARIABLE TRANSMISSION

This is a division of application Ser. No. 08/166,921, filed Dec. 10, 1993, now U. S. Pat. No. 5,415,597 which application is incorporated herein by reference.

BACKGROUND OF INVENTION

1. Field of the Invention

The present invention relates to an automatic transmission, and more particularly, to a stepless automatic variable transmission assembled in such a way that power input to an input shaft can be converted and transmitted to an output shaft without changing or disengaging gears when accelerating or changing speed to initiate and maintain forward motion and when reversing the rotational direction of the output shaft to initiate and maintain a backward motion.

2. Information Disclosure Statement

In the conventional manual transmission, speed changes are accomplished by constantly choosing among different given gear ratios in accordance with the load. Such constant attention is annoying in that the gears must always be disengaged and/or engaged at the time of a desired or necessary speed change. Also, the existing automatic transmissions and belt type stepless automatic transmissions are complicated in design and structure and require a large dedicated installation area. Furthermore, such transmissions are expensive to manufacture.

The above problems are addressed in U.S. Pat. No. 5,062,823 which issued on Nov. 5, 1991. However the transmission described therein requires a separate means for reverse rotation of the output shaft thereby severely restricting the versatility of the transmission.

Other transmissions which have solved the problem of initiating and maintaining a backward or reverse motion include: U.S. patent application Ser. No. 07/903,137, (filed Jun. 23, 1992), now U.S. Pat. No. 5,326,334, Ser. No. 07/920,892 (filed Jul. 28, 1992), now U.S. Pat. No. 5,322, 488, Ser. No. 07/921,050 (filed Jul. 28,1992), now U.S. Pat. No. 5,330,395 and Ser. No. 08/028,824 (filed Mar. 10, 1993) now U.S. Pat. No. 5,364,320.

However, the present invention uses a design and construction of a speed change system which is different from the above described systems and includes an overdrive function which increases the rotational speed of the output shaft over the rotational speed input by the engine, or the like. A speed change controlling system in which the speed can be adjusted steplessly and automatically is also utilized in the present invention.

Therefore, the objects of the present invention are to provide a stepless automatic variable transmission which can solve the above described problems which have yet to be efficiently and effectively solved in the prior art.

Another object of the present invention is to provide a transmission which is not as complicated as those of the prior art, includes a very reliable speed change operation, has smooth rotational output, quickly adapts to a change in the load and which includes overdrive and reverse operations.

Another object of the present invention is to provide a continuous variable automatic transmission which efficiently transmits rotational output in either rotational direction and which is simple to construct and easy to maintain.

The preceding objects should be construed as merely presenting the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The stepless automatic variable transmission of the present invention is defined by the claims with specific embodiments shown in the attached drawings. For the purpose of summarizing the invention, the invention relates to a stepless automatic variable transmission comprising a speed change system which receives rotational power generated by a gasoline engine, or the like, and changes the rotational speed and transmits the power to an output shaft. An overdrive system increases the ratio of the drive shaft to the engine speed and a speed change controlling system automatically controls the rotational ratio in accordance with the load of the output shaft. The stepless automatic variable transmission enables input rotational force to be steplessly changed from the lowest to a predetermined ratio and transmitted to the output shaft.

According to the first embodiment of the present invention, the speed change system includes an input sun gear for receiving rotational power generated by an engine, input differential gears meshed with the input sun gear, control differential gears integrally formed with the input differential gears, locking pins and carriers for operatively positioning the differential gears. A medium speed ring gear, preferably having a tube shaft boss, is meshed with the outside of the input differential gears so as to control only the medium speed driving, if necessary. A control sun gear is integrally formed with a speed change control shaft and is meshed with the inside of the control differential gears so as to control the reverse rotation driving or a stepless automatic speed change. An output ring gear is integrally formed with a ring gear shaft and is meshed with the outside of the output differential gears. The above elements constitute a composite differential gear set. A modification of the composite differential gear set further includes a support shaft and a support plate integrally connected to a stator.

The overdrive system includes a ring gear shaft for receiving the output rotation from a speed change system, a carrier integral with the ring gear shaft, planetary gears for transmitting the rotation of the carrier, locking pins and another carrier for operatively positioning the planetary gears about the overdrive sun gear. The overdrive sun gear is integrally formed with an overdrive control shaft and is meshed with the inside of the planetary gears. A terminal ring gear, integrally formed with an output shaft, is meshed with the outside of the planetary gears, and constitutes a planetary gear set with an electromagnetic clutch to enable the planetary gear set to rotate as a unit during normal operation, i.e. the overdrive function not enabled.

The speed change controlling system utilizes a torque converter of the type used in conventional automatic transmissions but with changes in order for it to function in the present invention. This system comprises, with reference to the elements used in a conventional torque converter for the convenience of explanation, an impeller which is the driving body, a turbine which is the driven body, a stator for increasing the torque, and a housing for containing the circulating fluid. That is, the speed change controlling system comprises an impeller which rotates integrally with the input shaft, a turbine having a fluid inlet formed on the middle part of the impeller for suction of fluid and which is integrally connected to the speed change control shaft of the speed change system, a stator installed between the impeller and the turbine, a support shaft integrally formed with the stator, a support plate integrally formed with the support shaft and rotating in the same direction as the two carriers of the speed change system, and an housing provided with a fluid inlet and a fluid outlet to allow circulation of the fluid therethrough. The housing is secured against rotation. In positioning the elements, preferably, the impeller is installed near the engine, the turbine is installed near the speed change system, the stator is installed between the impeller and the turbine, and the housing is completely filled (100%) with fluid.

Generally, there are three methods of operation for the stepless automatic variable transmission constructed as described above.

First, operation of the stepless automatic speed change to attain a very smooth, quiet and efficient performance under typical driving conditions.

Second, operation with a fixed speed change ratio to attain an engine braking effect when operating in a mountainous area or on an icy road or when rapid starting is desired.

Third, operation to attain a combination of the above two methods.

It is a characteristic and advantage of the present invention that the three methods of operation can be performed by the stepless automatic variable transmission as described herein.

Reviewing the operation of the speed change system, when the output shaft is stationary, the rotational input power rotates the medium speed ring gear and the input differential gears in a rotational direction opposite to the input direction. The output differential gears, which rotate in the same direction as the input direction, causes the carriers to rotate in a direction opposite to the input direction due to the stopped output ring gear. This results in a neutral state. Next, if the carriers, which are idling in a direction opposite to the input direction, are completely stopped by applying a brake force through a low speed brake means installed on the tube shaft boss, the rotation of the output shaft is gradually increased in proportion to the brake force applied. "Idle" or "idling" in the present invention means that no work is being performed but the "idling" components may be rotating. To transmit the power of the driving shaft to the output shaft at a medium speed, if the medium speed ring gear is stopped by applying a brake force through a medium speed brake means installed on the tube shaft boss, the output shaft rotates to a predetermined fixed gear ratio. To transmit the power of the driving shaft at a high speed, the speed change controlling system is connected to the speed change system. Thus, the resulting rotation of the impeller forces fluid to strike the blades of the turbine such that a rotational force is transmitted to the turbine. That is, because the turbine, the speed: change control shaft and the control sun gear are integrally connected, the control sun gear is rotated by the rotation of the impeller which is the driving body. At this time, the speed change controlling system, the speed change system and the overdrive system together form a rotating body which is in a high speed state. That is, the number of revolutions of the output shaft and the number of revolutions of the input shaft becomes equal.

In order to transmit the power to the output shaft in a overdrive state, the rotation of the overdrive sun gear is completely stopped by releasing the electromagnetic clutch which integrally connects the terminal ring gear and the carrier of the overdrive system and the rotation of the overdrive control shaft is completely stopped by applying a rotational braking force to the overdrive control shaft, via the overdrive brake means. These actions cause the output shaft to rotate at a greater number of revolutions than the input shaft.

To reverse the rotation of the output shaft, i.e. reverse driving method, when the terminal ring gear and the carrier of the overdrive system are rotating as a unit, i.e. not in an overdrive state, a rotational braking force is applied through the reverse rotation brake means to stop the rotation of the speed change control shaft and the control sun gear resulting in the output shaft rotating in a direction opposite to the rotational direction of the input shaft. This operation is initiated from the neutral state.

According to another embodiment (third embodiment) of the present invention, the speed change system includes an input sun gear for receiving driving power generated by an engine. Input differential gears ace meshed with the input sun gear and control differential gears are meshed with the input differential gears. The medium speed differential gears are integrally formed with the control differential gears. Locking pins and carriers are used to operatively position each differential gear. An output ring gear, integrally formed with a ring gear shaft, is meshed with the outside of the input differential gears. A control sun gear is meshed with the inside of the control differential gears so as to control the low speed driving or stepless automatic speed change. A medium speed sun gear is meshed with the inside of the medium speed differential gears so as to control only the medium speed driving if desired. Each of the above two sun gears is integrally formed on a control shaft, respectively.

The overdrive system includes a link gear integrally formed with the ring gear shaft of the speed change system and receiving the power from a source of rotational output such as an engine, speed control system, or the like. Overdrive gears are integrally formed on a transmitting shaft so as to overdrive the rotation of the link gear up to a predetermined ratio. A fixed plate operatively positions the overdrive gears to mesh with the link gear and also operatively positions the transmitting gears to mesh with the output gear of the output shaft.

The speed change controlling system utilizes conventional torque converter as used in present day automatic transmissions. This system comprises, with reference to the elements used in a conventional torque converter for the convenience of explanation, an impeller which is the driving body, a turbine which is the driven body and a stator for increasing the torque all of which are operatively positioned in a cover which contains the circulating fluid.

Explaining the construction in detail, a speed change controlling system is composed of a cover for preventing fluid in the converter from leaking out and rotating integrally with the input shaft, an impeller integrally formed with the cover, a turbine integrally connected to the control shaft of the speed change system, a fixed plate fixable on the outside, and a fixed shaft and a stator integrally formed with the fixed plate. In general, the turbine is installed near the engine, the impeller is installed near the speed change system, and the spacing between the turbine and impeller and the amount of fluid are similar to the conventional converter.

Reviewing the process of speed change, when the output shaft is stationary due to the load, the power input rotates the carriers in a direction which is the same as the input direction of rotation and rotates the control sun gear and the medium speed sun gear in a direction opposite to the input direction, so that the output shaft does not rotate and the carriers, the control sun gear and the medium speed sun gear idle to be in neutral state. If the control sun gear is completely stopped by applying the brake force through a low speed brake means installed on the control shaft which is idling in a direction opposite to the input shaft, the rotation of the output shaft is increased gradually proportionally to the brake force. To transmit the power of the driving shaft to the output shaft in a medium speed, if the medium speed sun gear is stopped by applying the brake force through a medium speed brake means installed on the medium speed control shaft, the output shaft is rotated up to the given gear ratio. To transmit the output in a high speed, if the engine speed is gradually increased, the rotational force of the impeller draws out the fluid and the fluid strikes the blades of the turbine, so that the control shaft integrally connected to the turbine is rotated at the rotating speed of the impeller, and at this time, the speed change controlling system and the speed change system together form a rotating body to transmit the power at a high speed. For the reverse rotation driving method, a brake force is applied to the carriers through a reverse rotation brake: means installed on the tube shaft boss of the carrier causing the carriers to stop and resulting in the output shaft rotating in a direction opposite to that of the input shaft.

In yet another embodiment (fifth embodiment) of the present invention, the speed change system utilizes an input sun gear receiving the driving power generated by an engine, planetary gears meshed with the input sun gear, locking pins and carriers for operatively positioning the planetary gears, and an output ring gear integrally formed with an output shaft and meshed with the outside of the planetary gears.

The speed change controlling system includes, with reference to the elements used in a conventional torque converter for the convenience of explanation, an impeller, turbine, stator which are operatively enclosed in a housing as described elsewhere.

Reviewing the operation between the speed change system and the speed change controlling system, the impeller is rotated by the input shaft, the stator, for increasing the rotational force of the impeller, is secured to the fixed shaft, and the turbine, capable of adjusting the carriers of the speed change system by receiving the rotational force of the impeller, is connected to the speed change control shaft.

The operation of the present stepless automatic variable transmission is as follows: when the output shaft is in a stationary state clue to a load placed thereon, the rotational power input from an engine is divided into two paths, so that the power passed through the impeller makes the carriers idle in a direction which is the same rotational direction as the input sun gear direction. The power passed through the input sun gear makes planetary gears only idle in a direction opposite to the input direction to be in a neutral state. When forward motion is desired, if the speed of the engine is increased, then the speed of the impeller is increased, and therefore the force of the discharged fluid is increased, so that the revolution of the turbine gradually increase from the neutral state in which the turbine slips and the output shaft is rotated to initiate forward movement. To further increase the speed, if the speed of the engine is further increased, the operation is performed with a revolution corresponding to the load of the output shaft.

To initiate reverse rotation of the output shaft, if the brake force is applied through a reverse rotation brake means installed on the speed change control shaft, the carriers are stopped, and accordingly the power rotates the output shaft in a direction opposite to the input shaft.

According to yet another embodiment (sixth embodiment) of the present invention, a speed change system includes an input sun gear receiving a driving power generated at an engine, input planetary gears meshed with the input sun gear, reverse rotation planetary gears being integrally formed at the front of the input planetary gears for receiving the reverse rotation driving or the controlled speed change, output planetary gears integrally formed at the near of the input planetary gears, locking pins and carriers for operatively positioning the input, the reverse rotation, and the output planetary gears, a reverse rotation sun gear being integrally formed with a speed change shaft and being meshed with the inside of the reverse rotation planetary gears so as to transmit the reverse rotation driving and the controlled rotation, and an output sun gear being integrally formed with an output shaft and being meshed with the inside of the output planetary gears, and constitutes one composite planetary gear set.

An overdrive system includes an input carrier receiving rotational power generated by an engine, overdrive planetary gears transmitting the rotation of the input carrier, locking pins and another carrier for operatively positioning the overdrive planetary gears, a control sun gear being integrally formed with the control shaft which receives the controlled rotation and being meshed with the inside of the overdrive planetary gears, and a control ring gear being meshed with the outside of the overdrive planetary gears and transmitting the number of revolution which is higher than that of input rotation and the controlled number of revolution, and constitutes one planetary gear set.

Another speed change control system utilizes the principle of action and reaction and uses control blades and a control plate with resistance blades secured to the internal surface of the housing which, in operation, results in the application of rotational resistance to the control blades.

Reviewing the operating methods of the stepless automatic variable transmission constructed as described above, when the output shaft is in stationary state due to a load, the input power rotates the carriers of the speed change system in a direction opposite to the input direction and also rotates the control sun gear of the overdrive system in a direction same as the input direction, so that the output shaft is not rotated and the carriers of the speed change system and the control sun gear of the overdrive system are only idling in a neutral state. And if the carriers are completely stopped by applying the brake force through a forward rotation brake means installed on the carrier of the speed change system which is idling in a direction opposite to the input direction, the revolution of the output shaft is increased up to the revolution corresponding to the fixed ratio corresponding to a teeth ratio proportionally to the brake force, and thereafter the control blades of the speed change controlling system automatically control the revolutions to maintain the equilibrium according to the input rotational force and the load on the output shaft and gradually transmit it to the output shaft. In the overdrive state, the control shaft is stopped by applying the brake force through an overdrive brake means installed on the control shaft causing the rotation output of the output shaft to further increase relative to that of the input shaft. For reverse rotation driving, the brake force is applied via a reverse rotation brake means installed on the speed change shaft causing the reverse rotation sun gear to stop and rotating the output shaft in a direction opposite to the input shaft.

As described above, the power generated by the engine can be easily and effectively changed into neutral and forward or reverse rotational operation without disengaging or re-engaging gears and transmitted to the output shaft. The structures according to the present invention are very simple to use, economical to produce and operate.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 1 is a partial perspective view of the first embodiment of the present invention;

FIG. 2 is a sectional view of the first embodiment according to the present invention;

FIG. 3 is a sectional view of the first embodiment in the neutral state according to the present invention;

FIG. 4 is a sectional view of the first embodiment in the low speed state with the carriers in a stopped position according to the present invention;

FIG. 5 is a sectional view of the first embodiment in the medium speed state with the medium speed ring gear in a stopped position according to the present invention;

FIG. 6 is a sectional view of the first embodiment in the high speed state with the rotation ratio of the output shaft to the input shaft being 1:1 according to the present invention;

FIG. 7 is a sectional view of the first embodiment in the overdrive state according to the present invention;

FIG. 8 is a sectional view of the first embodiment with the output shaft rotating in a direction opposite to that of the input shaft according to the present invention;

FIG. 10 is a partial perspective view of the third embodiment according to the present invention;

FIG. 11 is a sectional view of the third embodiment;

FIG. 12 is a sectional view showing third embodiment in the neutral state according to the present invention;

FIG. 13 is a sectional view showing the stepless automatic variable transmission of the third embodiment in the low speed state with the control sun gear in a stopped position according to the present invention;

FIG. 14 is a sectional view showing the third embodiment in a medium speed state with the medium speed sun gear in a stopped position according to the present invention;

FIG. 15 is a sectional view showing the third embodiment in a high speed state according to the present invention;

FIG. 16 is a sectional view showing the third embodiment with the output shaft rotating in a direction opposite to the input shaft according to the present invention;

FIG. 17 is a sectional view of the fourth embodiment according to the present invention;

FIG. 18 is a sectional view showing the fourth embodiment in the neutral state;

FIG. 19 is a sectional view showing the fourth embodiment in a low speed state according to the present invention;

FIG. 20 is a sectional view showing the fourth embodiment in a medium speed state according to the present invention;

FIG. 21 is a sectional view showing the fourth embodiment in a high speed state according to the present invention;

FIG. 22 is a sectional view showing the fourth embodiment with the output shaft rotating in a direction opposite to that of the input shaft according to the present invention;

FIG. 23 is an assembled sectional view of the fifth embodiment according to the present invention;

FIG. 24 is a sectional view showing the fifth embodiment in the neutral state according to the present invention;

FIG. 25 is a sectional view of the fifth embodiment in the forward rotation driving state according to the present invention;

FIG. 26 is a sectional view of the fifth embodiment in the reverse state according to the present invention;

FIGS. 27–32 illustrate the sixth embodiment of the stepless automatic variable transmission according to the present invention;

FIG. 27 is a partial perspective view of the sixth embodiment according to the present invention;

FIG. 28 is a sectional view of the sixth embodiment according to the present invention;

FIG. 29 is a sectional view of the sixth embodiment in the neutral state according to the present invention;

FIG. 31 is a sectional view of the sixth embodiment in the overdrive state according to the present invention;

FIG. 32 is a sectional view of the sixth embodiment in the reverse state;

FIGS. 33–38 illustrate the seventh embodiment of the stepless automatic variable transmission according to the present invention;

FIG. 33 is a partial perspective view of the seventh embodiment according to the present invention;

FIG. 34 is a sectional view of the seventh embodiment according to the present invention;

FIG. 35 is a sectional view of the seventh embodiment in the neutral state according to the present invention;

FIG. 36B is a sectional view of the seventh embodiment in the forward speed increasing state according to the present invention;

FIG. 37 is a sectional view of the seventh embodiment in the overdrive state according to the present invention; and FIG. 38 is a sectional view of the seventh embodiment in the reverse state according to the present invention:

Similar reference characters refer to similar parts throughout the several views of the drawings.

DETAILED DESCRIPTION OF THE INVENTION

Figure 1:
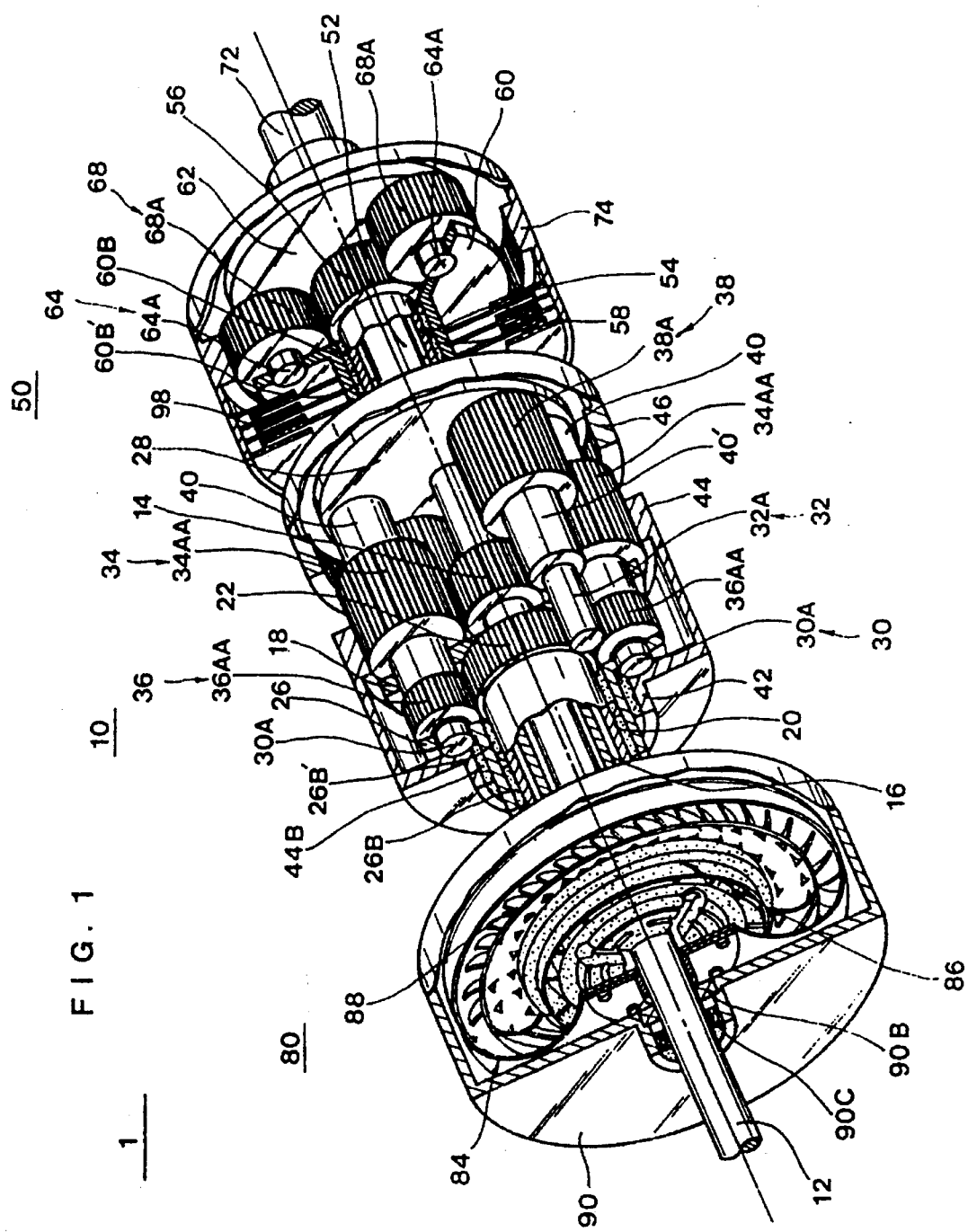
FIGS. 1–8 illustrate the first embodiment of the stepless automatic variable transmission according to the present invention.

The stepless automatic variable transmission of the present invention preferably includes the speed change system, overdrive system and speed change controlling system as a functional unit. From the teachings in the present disclosure the speed change system, overdrive system and speed change controlling system can be varied in their respective construction and can be combined together to define a stepless automatic variable transmissions of various embodiments as appreciated by one skilled in the art. Although the brake means, as illustrated in the drawings, are installed on a control shaft and/or a tube shaft boss, the actual positions of the brake means and the construction thereof can be changed. Also, the bearings or splines and splined hub can be substituted by other elements which have same function. In general, operation of the speed change system in a "fixed ratio" means that the output is determined by the characteristics of the gears, e.g. number of teeth, comprising the speed change system.

A description of the first embodiment of the stepless automatic variable transmission 1 of the present invention combines the speed change system 10, overdrive system 50 and speed change controlling system 80 with reference to FIGS. 1–8 follows.

SPEED CHANGE SYSTEM

Figure 2:
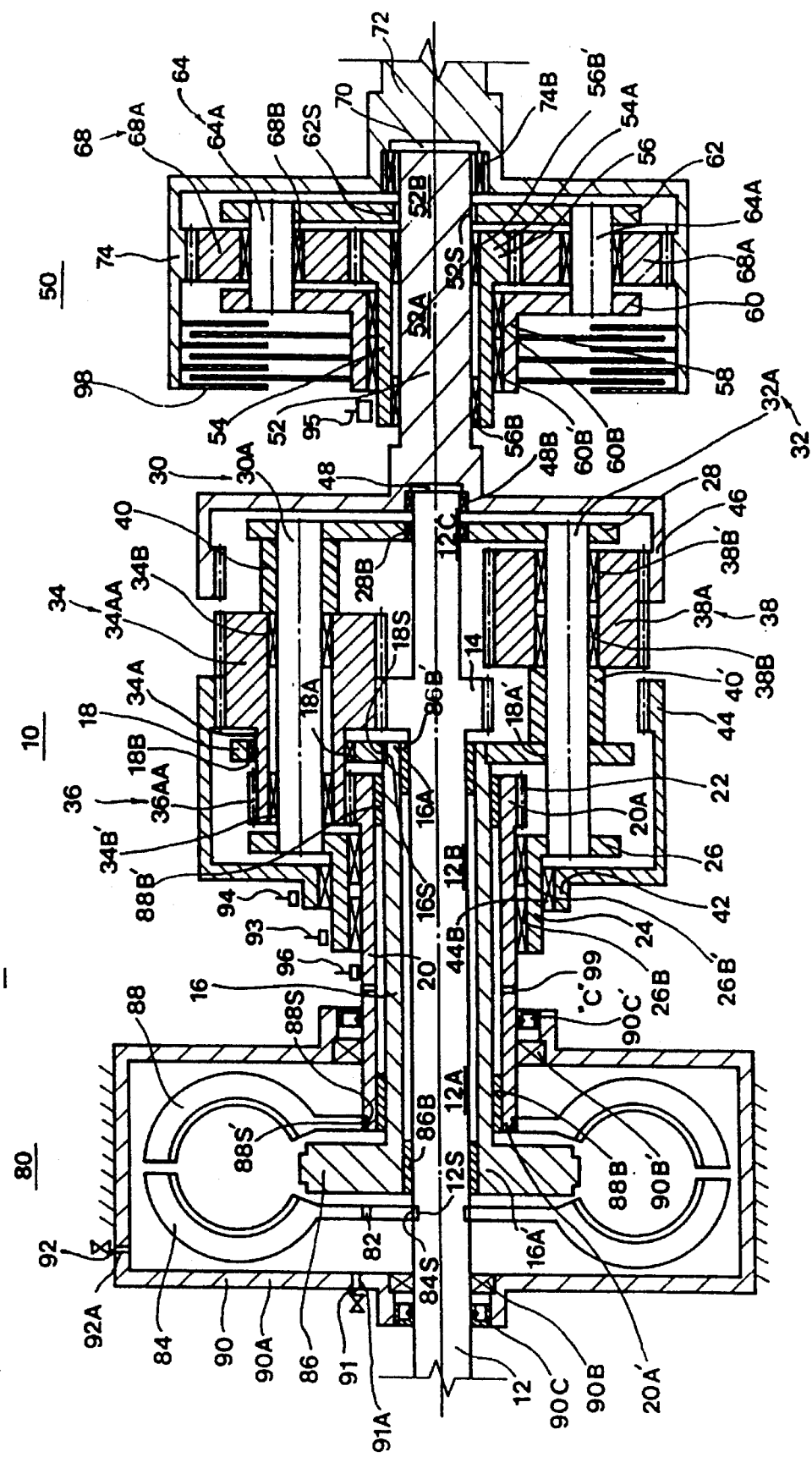

FIGS. 1 and 2 illustrate the input shaft 12 for inputting the rotational driving force of an engine into the transmission according to the present invention. The input shaft 12 consists of a first section 12A, a second section 12B and a terminal end 12C with the input sun gear 14 integrally formed on the input shaft 12. The support shaft 16 is rotatably and coaxially positioned on the first section 12A of the input shaft 12 and is spaced apart from the input sun gear 14. At end 16A of the support shaft 16 splines 16S are formed to receive the coaxial splined hub 18S of the disk shaped support plate 18. The stator 86 of the speed change controlling system 80 is secured to end 16A' of the support shaft 16 to enable simultaneous rotation with the support shaft. Bushings 86B, 86B', or the like, are used to permit the input shaft 12 and the support shaft 16 to rotate independently. The speed change control shaft 20 is coaxially and rotatably positioned on the support shaft 16 with a control sun gear 22 formed at end 20A of the speed change control shaft 20. To enable simultaneous rotation splines 88S are formed at the opposite end 20A' of the speed change control shaft 20 which engage the splined hub 88S' of turbine 88 of the speed change controlling system 80. Bushings 88B, 88B', or the like, are used so that the support shaft 16 and the speed change control shaft 20 can rotate independently.

Next, the carrier 26 having a tube shaft boss 24 is rotatably positioned on the speed change control shaft 20 proximate the control sun gear 22. Bearings 26B, 26B', or the like, are used to permit the speed change control shaft 20 and the carrier 26 to independently rotate. The carrier 28 is positioned at the terminal end 12C of the input shaft 12 with a bearing 28B to permit the terminal end 12C of the input shaft and the carrier 28 to rotate independently. The medium speed ring gear 44 having a tube shaft boss 42, is coaxially and rotatably positioned on the tube shaft boss 24 with a bearing 44B to permit the medium speed ring gear 44 and the carrier 26 to rotate independently.

In order that the two carriers 26, 28 can rotate together, a plurality of locking pins 30, 32 is used to interlink and secure the two carriers 26, 28 together, as see FIG. 1.

An input differential gear 34AA, of the plurality of input differential gears 34, and a control differential gear 36AA, of the plurality of control differential gears 36, which may be integrally formed, are rotatably positioned on each locking pin 30A. The input differential gear 34AA and the control differential gear 36AA are of different sizes and are spaced apart 34A a predetermined distance. Bearings 34B, 34B', or the like, are used to promote rotation about the locking pin. The input sun gear 14 is meshed with the inner side of the forward half of the input differential gear 34AA. The medium speed ring gear 44 is meshed with the outer side of the forward half of the input differential gear 34AA, and the control differential gear 36AA is meshed with the control sun gear 22. A spacing ring 40 may be inserted onto the locking pin 30A at the rear side of the input differential gear 34AA to prevent axial movement of the composite differential gears 34AA, 36AA along the locking pin 30A during use.

On the other hand, the output differential gear 38A, of the plurality of output differential gears 38, is rotatably mounted on locking pin 32A by using, for example, bearings 38B, 38B'. The forward half of the output differential gear 38A is meshed with the rear half of the input differential gear 34AA, and on the outer side of rear half of the output differential gear 38A is meshed the output ring gear 46. The output ring gear 46 has an axial bore 48 formed therein and is integrally formed with a ring gear shaft 52 along its axis. Bearing 48B is inserted between the bore 48 and the terminal end 12C of the input shaft to permit the output ring gear 46 to rotate thereabout. In a similar manner ring 40' can be used to prevent the axial movement of the output differential gear 38A during use.

The support plate 18 is integrally connected to the stator 86 of the speed charge controlling system 80. Holes 18A, 18A' are formed in the support plate 18 in order to rotatably receive each of the locking pins, respectively, as illustrated at FIG. 2. Bearing 18B may be used to promote independent rotation of the support plate about the locking pins.

Locking pin 30A, input differential gear 34AA, control differential gear 36AA and ring 40 together make a set and similarly locking pin 32A, output differential gear 38A and ring 40' make a set. For balance and rotational stability two of each set are used. However, as appreciated by those skilled in the art, there is no limit in the number of sets used.

The differential gear set of the present speed change system 10, as described above, efficiently changes the engine torque to provide a broad range of power output. Also, since the gears of the present invention are always in a meshed state, the transmission of present invention can absorb large amounts of shock and exert a greater rotational force during operation.

OVERDRIVE SYSTEM 50

When the overdrive system is operatively connected to the speed change system 10, the ring gear shaft 52 is used. Since the purpose of the ring gear shaft 52 is to receive rotational input from a rotational output source such as an electric motor or a gearbox driven by an internal combustion engine, it may be considered as an input shaft of the overdrive system.

As described above, the ring gear shaft 52 includes a first section 52A and a terminal end 52B. The overdrive control shaft 54, with an overdrive sun gear 56 secured at end 54A, is rotatably and coaxially positioned on the ring gear shaft 52. Bearings 56B, 56B', or the like, are used to permit independent rotation of the ring gear shaft 52 and the overdrive control shaft 54. The carrier 60 with a tube shaft boss 58 is rotatably positioned on the overdrive control shaft 54. Bearings 60B, 60B', or the like, are used to permit independent rotation of the carrier 60 and the overdrive control shaft 54. The carrier 62 includes a coaxial splined hub 62S which receives splines 52S formed on the ring gear shaft 52 to secure the carrier 62 and the ring gear shaft 52 together, as illustrated at FIG. 2. A plurality of locking pins 64 are used. Each locking pin 64A interlinks and secures carriers 60, 62 together so that the carriers 60, 62 rotate simultaneously.

Each planetary gear 68A, of the plurality of planetary gears 68, is rotatably positioned on each locking pin 64A via a bearing 68B, or the like, to ensure independent rotation and is meshed with the overdrive sun gear 56. The terminal ring gear 74 includes an axial bore 70 formed therein to rotatably receive the terminal end 52B of the ring gear shaft 52. The terminal ring gear 74 meshes with the outside of each planetary gear 68A and terminates in the output shaft 72. The bearing 74B, or the like, is inserted between the bore 70 and the ring gear shaft to ensure that the terminal ring gear 74 rotates freely about the ring gear shaft 52.

A conventional mechanical clutch or electromagnetic clutch 98 is installed between the tube shaft boss 58 of the carrier 60 and the terminal ring gear 74 to connect or release the carrier 60 and terminal ring gear 74 so that the planetary gear sets of the overdrive system 50 can be made to rotate as a unit.

Although the terminal ring gear 74 is described as being connected to or released from the carrier 60 by utilizing the electromagnetic clutch 98, the same function may be performed when the overdrive control shaft 54 is connected to or released from the carrier 60 by other conventional means.

SPEED CHANGE CONTROLLING SYSTEM 80

The speed change controlling system 80 utilizes a conventional torque converter as presently used in automatic transmissions. Accordingly, a detailed description thereof is omitted, and a description of only that portion which has been modified and improved so as to adapt it for use in the present invention with the speed change system 10 is presented.

The torque converter as conventionally used functions as a fluid clutch which transmits and amplifies torque to the gears of the transmission.

However, in the present invention the principal power is directly transmitted to the input sun gear 14 via the input shaft 12, as described above. The role of the speed change controlling system 80 in the present invention is to make the rotational force of the turbine control only the rotation of the control sun gear 22. To achieve this, the positions of the impeller and the turbine are opposite to that of the conventional torque converter and with the stator being rotated by carriers 26, 28 of the speed change system 10. Furthermore, the method of circulation of the fluid, such as transmission fluid or the like, is a natural circulation method, i.e., operation without a pump. The speed change controlling system 80 uses an incision type torque converter and a fixed housing 90 while the conventional torque converter is a closed type.

The impeller 84 is coaxially secured to the first section 12A of the input shaft 12 by using, for example, a splined hub 84S which meshes with the splines 12S formed on the input shaft so that the impeller 84 rotates simultaneously with the input shaft 12. An optimum number of fluid inlets 82 are formed in the central portion of the impeller 84 for sucking the fluid. The stator 86 is integrally formed with the support shaft 16 which is rotatably and coaxially installed on the input shaft 12. Bushings 86B, 86B' are used, for example, to permit the input shaft 12 and the support shaft 16 to independently rotate. To rotatably secure the speed change control shaft and the turbine together, the speed change control shaft 20 includes splines 88S formed at end 20A' to receive the coaxial splined hub 88S' of the turbine 88 to enable the turbine 88 to rotate simultaneously with the speed change control shaft 20.

At the time of installation, the impeller 84 and the turbine 88 are installed facing each other in such a manner so as to be spaced apart by only a very small distance but sufficiently apart to permit rotation without direct mechanical engagement, i.e. contact. Stator 86 is positioned between the impeller 84 and the turbine 88, with the stator 86 rotating in the same direction as the carriers 26, 28 of the speed change system 10.

The housing 90 for containing the necessary circulating fluid is positioned along the first section 12A of the input shaft 12 and the speed change control shaft 20. The fluid inlet 91 with passageway 91A for suction of fluid naturally circulating from the outside is formed in one side 90A of the housing near the impeller 84. The fluid outlet 92 with a passageway 92A is formed in the top of the housing and bearings 90B, 90B', or the like, are used so that the input shaft 12 and the speed change control shaft 20 can independently rotate. Fluid-seals 90C, 90C' are used to prevent leakage of the fluid contained in the housing. The housing 90 is secured against rotation by an outer fixing means, i.e. secured to a non-rotatable structure, such as an automobile frame, by a weld, bolt etc.

The characteristics of the speed change controlling system 80 constructed as described above is that the rotation of the speed change control shaft 20 of the speed change system 10 can be smoothly and rapidly controlled to obtain the optimum speed change ratio in accordance with the load.

To obtain maximum engine braking effect or when rapid starting is required, a conventional clutch 99 is positioned at "C" of the speed change control shaft 20 to control the rotation of the control sun gear 22 of the speed change system 10 and the speed change controlling system 80 by uncoupling the rotation of the turbine, as see FIG. 2. This driving mode is a speed change interval where a fixed speed change ratio is required from the starting low speed to the medium speed, therefore the above described speed change controlling system 80 is not used and separate mechanisms, i.e. brake means, are used.

The method for changing the speed in this way requires brake means 93, 94, 96 positioned in the speed change system 10 for changing the speed at each step, and to operate at a fixed speed change ratio by applying a brake force from the outside. That is, the low speed brake means 93, which further includes a one-way bearing, is positioned on the tube shaft boss 24 to permit only rotation in one direction. When activated, the low speed brake means 93 stops the carriers 26, 28 when starting or rapidly starting. The medium speed brake means 94 is installed on the tube shaft boss 42 to control the medium speed ring gear 44 in the medium speed state by stopping the rotation of the gear 44. The reverse speed brake means 96 is installed on the speed change control shaft 20 to control the control sun gear 22 when reverse rotation of the output shaft relative to the rotation of the input shaft is desired.

The low speed, medium speed and reverse brake means as used in the present invention can utilize either automatic control or manual control and electric, electromagnetic, hydraulic, pneumatic or frictional means. One example of a brake means, as illustrated in the figures, is a means to force a brake lining to inhibit and control rotation against a portion of the surface of the carriers 26, 28 to initiate and achieve low speed, the medium speed ring gear 44 to achieve medium speed, and the speed change control shaft 20 to achieve reverse rotation. As appreciated by those skilled in the art other brake means well known in the art could be used and would be expected to accomplish the intended braking purpose.

For the low speed brake means 93, a conventional one-way bearing can be used to restrain only the reverse rotation of the carriers 26, 28 thus getting rid of an inconvenience that after the brake force is applied at the time of speed change, the brake force has to be released again.

In the present embodiment, a conventional torque converter is improved to function in the speed change controlling system 80 of the present invention. That is, other such devices as fluid coupling, electric, electromagnetic and powder clutches and powder coupling can be used. As illustrated, the turbine 88 is connected to the speed change control shaft 20 for speed change control. However, it can also be connected to the carriers 26, 28 or the medium speed ring gear 44 for speed change control to attain the intended purpose, and this does not limit the scope of the present invention.

The power transmission process and the speed change status of the present embodiment as described above are explained below while operating in neutral, low speed, medium speed, high speed, overdrive and reverse rotation states.

The transmission of the present invention may be used with any rotational power means and in any mechanism which requires that the power output be varied to accommodate varying loads. Thus, the present invention may be used in combination with automobiles, trucks and industrial machines, etc.

For purposes of illustration, the continuously variable transmission of the present invention is described in combination with an automobile. Further, the bushings or splines can be substituted by other elements which have the same function and are well known in the art.

In the figures the direction of rotation when viewed from the left side of each figure of the input shaft is counterclockwise, and is indicated as "↑" or "A" and the direction opposite to the input shaft, i.e. clockwise, is indicated as "↓" or "B".

The following description is applicable to other embodiments of the present invention as well. The rotation of each differential gear defines rotation about its own axis, i.e. a locking pin. Whereas, a revolution defines a revolution by a carrier about the axis of the input shaft. Whether there is an increase or decrease in the number of rotations or revolutions in a particular state is determined relative to the number of rotations or revolutions relative to the neutral state.

Here the rotational force of the input shaft 12 is divided into two paths. In one path the rotational force is transmitted to the impeller 84 of the speed change controlling system 80, the stepless automatic speed change method. In the other path the rotational force is transmitted to the input sun gear 14 of the speed change system 10, the method in which driving can be performed at a fixed speed change ratio to obtain rapid starting or a maximum engine braking effect.

The low speed, medium speed and reverse rotation states which utilize a fixed speed change ratio are described first. Then the high speed and overdrive states are described.

I-1. Neutral State (FIG. 3): Output Ring Gear 46 and Overdrive System 50 are Stopped Input shaft 12 ↑ - Input sun gear 14 ↑ - Input differential

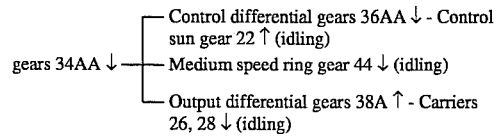

Figure 3:
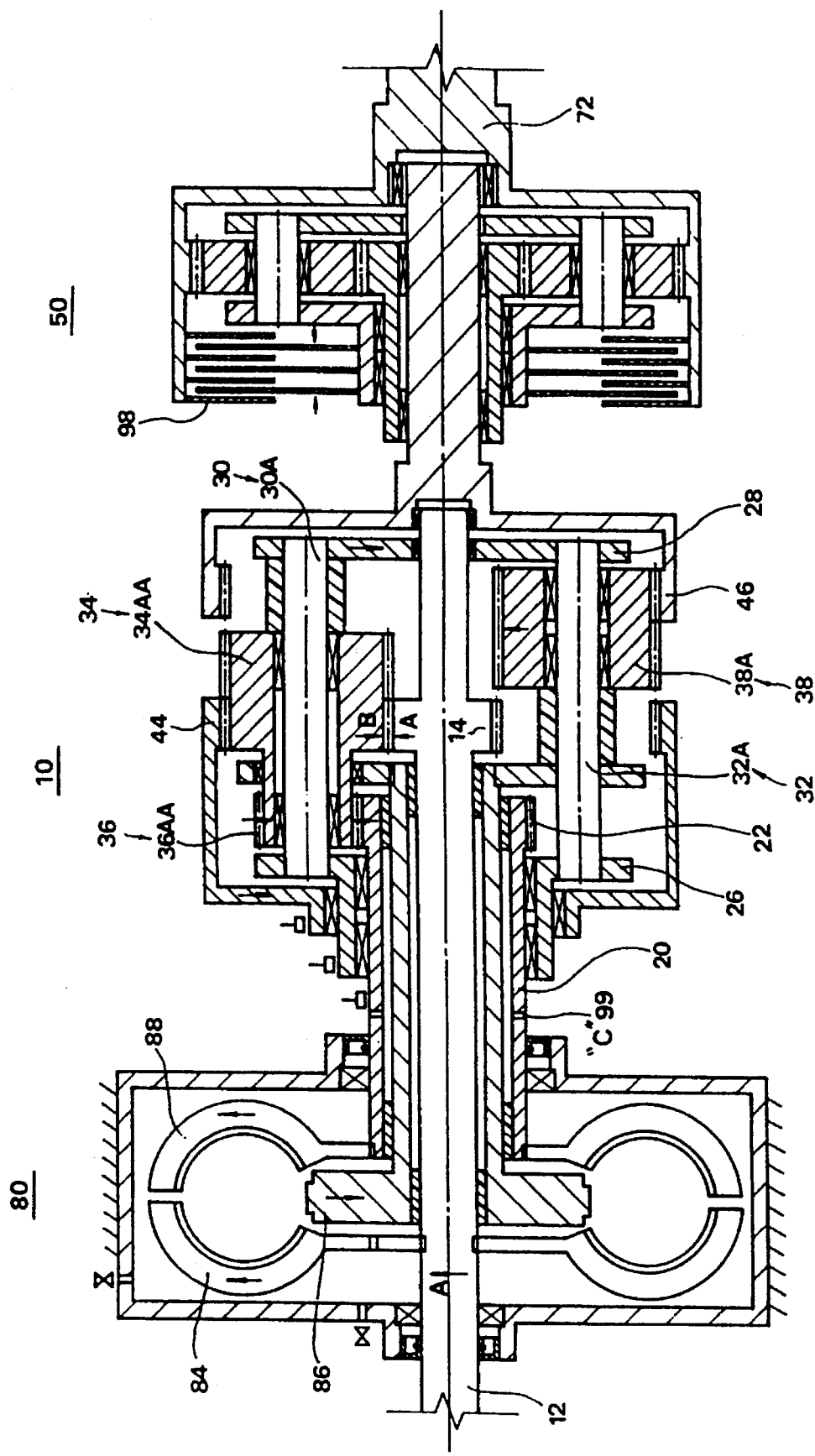
Figure 4:
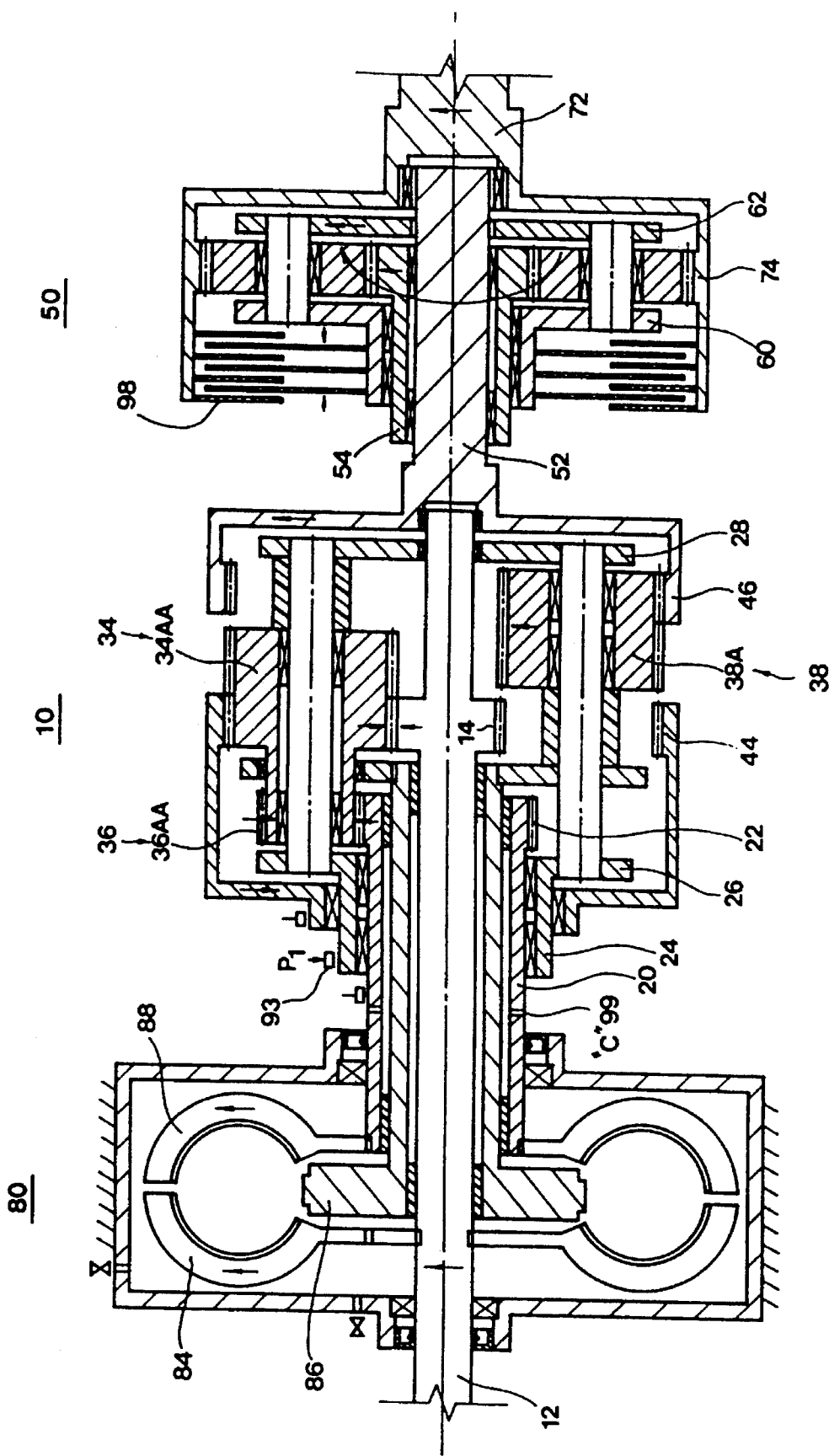
Figure 5:
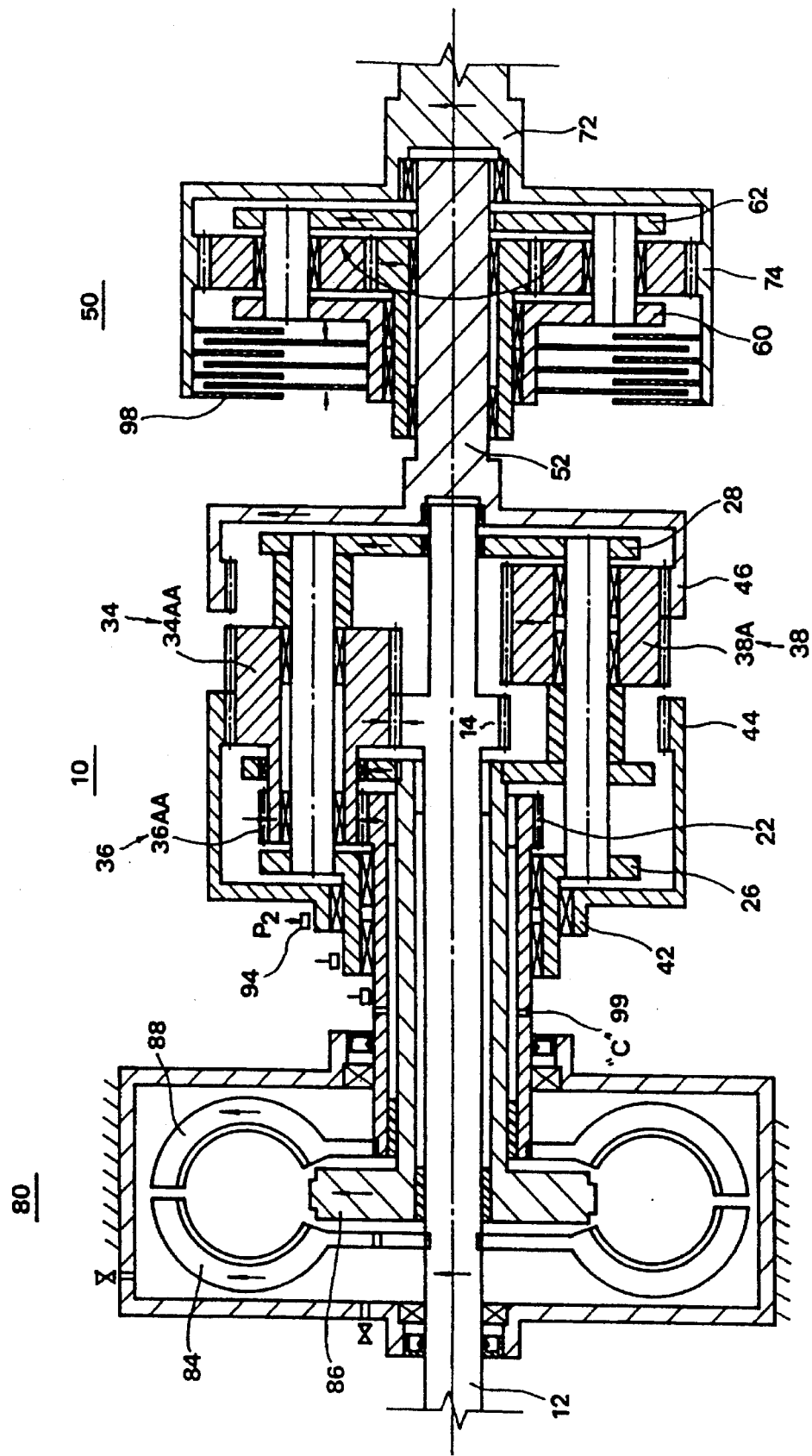
Figure 6:
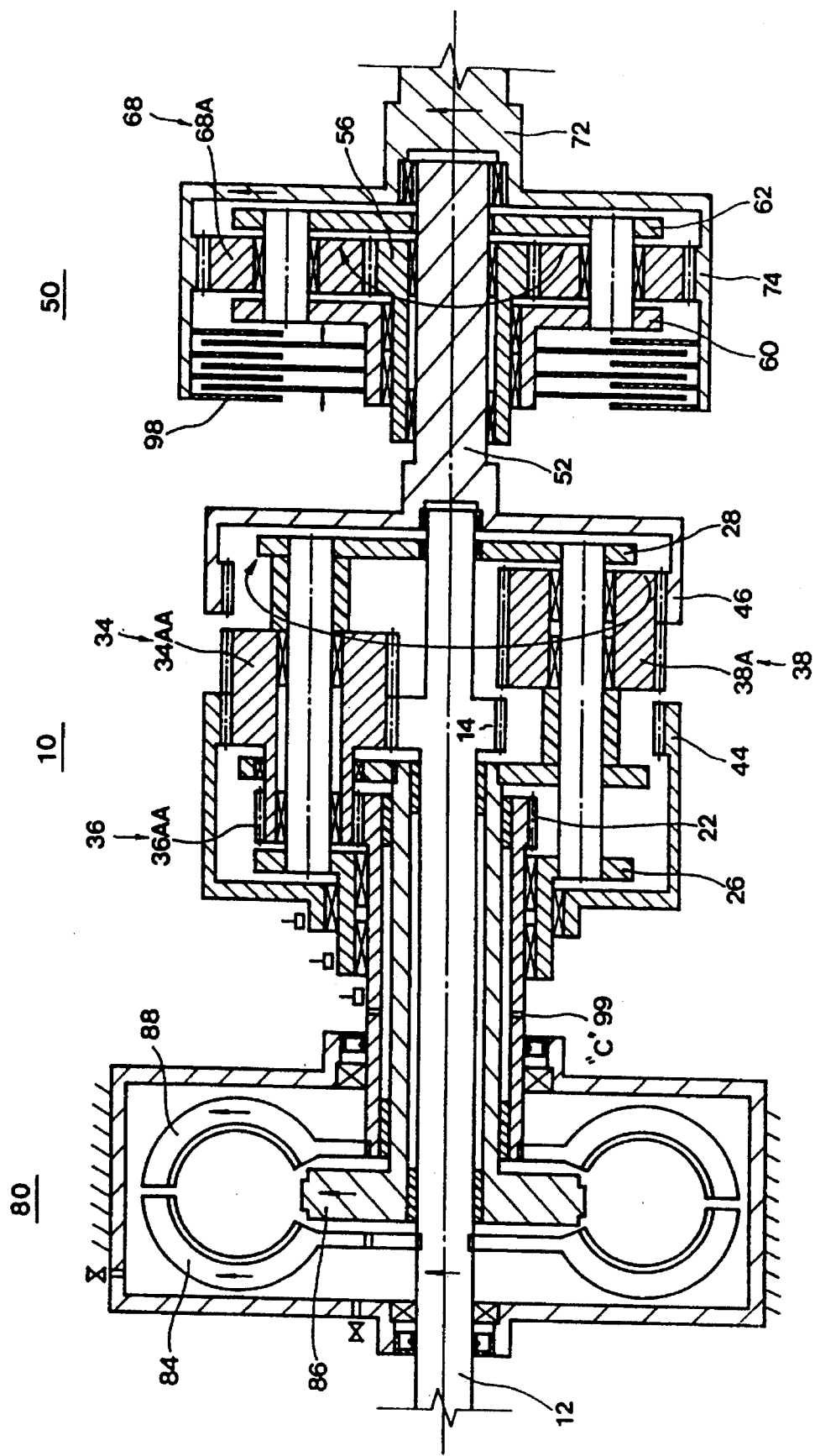
Figure 7:
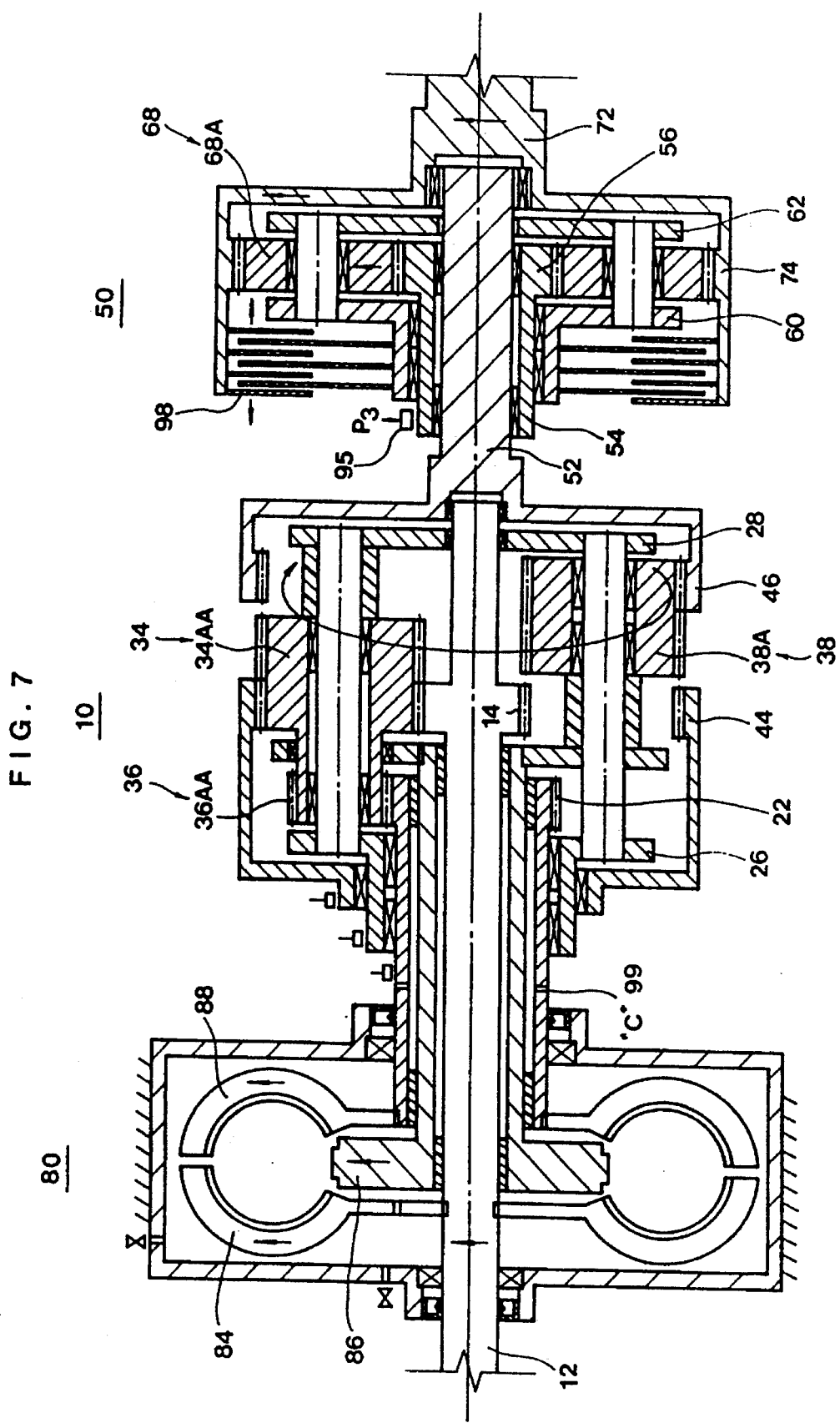
Figure 8:
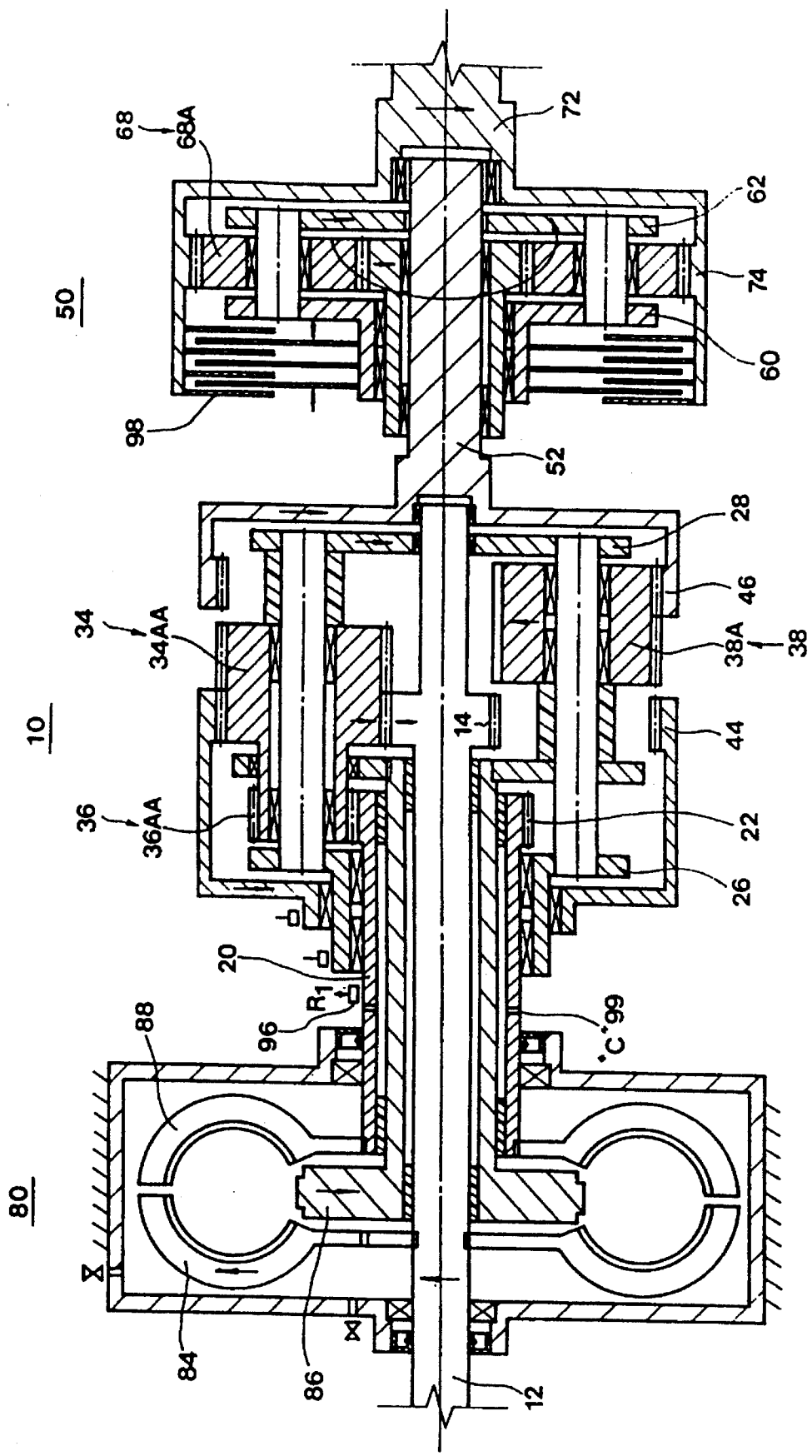

The neutral state is a state in which the driving force of the engine is not output to the output shaft 72 and the transmission idles as shown in FIG. 3. That is, where rotational force is input to the driving shaft of the engine where a load is applied to the output shaft 72, the input shaft 12 and the input sun gear 14 rotate in the same direction "A". As the input sun gear 14 rotates, the input differential gear 34AA meshed with the input sun gear 14 rotates about the locking pin 30A in direction "B". Accordingly, the control differential gear 36AA, the input differential gear 34AA, and the medium speed ring gear 44 rotate (that is, idling) in the direction "B", and the control sun gear 22 meshed with the control differential gear 36AA rotates (idling) in direction "A" which is the same as the input shaft 12.

The output differential gear 38A meshed with the input differential gear 34AA rotates in the direction "A", however, because the output ring gear 46 meshed with the output differential gear 38A is in the stationary state due to the load, the output differential gear 38A rotates about its own axis and at the same time revolves around the inside of the output ring gear 46, and therefore the carriers 26, 28 rotate (idling) in the direction "B".

Due to the rotation of the carriers 26, 28 in direction "B", each differential gear rotates and revolves in the direction as described above.

In this state, the rotational force which passes through the input shaft 12 cannot rotate the output shaft 72 which is stationary due to the load which inhibits rotation. Thus, the rotational input renders the control sun gear 22, the medium speed ring gear 44 and the carriers 26, 28 idle so as to be in neutral state, i.e. dissipate the rotational force input.

I-2. Low speed state (FIG. 4): Until the carriers 26, 28 are stopped.

When operating the speed change system 10, i.e. driving at a fixed ratio in the low speed state, medium speed state or reverse speed state, by using the brake means, the rotation of the turbine can be separated from the speed change system 10 by utilizing the clutch 99 on the "C" portion of the above described speed change control shaft 20. Therefore, an explanation of the operation condition of the speed change controlling system 80 is omitted.

During normal operation, the electromagnetic clutch 98 of the overdrive system 50 connects the terminal ring gear 74 and the carrier 60 such that the entire overdrive system 50 rotates as a unit, and therefore, the number of revolutions and the rotational direction are respectively the same for the output ring gear 46 and the output shaft 72. However, this rotational equivalence is not present during the overdrive state.

Input shaft 12↑—Input sun gear 14↑—Input differential gears 34AA↓—Output differential gears 38A↑—Output ring gear 46↑—Carriers 60, 62↑—of the Overdrive system—Terminal ring gear 74 and Output shaft 72↑

In the low speed state the rotation of the output shaft 72 is gradually increased from the neutral state. By applying a brake force P1 to the carriers by the low speed brake means 93 installed on the tube shaft boss 24 utilizing a one-way bearing which restrains the rotational direction, the rotation of the carriers 26, 28, which were rotating in a direction opposite to the rotation of the input shaft 12, gradually decreases and stops, and accordingly the rotation of the output shaft 72 is initiated and gradually increases in proportion to the rotational decrease of the carriers 26, 28.

That is, the rotation of the input differential gear 34AA and the control differential gear 36AA about their respective axes in direction "B", decreases proportionally to the decrease in the rotation of the carriers 26, 28 due to the application of the brake force P1, and the output differential gear 38A, meshed with the input differential gear 34AA, rotates in direction "A", which is the same direction as the input shaft rotation. At this time, the rotation of gear 38A about its own axis decreases relative to the neutral state, and then the output ring gear 46, meshed with the output differential gear 38A, rotates in the same direction "A". When the carriers 26, 28 are in stationary state, the output ring gear 46 rotates according to the fixed speed change ratio of only the rotational force of the output differential gear 38A about its own axis, i.e. there is no revolutions about the axis of the input shaft, since the carriers are stopped.

As the output ring gear 46 rotates, the carriers 60, 62 of the overdrive system rotate in direction "A", which is the same as the direction of the output ring gear 46, through the ring gear shaft 52 which is integrally formed with the output ring gear 46, and accordingly the terminal ring gear 74 and the output shaft 72 rotate in the same direction. At this time, because two elements (the terminal ring gear 74 and the carriers 60, 62) which can rotate independently as described above are connected to form an integral element, the overdrive system 50 rotates as a unit.

The medium speed ring gear 44 and the control differential gear 36AA rotate in direction "B", which is the same direction as the input differential gear 34AA, with the rate of rotation decreasing relative to the neutral state. For the control sun gear 22 which is rotating in the direction "A", the rate of rotation is increasing.

I-3. Medium speed (FIG. 5): Until the medium speed ring gear 44 is stopped.

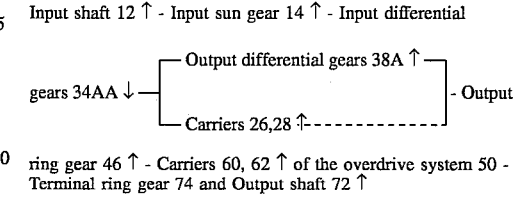

Input shaft 12 ↑ - Input sun gear 14 ↑ - Input differential gears 34AA ↓ — [Output differential gears 38A ↑ / Carriers 26,28 ↑] - Output ring gear 46 ↑ - Carriers 60, 62 ↑ of the overdrive system 50 - Terminal ring gear 74 and Output shaft 72 ↑

The medium speed state is used to increase the rotation of the output shaft 72 above that of the low speed state. Here the brake force P2 is applied by the medium speed brake means 94 installed on the tube shaft boss 42. This causes the rotation of the medium speed ring gear 44 which was rotating in direction "B", opposite to the input shaft 12, to gradually decrease to a stop. That is, as the rotation of the medium speed ring gear 44 slows, the rotation of the input differential gear 34AA about its own axis decreases as its revolutions around the inside of the medium speed ring gear 44 increases, and accordingly the carriers 26, 28, which were stopped in the low speed state, rotate in direction "A".

At the same time, the revolutionary force of the output differential gear 38A, meshed with the input differential gear 34AA, increases due to the rotational force of the carriers 26, 28 in direction "A" and the reduction in the rotational force of the input differential gear 34AA about its own axis.

Therefore, the output ring gear 46, meshed with the output differential gear 38A, rotates in direction "A" by being further accelerated due to the increase in the rotational force of the carriers 26, 28 and the revolutionary force of the output differential gear 38A. Carriers 60, 62 of the overdrive system 50 integral with the output ring gear rotate at the same rate and in direction "A", therefore the terminal ring gear 74 and the output shaft 72 rotate in the same direction.

By comparison, the control differential gear 36AA rotates in direction "B" about its own axis at a lower rate relative to the low speed state while the number of revolutions with the carriers increases. The control sun gear 22 rotates in direction "A" at a greater rate than in the low speed state.

Heretofore, the procedure of continuously varying the speed to low speed and medium speed and of transmitting the power to the output shaft 72 has been described. These states are accomplished with the fixed speed change ratio making for easy operation of the engine as a braking means.

I-4. Reverse Rotation State (FIG. 8): Speed Change Control Shaft 20 and Control Sun Gear 22 are Stopped

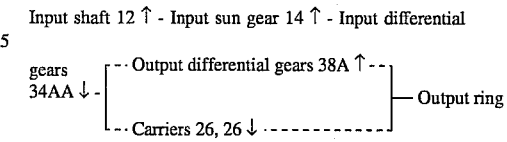

Input shaft 12 ↑ - Input sun gear 14 ↑ - Input differential gears 34AA ↓ - [-- Output differential gears 38A ↑-- / -- Carriers 26, 26 ↓ ] — Output ring gear 46 ↓ - Carriers 60, 62 ↓ of the overdrive system - Terminal ring gear 74 and Output shaft 72 ↓ (opposite direction to the input shaft)

In the reverse rotation state the output shaft 72 rotates in a direction opposite to the rotational direction of the input sun gear 14. Here the brake force R1 is applied by the reverse rotation brake means 96 installed on the speed change control shaft 20 to control sun gear 22. This causes the control sun gear 22 to gradually stop and the output ring gear 46 to rotate in the direction opposite to that of the input sun gear 14.

That is, as the rotation of the control sun gear 22 gradually decreases and stops because of the brake force R1, the rotations of the control differential gear 36AA about its axis and the number of its revolutions about the control sun gear 22 increase. Therefore, the rotations of the carriers 26, 28 which rotate in direction "B" increase. At the same time, the rotation and the revolutions of the input differential gear 34AA, which is integral with the control differential gear 36AA, also increase in direction "B".

The rotation of the output differential gear 38A, meshed with the input differential gear 34AA, increases in direction "A" and its revolution about the axis of the input shaft increases in direction "B", together with the carriers 26, 28. Therefore, the output ring gear 46, meshed with the output differential gear 38A, rotates in direction "B" opposite to the input sun gear 14.

At this time, because the influence of the rotational force of the carriers 26, 28 rotating in direction "B" is greater than that the rotational force of the output differential gear 38A rotating in direction "A", the output ring gear 46 rotates in direction "B", and the overdrive system 50 rotates as a unit in direction "B" via carriers 60, 62 of the overdrive system 50 integrally connected to the output ring gear 46.

By comparison, the rotation of each gear in the reverse rotation is increased relative to the rate of rotation in the neutral state with the exception of the control sun gear 22.

Heretofore, the fixed speed change ratio which can obtain maximum engine braking effect with only the operation of the speed change system 10, i.e. not engaging the control of the speed change controlling system 80 by utilizing the conventional clutch 99 on the "C" portion of the speed change control shaft 20 to couple system 80, is described above for the low speed, medium speed, reverse rotation states, respectively.

An explanation follows concerning the method of operation and the state of using the stepless automatic speed change system to obtain the maximum driving comfort and the most economical driving force by controlling the rotation of the control sun gear 22 via the speed change control shaft 20 by coupling the speed change controlling system 80 and the speed change system 10 via the clutch 99 installed at the "C" portion of the speed change control shaft 20 to engage the speed change controlling system 80.

The explanation of transmitting the power to the input sun gear 14 of the speed change system 10 is as it is described above.

I-A. Neutral state (FIG. 3)

Input shaft 12↑—Impeller 84↑—Turbine 88↑—Control sun gear 22↑—Control differential gears 36AA↓(idling)

When the output shaft 72 is stationary due to the load, part of the driving force of the engine rotates the impeller 84 of the speed change controlling system 80 via the input shaft 12 in the same direction "A" and at the same speed, and because the blades of the impeller 84 rotate together with the fluid, the fluid discharged from the blades strikes the blades of the turbine 88 installed to face the impeller and the rotational force transmitted as such tends to increase the rotation of the turbine 88 in the same direction "A". However, when the output shaft 72 is stationary due to the load and the engine is idling at low revolutions per minute, the fluid discharged from the impeller 84 does not exert sufficient force to increase the rotation of the turbine 88, so that the turbine 88 slips.

In other words, reviewing the rotation of the turbine 88 which slips in direction "A", the turbine 88 is rotated not by the force of the fluid discharged from the impeller 84 but by the influence (load) of the control differential gear 36AA via the control sun gear 22 and the speed change control shaft 20 since the clutch has coupled the shaft 20.

As described above, when the engine is idling at low revolutions per minute, the fluid discharged from the impeller 84 of the speed change controlling system 80 cannot exert a force capable of rotating the turbine 88 to control the rotation of the control differential gear 36AA, so that the output shaft 72 remains in the stationary state.

I-B, Low speed state (FIG. 4): Until the carriers 26, 28 are stopped

Input shaft 12 ↑ - ┌- - Impeller 84 ↑ - Turbine 88 ↑ - Control
                   └- - Input sun gear 14 ↑ . . . Input differential sun gear 22 ↑ - Control differential gears 36AA ↓ - - ┐
                                                       ├ - Output
gears 34AA ↓ . . . Carriers 26, 28 ↓ , 0 ─────────────┘ differential gears 38A ↑ - Output ring gear 46 ↑ - Overdrive system 50 and Output shaft 72 ↑ ( ↓ . 0 denotes a direction until the carriers 26, 28 are stopped)

Since the low speed state is described in detail at "I-2", above, an explanation is given only as to when the carriers 26, 28 are stopped and the other state is not described for it is same as the state "I-2".

In the low speed state the rotation of the output shaft 72, which was stopped in the neutral state, is gradually increased, and if the rotational speed of the engine is gradually increased, the speed of the impeller 84 increases. Thus, the force of the fluid discharged against the turbine 88 increases, with the result that the rotation of the turbine 88 gradually is initiated and increased from the slip state in the neutral state. Consequently, the rotation of the output shaft 72 gradually increases in proportion to the increase of the rotation of the turbine 88.

That is, if the force of the engine is increased from the state at which the turbine 88 slips, the force of the fluid discharged from the impeller 84 increases, and the rotation of the turbine 88 rotating in direction "A" is increased up to a speed change point at which the rotation of the turbine 88 and the load of the output shaft 72 are in a state of equilibrium. Therefore, the speed change control shaft 20 and the control sun gear 22, integrally connected to the turbine 88, control the rotation of the control differential gear 36AA rotating in direction "B", and this control force gradually decreases the rotation of the carriers 26, 28 rotating in direction "B" ultimately stopping the carriers 26, 28.

The state in which the carriers 26, 28 are stopped as described above is the same as the state in which the carriers 26, 28 are stopped by applying the brake force P1 by the low speed brake means 93 as described in detail in the state "I-2".

As described above, when part of the input power rotates the impeller 84 of the speed change controlling system 80 which in turn results in the rotation of the turbine 88 integral with the control sun gear 22, if the load of the output shaft 72 is larger than the input driving force, then the rotation of the control sun gear 22 is decreased, and if the load of the output shaft 72 is smaller than the input driving force, then the rotation of the control sun gear 22 is increased, so that optimum speed change ratios can be obtained to always reach equilibrium.

I-C. Medium Speed State (FIG. 5): Until the Medium Speed Ring Gear 44 is Stopped

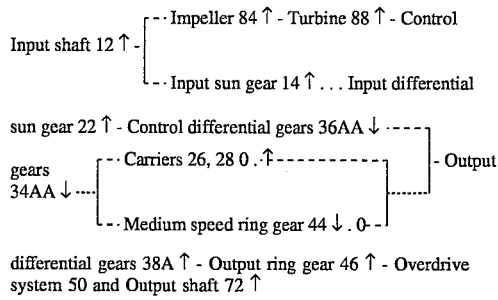

differential gears 38A ↑ - Output ring gear 46 ↑ - Overdrive system 50 and Output shaft 72 ↑

Because the medium speed state is described in detail at "I-3", above, an explanation is given only until the medium speed ring gear 44 is stopped, and the remaining state is as described for state "I-3".

In the medium speed state the rotation of the output shaft 72 is further increased from the low speed state. Thus, if the rotational speed of the engine is increased from the low speed state, the carriers 26, 28, which were stationary, now rotate in direction "A", the same as the input shaft 12. Therefore the rotation of the medium speed ring gear 44, which was rotating in direction "B", decreases from the low speed state and stops.

The state in which the medium speed rig gear 44 is stopped as described above is the same as the state in which the medium speed ring gear 44 is stopped by applying the brake force P2 by the medium speed brake means 94 as described in detail in the state "I-3".

The rotation of the output shaft 72 is increased in proportion to the reduction in the rotation of the medium speed ring gear 44 and the rotational force of the carriers 26, 28. That is, the rotation of the control sun gear 22 increases due to the increase in the rotational force of the turbine 88. Accordingly, the rotation of the control differential gear 36AA about its own axis decreases, while the revolutions of the carriers 26, 28 increase, and due to the revolutionary force, the rotation of the output differential gear 38A in direction "A" is also decreased, while the revolutions of the output differential gear 38A increase, so that the rotation of the output ring gear 46 meshed with the output differential gear 38A accelerates.

I-D. High Speed State (FIG. 6): Until the rotation ratio of the input shaft and the output shaft becomes 1:1

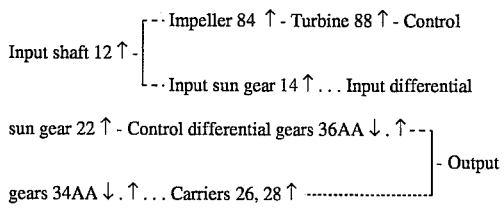

-continued differential gears 38A ↑ - Output ring gear 46 ↑ - Overdrive system 50 and Output shaft 72 (rotating at the ratio 1:1)

In the high speed state the rotational speed of the output shaft is accelerated from the medium speed state. Here the rotational speed of the engine is further accelerated relative to the medium speed state causing the medium speed ring gear 44, which was in a stationary state, to rotate in direction "A", for a while, and then the medium speed ring gear 44 rotates together with the input differential gear 34AA.

In this state, the rotational force of the input shaft 12 is divided into two paths. One path for transmitting the rotational force to the input differential gear 34AA by rotating the input sun gear 14, the other path for transmitting the rotational force to the control differential gear 36AA by rotating the turbine 88 via the input shaft 12 and the impeller 84 and at the same time by rotating the control sun gear 22.

At this time, the force of the fluid discharged from the impeller 84 increases due to the increase in the rotational speed of the engine. Accordingly, the turbine 88 slips a little against the impeller 84 for a while to rotate at a speed change point corresponding to a running resistance value and then the turbine 88 rotates at the same speed as the impeller 84, and this rotation is input to the control differential gear 36AA via the control sun gear 22. And rotational force is input to the input differential gear 34AA via the input sun gear 14, that is, because the same rotational forces are applied to the two integral gears 34AA, 36AA, they cannot rotate about their own axes but can only revolve together with the carriers 26, 28.

In this state, the total body (10) forms a rotating body with the two sun gears 14, 22 as a center so as to be rotated in direction "A", and because all the differential gears have no rotational force about their own axes, further speed change points cannot be formed, and therefore the rotational force of the engine directly drives the output shaft 72.

I-E. Overdrive State (FIG. 7): Until the overdrive sun gear 56 of the overdrive system is stopped

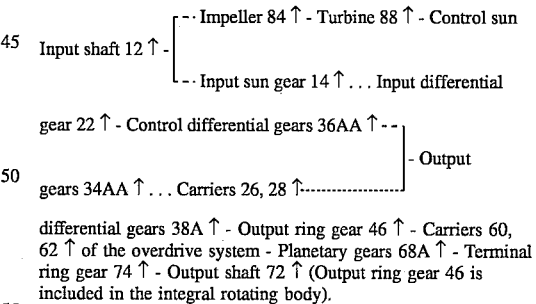

differential gears 38A ↑ - Output ring gear 46 ↑ - Carriers 60, 62 ↑ of the overdrive system - Planetary gears 68A ↑ - Terminal ring gear 74 ↑ - Output shaft 72 ↑ (Output ring gear 46 is included in the integral rotating body).

In the overdrive state the output rotational speed is accelerated up to a predetermined gear ratio greater than the output rotational speed in the high speed state. In operation, when the electromagnetic clutch 98 of the overdrive system 50 is released during tile above described high speed state and the brake force P3 is applied by the overdrive brake means 95 installed on the overdrive control shaft 54, the overdrive sun gear 56, which rotated in direction "A", stops. That is, as the overdrive sun gear 56 stops, the planetary gears 68 rotate in direction "A" and at the same time revolve around the overdrive sun gear 56 together with the carriers 60, 62. Therefore the terminal ring gear 74, meshed with the planetary gears 68, and the output shaft 72 are in an overdrive condition and rotate according to the rotation of the carriers 60, 62. The gear ratio is dependent according to the number of teeth of the planetary gears 68.

Figure 9:
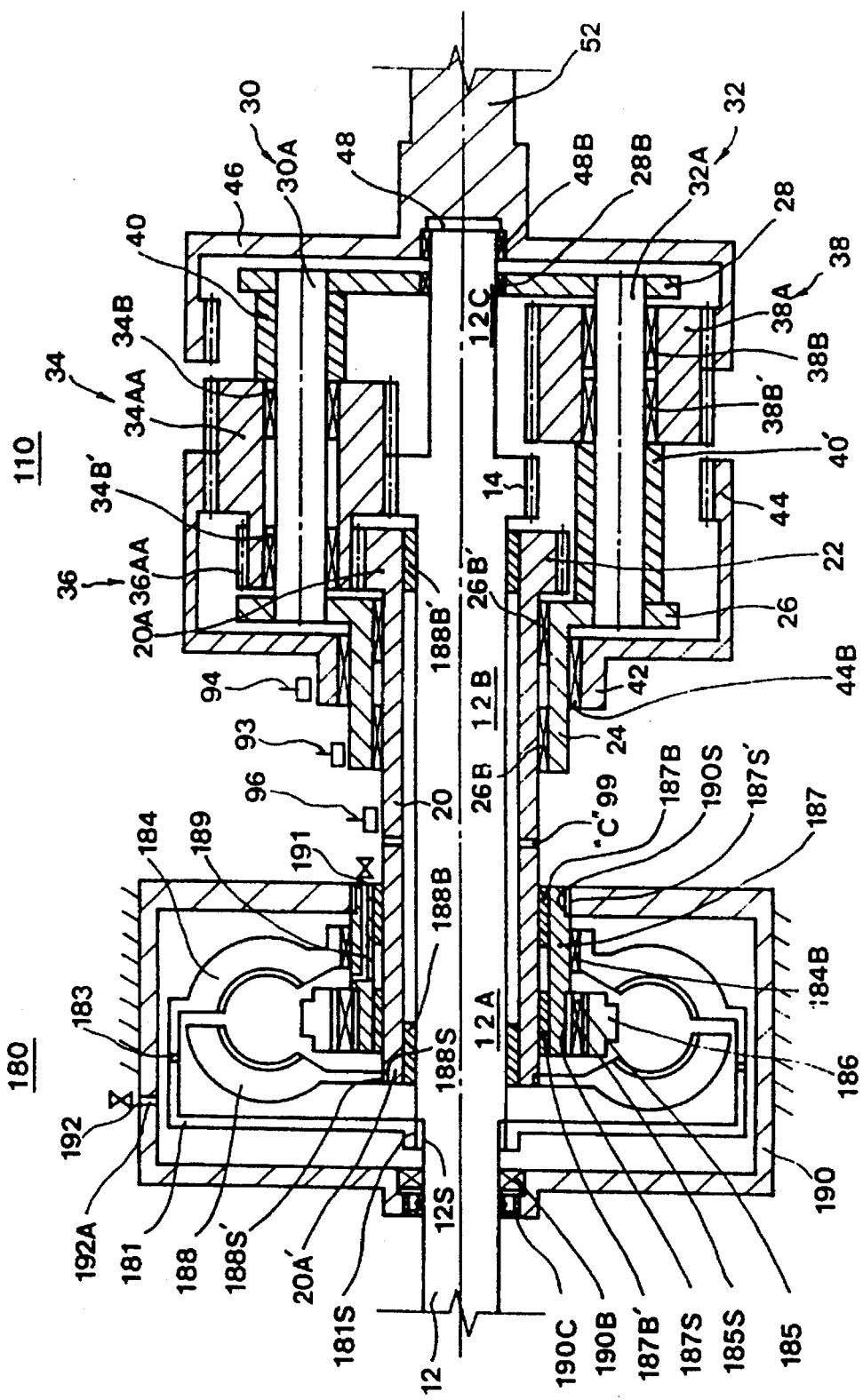
FIG. 9 is a sectional view of the second embodiment of the stepless automatic variable transmission according to the present invention.

A description of the second embodiment of the stepless automatic variable transmission of the present invention combines the speed change system 110, speed change controlling system 180 and overdrive system 50 with reference to FIG. 9 follows.

The construction of the speed change system 110 in the stepless automatic variable transmission 100 is the same as that of the speed change system 10 of the first embodiment. Accordingly, the reference numerals for each of the illustrated elements are same as those of the speed change system 10. However, in this embodiment the support shaft 16 and the support plate 18 for fixing the stator 86 are removed. In addition, the operation method and the operation state of the speed change system 110 of the second embodiment are same as for the speed change system 10 of the first embodiment, therefore a description thereof is omitted. Also the construction of the overdrive system 50 is the same as that of the first embodiment, and therefore a description of the overdrive system 50 is omitted.

The construction of the speed change controlling system 180 of the second embodiment is the one to which the speed change controlling system 80 is applied. However, the relative positions of the impeller 84 and the turbine 88 are changed. Nevertheless, the operation method and the operation state in which the speed is changed steplessly and automatically are same as for the first embodiment. Therefore a detailed description thereof is omitted, and only the construction of the speed change controlling system 180 is presented.

SPEED CHANGE CONTROLLING SYSTEM 180

The speed change controlling system 180 utilizes a torque converter of the automatic transmission, which is a well known apparatus. However, the conventional device is modified so as to perform in the present invention. Accordingly, a detailed description thereof is omitted, and a description of only that portion which has been modified and improved so as to adapt it for use in the present invention with the speed change system 110 is presented.

As described above, the rotational force of the turbine 188 is only for controlling the rotation of the control sun gear 22, and the method of circulating the fluid is a natural circulation type, i.e. not requiring a pump. A fixed housing 190 is used to contain the fluid for circulation.

As shown in FIG. 9, a cover 181 is secured to the first section 12A of the input shaft 12, the input shaft 12 passes through the middle of the cover 181, a spline hub 181S is coaxially formed in the cover 181 which meshes with the splines 12S formed in the input shaft 12 so that the cover 181 can be rotated integrally with the input shaft 12. The cover 181 is connected to the impeller 184 by a weld or a dog clutch at the periphery of the cover 181 so that the cover rotates integrally with the impeller 184. An optimum number of fluid outlets 183 are formed on the periphery of the cover 181 to permit the flow of fluid therethrough.

To secure the turbine 188 to the end 20A' of the speed change control shaft 20 splines 188S are formed on the speed change control shaft 20 to receive the coaxial splined hub 188S' formed in the turbine 188 to enable the turbine 188 and the speed change control shaft 20 to rotate simultaneously. Bushings 188B, 188B' are used to ensure that the input shaft 12 independently rotates relative to the speed change control shaft 20 coaxially positioned thereon.

At the time of installation, the impeller 184 and the turbine 188 are installed facing each other in such a manner so as to be spaced apart only a very small distance but sufficiently apart to permit rotation without direct mechanical engagement, i.e. contact. This distance is that conventionally used in this device. A stator 186 is positioned between the impeller 184 and the turbine 188 and secured to a one-way bearing 185 having a coaxial formed splined hub 185S for receiving the splines 187S formed on the hollow fixed shaft 187.

Bushings 187B, 187B' are used to ensure that the speed change control shaft 20 rotates independently relative to the hollow fixed shaft 187. A bearing 184B secures the fixed shaft 187 to the impeller 184 to permit independent rotation of the impeller 184. A fluid inlet 191 in fluid communication with a fluid passageway 189 are formed in the fixed shaft 187, with the fluid passageway 189 terminating between the stator 186 and the impeller 184 to permit circulation of the fluid of the speed change controlling system 180, as illustrated in FIG. 9.

The housing 190, for containing the fluid, is secured to the fixed shaft 187 by means of a splined hub 190S formed therein which receives the splines 187S' of the fixed shaft 187. The housing encloses the speed change control system 180 and includes a fluid outlet 192 with a passageway 192A formed therein to enable fluid to pass therethrough. A bearing 190B is used so that the input shaft 12 can rotates freely within the housing 190. A fluid-seal 190C is also used to prevent leakage of the fluid. The housing 190 is secured against rotation by an external fixing means.

A description of the third embodiment of the stepless automatic variable transmission of the present invention combines the speed change system 310, overdrive system 360 and speed change controlling system 380 with reference to FIGS. 10–16 follows.

SPEED CHANGE SYSTEM 310

Figure 10:
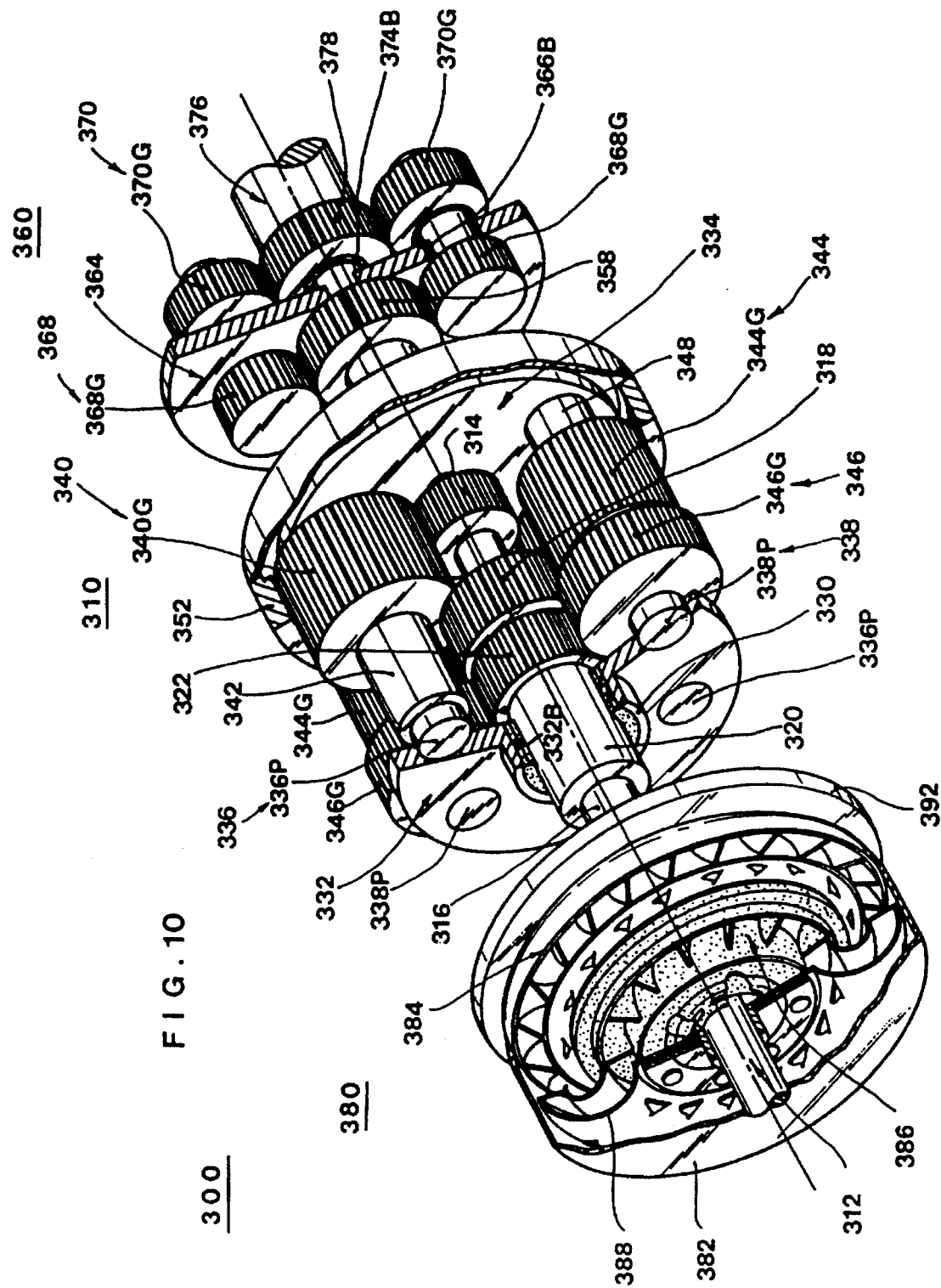
FIGS. 10–16 illustrate the third embodiment of the stepless automatic variable transmission according to the present invention.
Figure 11:
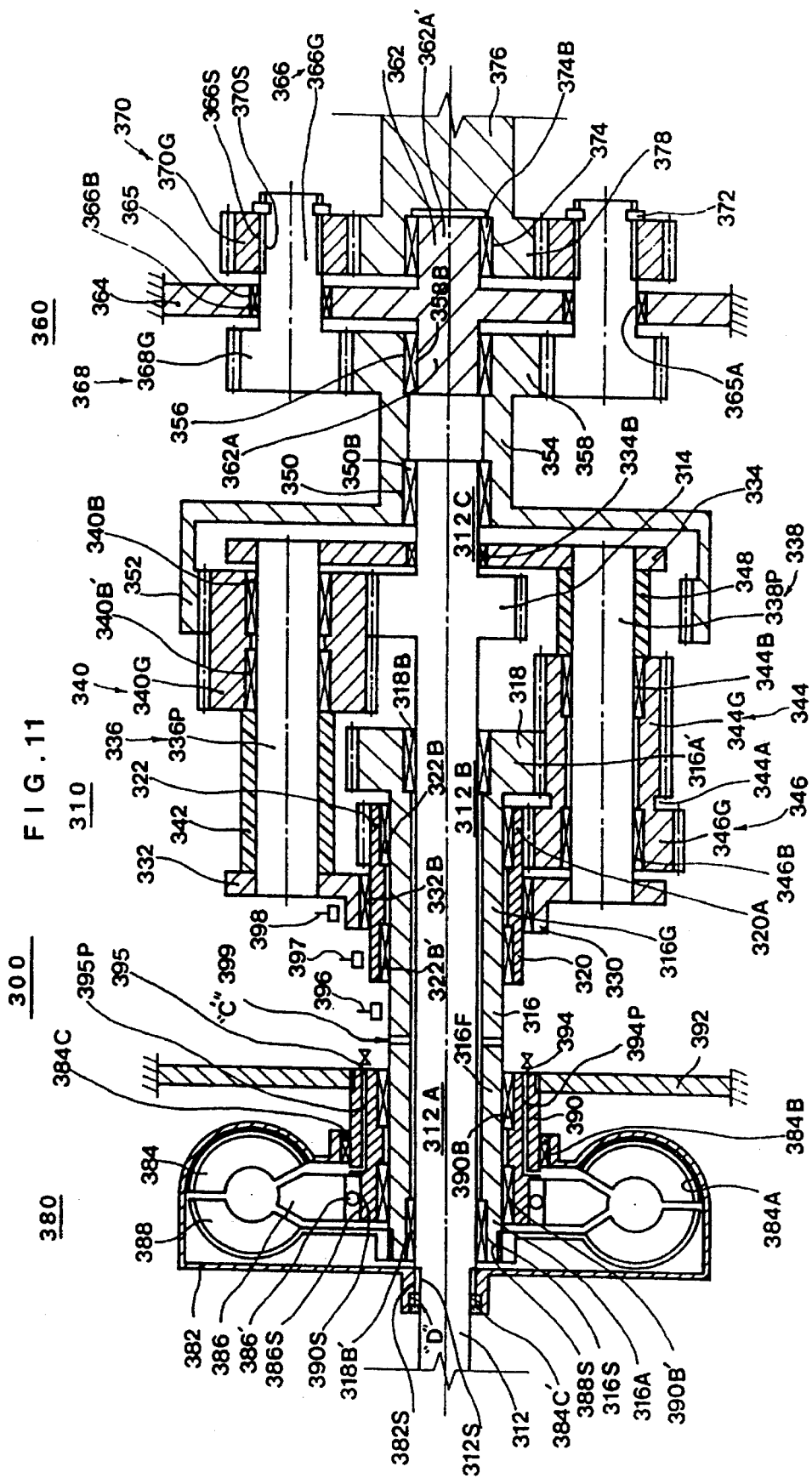

The stepless automatic variable transmission 300 of the third embodiment of the present invention includes, as shown in FIGS. 10 and 11, an input shaft 312 for receiving the rotational driving force from the driving shaft of the engine. The input shaft 312 consists of a first section 312A, a second section 312B and a terminal end 312C, with an input sun gear 314 formed integrally on the input shaft 312 between the second section 312B and the terminal end 312C. The control shaft 316, with a control sun gear 318 formed at one end 316A' of the control shaft 316, is rotatably and coaxially mounted on the first section 312A of the input shaft 312. Splines 316S are formed at end 316A of the control shaft 316 to engage the coaxial splined hub 388S of the turbine 388 to enable the control shaft 316 to be rotated simultaneously with the turbine 388 of a speed change controlling system 380. Bearings 318B, 318B' are used to ensure that the input shaft 312 and the control shaft 316 can rotate independently. The, medium speed control shaft 320 with a medium speed sun gear 322 formed at one end 320A of the medium speed control shaft 320, is rotatably and coaxially positioned on the control shaft 316. Bearings 322B, 322B' are used to ensure that the control shaft 316 and the medium speed control shaft 320 can independently rotate.

The carrier 332 having a tube shaft boss 330 is rotatably positioned on the medium speed control shaft 320 proximate the medium speed sun gear 322 with a bearing 332B to ensure that the carrier 332 and rye medium speed control shaft 320 can rotate independently. The carrier 334 is positioned proximate the terminal end 312C of the input shaft 312. Bearing 334B ensures that the carrier 334 and the terminal end 312C can rotate independently. Each of the plurality of locking pins 336, 338 interlink and secure the two carriers 332, 334 together to ensure that both the carriers 332, 334 rotate simultaneously, as see FIG. 10. A plurality of input differential gears 340, control differential gears 344 and medium speed differential gears 346 are used.

Each input differential gear 340G of the plurality of input differential gears 340 is coaxially positioned on a locking pin 336P with bearings 340B, 340B' to ensure independent rotation about the locking pin. The inner side of the rear half of each input differential gear 340G is meshed with the input sun gear 314. A spacing ring 342, or the like, may be positioned on the locking pin to prevent axial movement of the input differential gear 340G, as see FIG. 11.

The control differential gears 344G and the medium speed differential gears 346G are of different sizes, respectively, and are spaced apart 344A a predetermined distance on locking pin 338P, as see FIG. 11. Differential gears 344G, 346G are rotatably positioned on each locking pin 338P via bearings 344B, 346B to ensure independent rotation of the gears 344G, 346G about the locking pin 338P. The rear half of each control differential gear 344G of the plurality of control differential gears 344 is meshed with the forward half of one of the input differential gears 340G of the plurality of input differential gears 340, respectively. The inner side of each forward half of each control differential gear 344G is meshed with the control sun gear 318. Each medium speed differential gear 346G is meshed with the medium speed sun gear 322. The spacing ring 348 prevents axial movement of the composite differential gears 344G, 346G.

Here, locking pin 336P, input differential gear 340G and spacing ring 342, or the like, form a set. Likewise, locking pin 338P, control differential gear 344G, medium speed differential gear 346G and spacing ring 348 form a set. Two of each such sets are preferably used to impart stability in the body during rotation. However, as is appreciated by those skilled in the art, there is no limitation as to the number of sets.

The outer side of the rear half of the input differential gear 340G is meshed the output ring gear 352 which terminates in a ring gear shaft 354 which has an axial bore 350 formed therein to rotatably receive the terminal end 312C of the input shaft 312. Bearing 350B is positioned between the bore 350 and the terminal end 312C of the input shaft to ensure that the output ring gear 352 can rotate thereabout.

OVERDRIVE SYSTEM 360

The output ring gear 352 includes an axially positioned ring gear shaft 354 with the ring gear shaft 354 terminating in a link gear 358. The link gear 358 transmits rotational output from the speed change system 310 to the overdrive system 360 and further includes an axial bore 356 formed therein. The axial bore 356 rotatably receives the first end 362A of the plate shaft 362. The plate shaft 362 includes a fixed plate 364 coaxially formed thereon with the plate shaft having a first end 362A and a second end 362A'. Holes 365, 365A are formed in the fixed plate 364. A bearing 358B is positioned into the axial bore 356 of the link gear 358 to ensure that the link gear 358 rotates freely about the first end 362A of the plate shaft 362.

A plurality of overdrive gears 368 and transmitting gears 370 are used in the overdrive system. Each overdrive gear 368G is integrally formed with each transmitting shaft 366G of a plurality of transmitting shafts 366 with the overdrive gear thereof meshed with the link gear 358, as see FIG. 11. Each hole 365, 365A formed in the fixed plate 364 securely and rotatably receives the transmitting shaft 366G therethrough, to enable the transmitting shaft 366G to rotate within each respective hole, such that each overdrive gear meshes with the link gear 358. After being rotatably and securely mounted on the fixed plate 364, a transmitting gear 370G is secured thereto. Each transmitting shaft 366G includes splines 366S formed thereon to engage the coaxial splined hub 370S of the transmitting gear 370G to ensure simultaneous rotation with the transmitting shaft. A stop ring 372, or the like, is used to secure the transmitting gear 370G to the transmitting shaft 366G. A bearing 366B is positioned in each hole 365, 365A of the fixed plate 364 to ensure that each transmitting shaft 366G rotates freely within the respective hole 365, 365A.

The output shaft 376 includes an output gear 378 with an axial bore 374 formed therein to rotatably receive the second end 362A' of the plate shaft 362 to ensure that the output shaft rotates freely about the plate shaft. The output gear 378 is meshed with each transmitting gear 370G. A bearing 374B is positioned into the axial bore 374 of the output gear 378 to ensure that the output shaft 376 rotates freely about the second end 362A' of the plate shaft 362. The fixed plate is secured against rotation, as see FIG. 11.

Here again, a transmitting shaft 366G, an overdrive gear 368G and a transmitting gear 370G together form a set, and, for reason of stability two sets are used. However, there is no limitation to the number of such set, as appreciated by those skilled in the art.

SPEED CHANGE CONTROLLING SYSTEM 380

The speed change controlling system 380 utilizes a conventional torque converter as presently used in automatic transmissions. Accordingly, a detailed description thereof is omitted, and a description of only that which has been modified and improved so as to adapt it for use in the present invention with the speed change system 310 is discussed herein.

Splines 312S are formed on the first section 312A of the input shaft 312 to engage the coaxial splined hub 382S of the disk shaped cover 382 to ensure that the disk shaped cover 382 rotates simultaneously with the input shaft 312. A fluid-seal 384C' is installed on the input shaft 312 proximate the splined hub 382S of the disk shaped cover 382 to prevent loss of fluid therefrom. The disk shaped cover 382 further includes an internal surface 384A with a plurality of impeller blades 384 secured thereto, by any suitable means such as welding, to enable simultaneous rotation with the disk shaped cover 382. The disk shaped cover 382 is rotatably secured to the fixed shaft 390 and fully encloses the impeller 384, turbine 388 and stator 386, as see FIG. 11. Bearing 384B is used to ensure that the disk shaped cover 382 freely rotates about the fixed shaft 390, and the impellets 384 mounted to the interior surface of the housing. Fluid-seals 384C are positioned proximate the bearings 384B to prevent the loss of fluid from the disk shaped cover 382.

The turbine 388 includes a coaxial splined hub 388S formed therein to engage the splines 316S formed on the control shaft 316 which is coaxially and rotatably mounted on the input shaft 312 to ensure simultaneous rotation of the control shaft 316 and the turbine 388 about the input shaft 312. The impeller 384 and the turbine 388 are positioned facing each other in such a manner so as to be spaced apart by only a very small distance, yet sufficiently apart to permit rotation without direct mechanical engagement, i.e. contact, as see FIG. 11.

The fixed shaft 390 is coaxially and rotatably positioned on the control shaft 316 and includes a fixed plate 392 mounted thereon and which is secured to prevent rotation of the fixed shaft 390. The stator 386 is positioned between the impeller 384 and the turbine 388 and mounted on a one-way bearing 386'. The one-way bearing includes a coaxial splined hub 386S formed therein to engage the splines 390S of the fixed shaft 390 to secure the one-way bearing 386' against rotation about the fixed shaft 390, i.e. to permit the one-way bearing to enable rotation in a single direction. Bearings 390B, 390B' are used to ensure that the control shaft 316 rotates freely within the fixed shaft 390. Fluid inlet and outlet passageways 394P, 395P, respectively, are formed in the fixed shaft 390, with each of the fluid passageways terminating between the stator 386 and the impeller 384 to permit, in use, circulation of the fluid of the speed change controlling system 380, as see FIG. 11. Fluid passageways 394P, 395P each include an inlet 394 and outlet 395, respectively.

The speed change controlling system 380 constructed as described above is characterized in that a speed change point can be obtained where a part of the power of the engine controls the rotation of the turbine 388 through the impeller 384, that is, the driving force of the engine and the drive resistance of the output shaft 376 can always be in a state of equilibrium.

A modification may be made in the event rapid starting or increased engine braking is desired by adding to the speed change controlling system a means to selectably control, in use, the rotation of the control sun gear 318 of the speed change system 310.

In one example, the control shaft 316 is cut or severed to form a first control shaft 316F and a second control shaft 316G with a clutch 399 functionally positioned therebetween to control the rotation of the control sun gear 318 of the speed change system 310, i.e. to enable the engagement and disengagement of the speed controlling system 380. Referring to FIG. 11, a clutch 399 would be installed where the control shaft 316 has been severed, i.e. at point "C"' of the control shaft 316, to permit engagement and disengagement as desired. Another way to achieve this would be not use either the splines 312S formed on the first section 312A of the input shaft 312 or the coaxial splined hub 382S of the disk shaped cover 382 thereby permitting the disk shaped cover 382 and the control sun gear 318 to rotate freely and install a clutch 399 at "D" to permit engagement and disengagement as desired of the input shaft and the cover.

Because the driving mode using the speed change system and its brake means, as described above, is a speed interval where the fixed speed change ratio is needed from the low speed to the medium speed, the speed change controlling system 380 is not used. That is, to change the speed as described above, brake means are operatively positioned at certain locations in the speed change system 310, as see FIGS. 13–16, and activated to change the speed. The fixed speed change ratio results by applying a brake force. That is, the low speed brake means 396, using a one-way bearing which restrains the direction of rotation, is installed on the control shaft 316 to stop the control sun gear 318 when rapid starting is desired. A medium speed brake means 397 is installed on the medium speed control shaft 320 to control the medium speed sun gear 322 when medium speed is desired. A reverse rotation brake means 398 is installed on the tube shaft boss 330 to stop the carriers 332, 334 when reverse rotation of the output shaft is desired.

The braking method used in this embodiment is the same as that described for the first embodiment.

It is a characteristic of the present embodiment that the fixed speed change ratio can be obtained with a speed change controlling system 380 and a speed change system 310. Further, the stepless automatic speed change method of the present invention automatically selects new speed change ratios to constantly maintain a state of equilibrium in accordance with the driving force of the engine and the load of the output shaft 376 which varies continuously.

A description of the operation to achieve a speed change state according to the third embodiment follows for the neutral, low, medium, high and reverse rotation states, respectively.

The rotational force input passes through the input shaft 312 and is divided into two paths. In one path (stepless automatic speed change) the rotational force is transmitted to the impeller 384 of the speed change controlling system 380. In the other path (fixed speed change) the rotational force is transmitted to the input sun gear 314 of the speed change system 310. The low speed, medium speed and reverse rotation states which need a fixed speed change ratio are described first followed by a description of the high speed states is given in the state where the speed is changed steplessly and automatically.

Because the rotation of the turbine 388 may be disconnected by using the clutch 399 at "C"' on the control shaft 316 or at "D," for example, during operation with only fixed speed change ratio, a description of the operation status of the speed change controlling system 380 is omitted below.

II-1. Neutral State (FIG. 12): Output ring gear 352 is stopped

Input shaft 312 ↑ - Input sun gear 314 ↑ - Input differential gears 340G ↓ - ⎡ -- Carriers 332, 334 ↑ (idling)
⎣ -- Control diferential gears 344G ↑ - ⎡ -- Control
⎣ -- Medium sun gear 318 ↓ (idling)

speed differential gears 346G ↑ - Medium speed sun gear 322 ↓ (idling)

Figure 12:
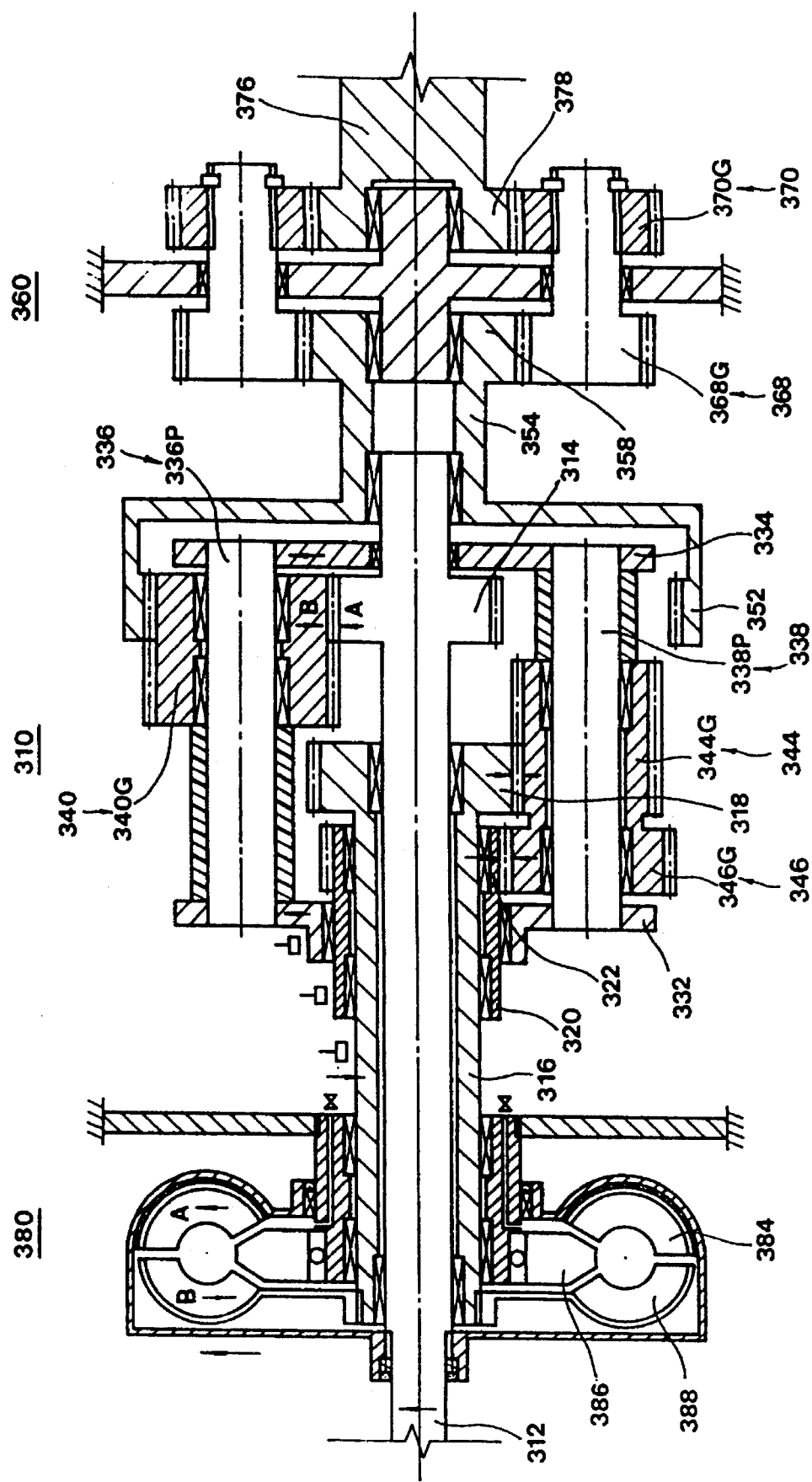
Figure 13:
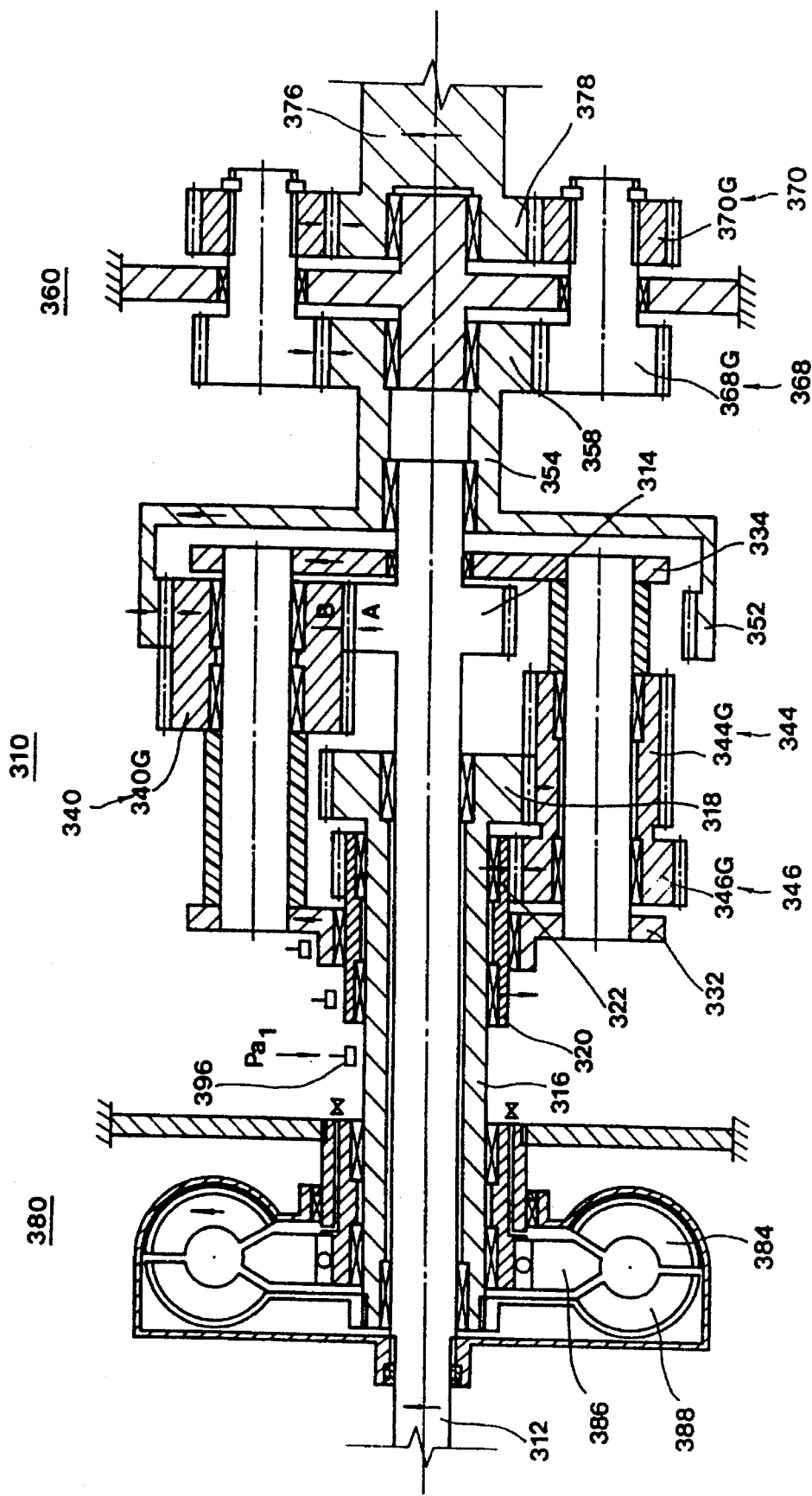

In the neutral state the driving force of the engine is not output to the output shaft 376 and the transmission idles as shown at FIG. 12. That is, if the rotational force input from the driving shaft of the engine where a load is applied to the output shaft 376, rye input shaft 312 and the input sun gear 314 rotate in direction "A". As the input sun gear 314 is rotated, each of the input differential gears 340G meshed with the input sun gear 314 rotate about the locking pin 336P in direction "B", opposite to the rotational direction of the input sun gear 314. Therefore, because the output ring gear 352, meshed with each of the input differential gears 340G, is stationary due to the load, each input differential gear 340G rotates about its own axis and at the same time revolves around the inside of the output ring gear 352 and therefore carriers 332, 334 only idle in direction "A", and at the same time, rotate the control differential gears 344 meshed with each of the input differential gears 340G and each of the medium speed differential gears 346G in direction "A". The control sun gear 318 (meshed with the plurality of control differential gears 344) and the medium speed sun gear 322 (meshed with the plurality of medium speed differential gears 346) idle in the direction "B". At this time, because the carriers 332, 334 rotate in direction "A", each differential gear concurrently rotates about its own axis and revolves in the direction described above.

As described above, the rotational force input through the input shaft 312 cannot rotate the output shaft 376 which is in stationary state due to the load, with the result that only carriers 332, 334, the control sun gear 318 and the medium speed sun gear 322 idle, which results in the neutral state.

II-2. Low Speed State (FIG. 13): Control Sun Gear 318 is Stopped

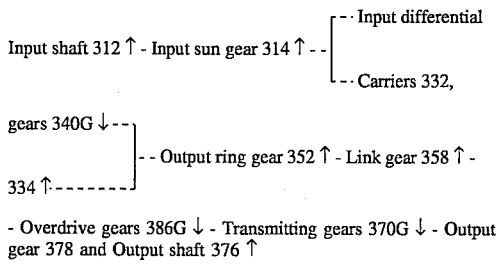

- Overdrive gears 386G ↓ - Transmitting gears 370G ↓ - Output gear 378 and Output shaft 376 ↑

In the low speed state the rotation of the output shaft 376 is initiated and gradually increases. Brake force Pa1 applied by the low speed brake means 396 installed on the control shaft 316 with a one-way bearing restrains the rotational direction as described above. The rotation of the control sun gear 318 which was rotating in direction "B" now slows to a stop, and therefore the rotation of the output shaft 376 gradually increases in proportion to the reduction of the rotation of the control sun gear 318. That is, as the rotation of the control sun gear 318 decreases due to the braking action of Pa1, the rotation in direction "A" of the control differential gears 344 meshed with the control sun gear 318 decreases. Therefore, the control differential gears 344, the rotation of which is decreasing, controls the rotation of the input differential gears 340, and the control force increases the rotation of the carriers 332, 334, which were rotating in direction "A", so as to rotate faster than in the neutral state. As a result the output ring gear 352, which was stationary, now rotates in direction "A".

As the rotation of the carriers 332, 334 increases, the rotation of the differential gears about their respective axis decreases, while the revolutions together with the carriers 332, 334 increases. The medium speed sun gear 322 gradually rotates in direction "B" because the rotational force about its own axis of the medium speed differential gears 346 meshed with the medium speed sun gear 322 is relatively greater than the revolutionary force of the medium speed differential gears 346.

The overdrive system 360 increases the rotational output received from the speed change system 310 to a constant ratio.

As the output ring gear 352 rotates, the ring gear shaft 354 and the link gear 358, integral with the output ring gear 352, rotate in the same condition and rotate the overdrive gear 368 in direction "B" which in turn can increase the rotation of the link gear 358 to a constant ratio, and the rotation of the link gear rotates the output gear 378 and the output shaft 376 in the same direction "A" as the input shaft 312 via the transmitting gear 370.

Figure 14:
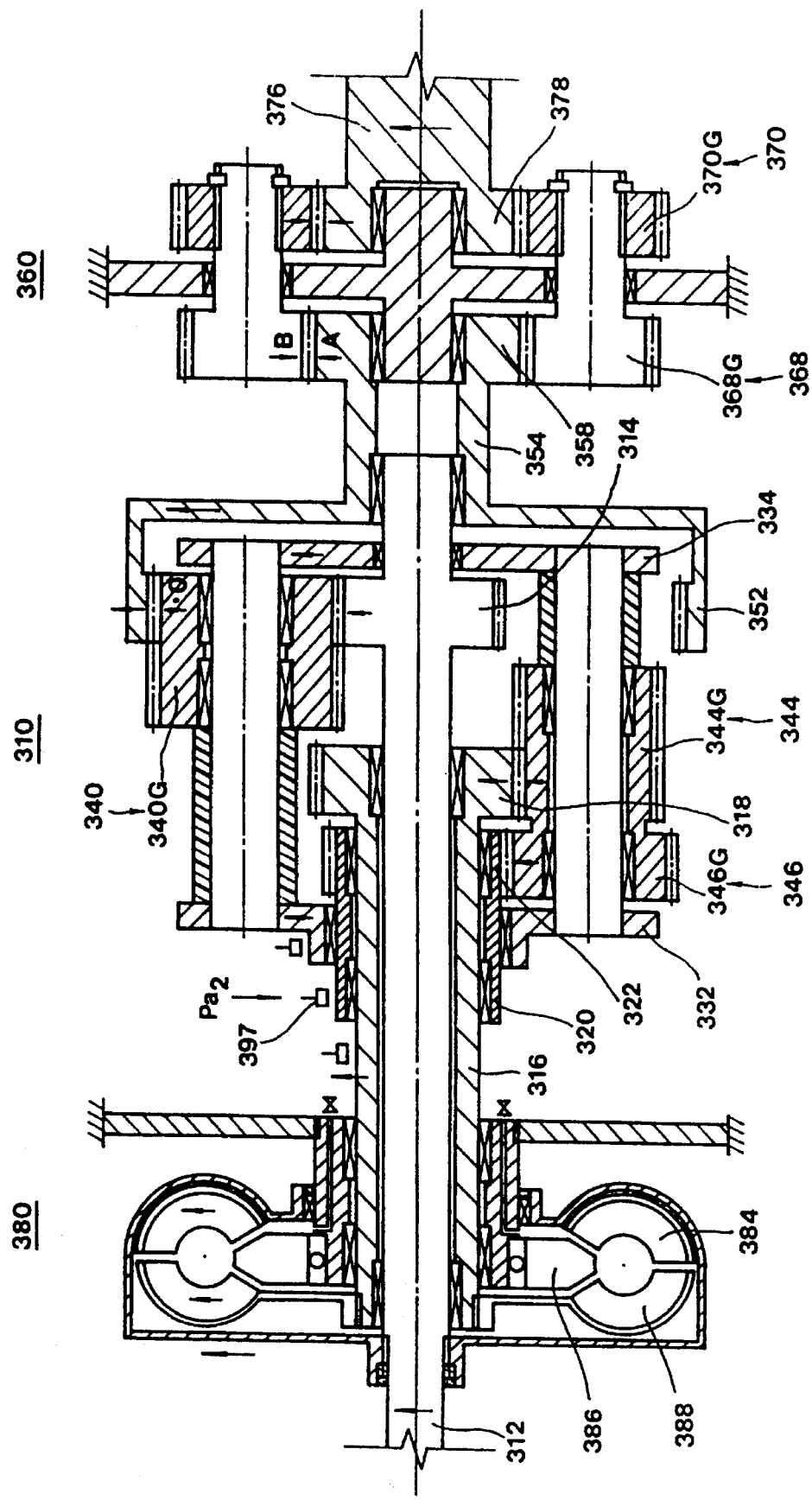
Figure 15:
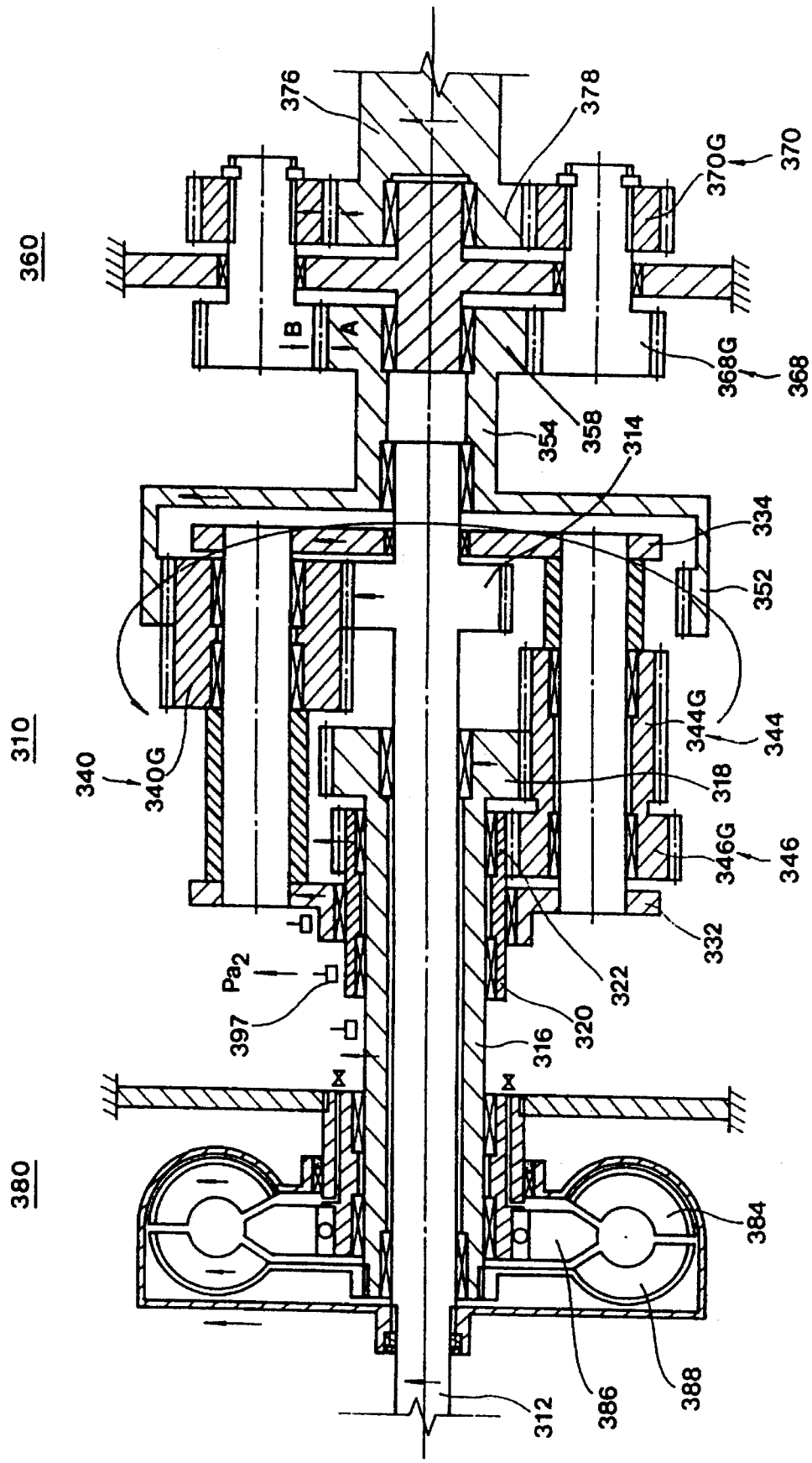

II-3. Medium Speed State (FIG. 14)

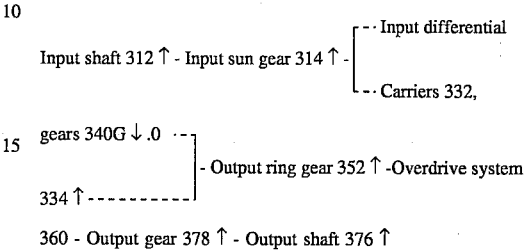

360 - Output gear 378 ↑ - Output shaft 376 ↑

In the medium speed state the rotation of the output shaft 376 is further increased from the low speed state. The brake force Pa2 is applied by the medium speed brake means 397 to the medium speed control shaft 320. This causes the rotation of the medium speed sun gear 322, which was rotating in direction "B", to slow and stop. Therefore the rotation of the output shaft 376 gradually increases in proportion to the reduction of the rotation of the medium speed sun gear 322.

That is, the control differential gear 344 further controls the rotation of the input differential gear 340 by the brake force Pa2 as described above. This control force further increases the rotation of the carriers 332, 334 in direction "A", therefore the rotation of the output ring gear 352 is further increased relative to the low speed state, and the rotation of the output shaft 376 is also increased to the predetermined ratio.

As the rotation of the carriers 332, 334 increases, the rotation about the respective axis of each differential gear is further decreased relative to the low speed state while the revolutions together with the carriers 332, 334 increases. At this time, if the speed of the engine is increased or the load of the output shaft 376 is decreased, the input differential gear 340 stops rotating and only revolves together with the carriers in direction "A".

The rotational direction of the control sun gear 318 which was rotating in direction "B" changes to direction "A", because the revolutionary force of each control differential gear 344 gradually increases and becomes greater than the rotational force about its own axis.

Here, since the rotational direction and the transmission procedure of the overdrive system 360 are same as for the low speed state, a description thereof is omitted.

Figure 16:
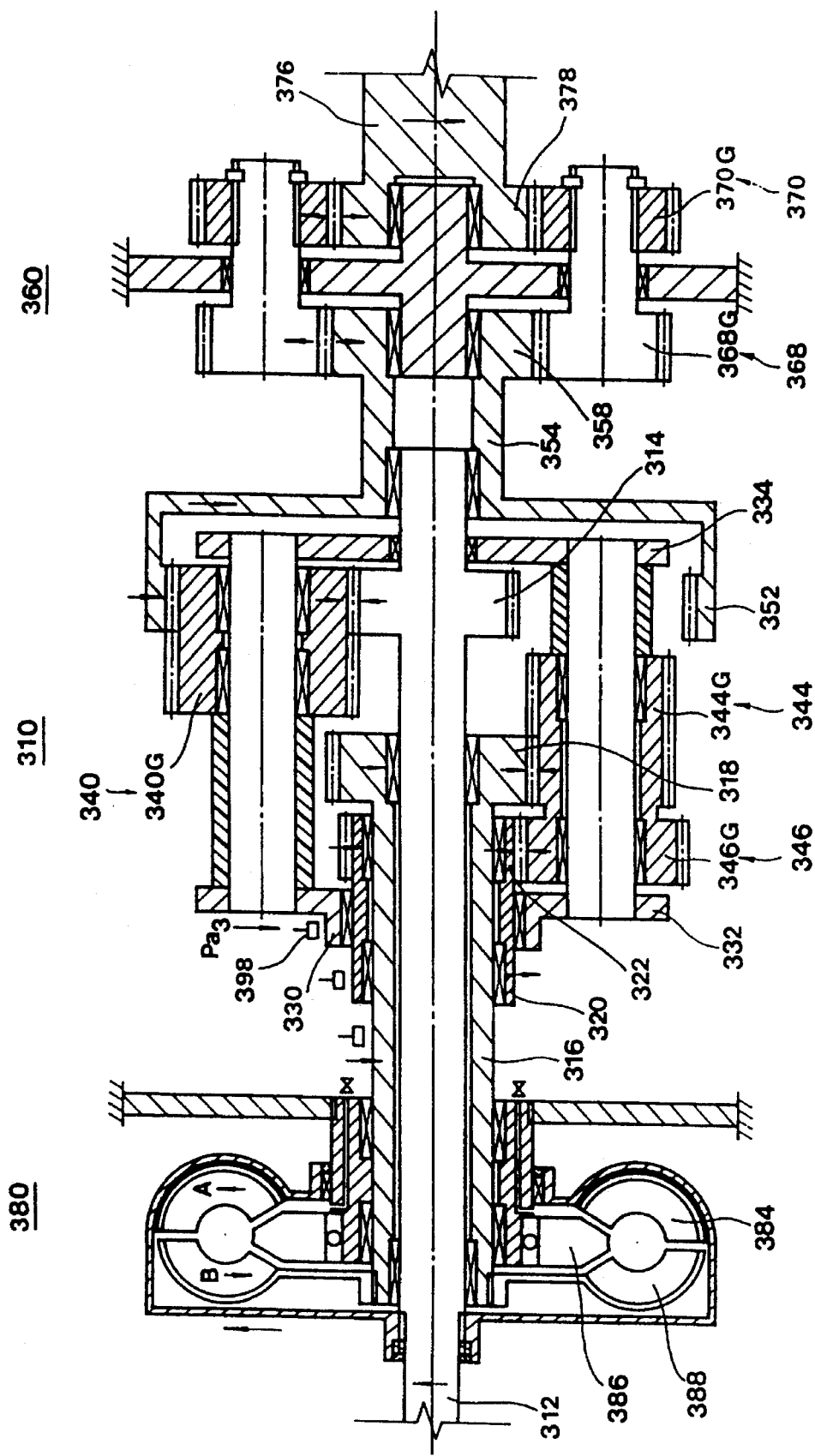

II-4. Reverse Rotation State (FIG. 16)

Input shaft 312↑—Input sun gear 314↑—Input differential gears 340G↓—Output ring gear 352↓—Ring gear shaft 354 and Link gear 358↓—Overdrive gears 368G and Transmitting gears 370G↑—Output gear 378 and output shaft 376↓(Opposite direction to the input shaft)

In the reverse rotation state the output shaft 376 rotates in a direction opposite to that of the input sun gear 314. When in neutral, a brake force Pa3 is applied by the reverse rotation brake means 398 to the tube shaft boss 330 of the carrier 332. This results in the carriers, which were rotating in direction "A", to slow and stop and the output ring gear 352 now rotates in a direction opposite to that of the input sun gear 314.

That is, as the rotation of the carriers 332, 334, which were rotating in direction "A" in the neutral state, is stopped by the brake force Pa3, the rotation each of the input differential gears 340 increases and therefore the output ring gear 352 rotates in direction "B".

As the rotation of the input differential gears 340 increases, the rotation of each of the control differential gears 344 and of the medium speed differential gears 346 rotating in direction "A" is increased. Likewise, rotation of the control sun gear 318 and the medium speed sun gear 322 meshed with the control differential gears 344 and the medium speed differential gears 346, respectively, increases in direction "B" opposite to the input sun gear 314.

The input differential gear 340, which is rotating in direction "B", is finally in a state where it has no revolutionary force since carriers 332, 334 have stopped. In other words, because the influence of the rotational force about its own axis is relatively large, the output ring gear 352 rotates in direction "B".

As stated above, this description is given about the fixed speed change ratio which can obtain the maximum engine braking effect by operating only the speed change system 310 and the brake means without using the speed change controlling system 380 by utilizing the conventional clutch 399 installed at, for example, "C'" on the control shaft 316 or at "D" as see FIG. 11, i.e. the basic neutral, low speed, medium speed and reverse rotation states.

A description of the method of operation and state of using the stepless automatic speed change system to obtain the maximum driving comfort and the most economical driving force by controlling the rotation of the control sun gear 318 via the control shaft 316 by operating the speed change controlling system 380 and the speed change system 310 by the clutch 399 installed at the "C'" portion of the control shaft 316 or "D" portion to operatively engage the speed change controlling system 380 follows.

Since the reverse rotation state utilizing the fixed speed change ratio is same as the state "II-4" described above, a description thereof is omitted.

II-A. Neutral State (FIG. 12)

Input shaft 312↑—Impeller 384↑—Turbine 388↓—Control sun gear 318↓—(idling)

When the output shaft 376 is stationary due to the load, because part of the driving force of the engine rotates the impeller 384 of the speed change controlling system 380 via the input shaft 312 in the same direction "A" and at the same speed and the blades of the impeller 384 rotate together with the fluid, the force of the fluid discharged from the blades tends to control the rotation of the turbine 388, which is rotating in direction "B". However, when the output shaft 376 is stationary state due to the load and with the engine idling at low revolutions per minute (RPMs), the fluid discharged from the impeller 384 cannot exert a force sufficient enough to control the rotation of the turbine 388, such that the turbine slips.

In other words, the turbine 388, which slips in direction "B", is rotated, not by the force of the fluid discharged from the impeller 384, but by the influence (load) of the control differential gears 344 via the control sun gear 318 and the control shaft 316.

As described above, when the engine is idling at low revolutions, the fluid discharged by the impeller 384 cannot exert sufficient force which can control the rotation of the turbine 388 which is then being controlled by the rotation of the control differential gears 344, resulting in the output shaft 376 remaining in a stationary state.

II-B. Low Speed State (FIG. 13): Until the Control Sun Gear 318 is Stopped

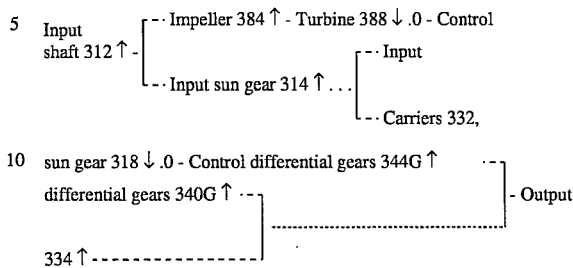

ring gear 352 ↑ - Overdrive system 360 - Output gear 378 and Output shaft 376 ↑ ( ↓ .0 denotes the direction until the turbine and the control sun gear are stopped from the rotation in the direction "B")

Since the low speed state is described in detail at "II-2" above, a description until the control sun gear 318 is stopped is presented here since the omitted portion is the same as that described at "II-2".

In the low speed state the rotation of the output shaft 376, is initiated and gradually increased. Thus, if the rotational speed of the engine is gradually increased from low revolutions, the rotational speed of the impeller 384 is increased. This causes the force of the fluid being discharged by the impeller to be increased which gradually controls the rotation of the turbine from the slip state. Therefore, the rotation of the output shaft 376 gradually increases in proportion to the reduction of rotational speed of the turbine 388 which was rotating in direction "B".

That is, if the force (RPMs) of the engine is increased, the force of the fluid discharged from the impeller 384 is increased, and the rotation of the turbine (which was rotating in the direction "B") is gradually decreased to a speed change point where the rotational force of the turbine is in an equilibrium state with the load of the output shaft 376 and is stopped. Therefore, the control sun gear 318 integral with the turbine 388 controls, that is, decreases the rotation of the control differential gears 344 which were rotating in the direction and therefore the rotation of the input differential gears 340, which were rotating in the direction "B", is also decreased.

As described above, the state in which the control sun gear 318 is stopped is same as the state in which the control sun gear 318 is stopped in the state "II-2" by applying the brake force Pa1 by the above described low speed brake means 396.

In the same manner as described above, when part of the input power rotates the impeller 384 of the speed change controlling system 380 and the rotational force rotates the turbine 388 which is integral with the control sun gear 318 via the force of the fluid, if the load of the output shaft 376 is larger than the input driving force, then the rotation in direction "B" of the control sun gear 318 is increased in the low speed state, and if the load of the output shaft 376 is smaller than the input driving force, then the rotation in direction of the control sun gear 318 is decreased which results in obtaining an optimum speed change ratio which always results in a state of equilibrium, i.e. the driving force input by the engine is equal to the load of the output shaft, i.e. the total resistance to the motion.

II-C. Medium Speed State (FIG. 14): Until the Medium Speed Sun Gear 322 is Stopped

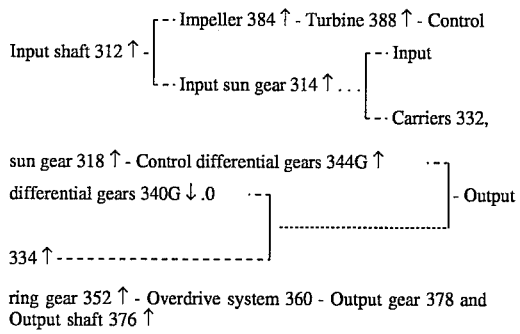

ring gear 352 ↑ - Overdrive system 360 - Output gear 378 and Output shaft 376 ↑

A description of the action of the medium speed sun gear 322 until it stops is described below, thereafter the medium speed state is the same as described in detail in the state "II-3".

In the medium speed state the rotation of the output shaft 376 is further increased over the low speed state, and if the rotational speed of the engine is further increased from that in the low speed state as described above, the additional rotational force generated causes the turbine 388 and the control sun gear 318, which were in a stationary state, to rotate in direction "A". Therefore the rotation of the input differential gears 340 and the medium speed sun gear 322, which were rotating in direction "B", gradually decreases over that in the low speed state and finally stop.

The state in which the medium speed sun gear 322 is stopped is same as the state in which the medium speed sun gear 322 is stopped in the state "II-3" by applying the brake force Pa2 by the above described medium speed brake means 397.

II-D. High Speed State (FIG. 15): Until the Rotation Ratio of the Input Shaft and the Speed Change System Becomes 1:1

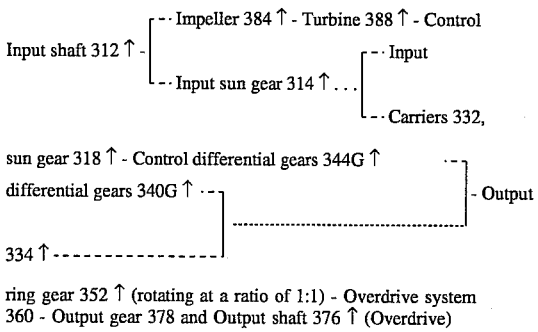

ring gear 352 ↑ (rotating at a ratio of 1:1) - Overdrive system 360 - Output gear 378 and Output shaft 376 ↑ (Overdrive)

In the high speed state the output rotational speed is further accelerated over that of the medium speed state. Thus, when the rotational speed of the engine is further increased over that of the medium speed state, the medium speed sun gear 322, which was in a stationary state, rotates in direction "A" and finally rotates together with the carriers 332, 334.

In this state, the rotational force passing through the input shaft 312 is divided into two paths. In one path the rotational force is transmitted to the input differential gears 340 by rotating the input sun gear 314 via the input shaft 312. In the other path the rotational force is transmitted to the control differential gears 344 by rotating the turbine 388 via the input shaft 312 and the impeller 384 and at the same time rotating the control sun gear 318.

At this time, the force of the fluid discharged from the impeller 384 due to the increase of the rotational output of the engine increases. In response, the turbine 388 slips a little against the impeller 384 and finally rotates at the same speed as the impeller 384 so as to be rotated at a speed change point (this is the speed in the equilibrium state) which corresponds to the driving resistance. This rotational speed is input to the control differential gears 344 via the control sun gear 318, and another rotational force is input to the input differential gears 340 via the input sun gear 314. That is, because the two differential gears 344, 340 integral with each other are given same rotational force, they cannot rotate about their respective axes but can only revolve together with the carriers 332, 334.

In this state, the speed change control system 380 and the speed change system 310 rotate together as a unit about sun gears 314, 318 in direction "A". Also, because all the differential gears do not rotate about their respective axes, no more new speed change point is formed, i.e. a state of equilibrium and therefore the state becomes one in which the ratio is 1:1 with the rotational force directly driving the output ring gear 352.

Next, the rotational output of output ring gear 352 is transmitted to the link gear 358 of the overdrive system 360. This rotational output is further increased to a predetermined gear ratio as it passes through the overdrive gear 368 and the transmitting gear 370. Therefore the rotation of the output gear 378 and the output shaft 376 is greater than the rotation of the input shaft 312, i.e. the overdrive state.

A description of the fourth embodiment of the stepless automatic variable transmission of the present invention combines the speed change system 410, speed change controlling system 380 and overdrive system 360 with reference to FIGS. 17–22 follows.

The stepless automatic variable transmission 400 of the fourth embodiment utilizes the speed change controlling system 380 and the overdrive system 360, as described in the third embodiment, together with a speed change system 410. That is, the construction of the speed change controlling system 380 and the overdrive system 360 as used in the fourth embodiment is same as in the third embodiment. Therefore the respective method of operation and the functional role in the fourth embodiment is, as would be expected, the same as for the third embodiment. A detailed description of the speed change controlling system 380 and the overdrive system 360 is presented above.

The medium speed control shaft 320, medium speed sun gear 322, medium speed brake means 397 and the medium speed differential gears 346 which are meshed with the medium speed sun gear 322 for medium speed driving are removed from the speed change system 310 of the third embodiment to result in the speed change system 410 of the fourth embodiment.

Figure 17:
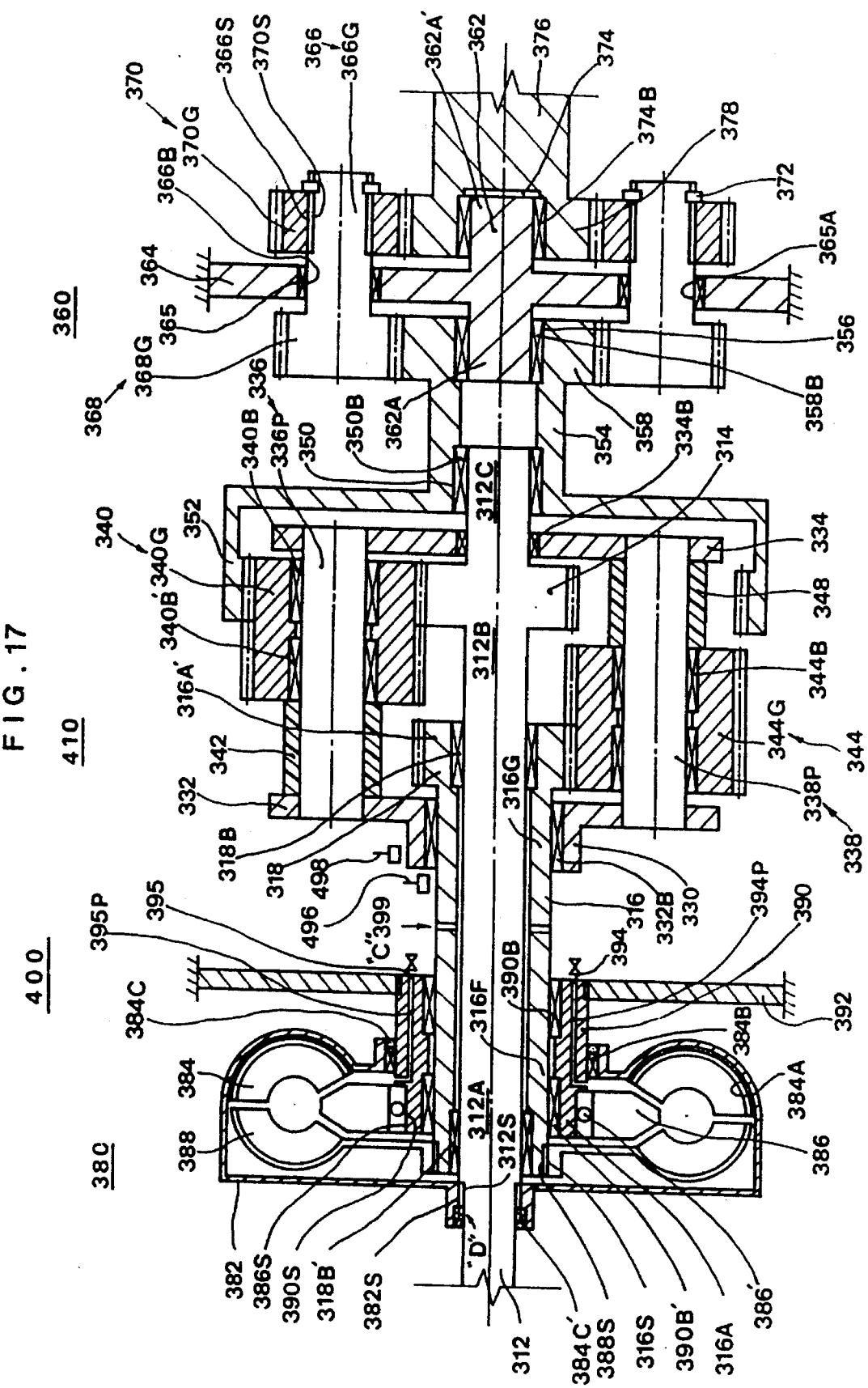
FIGS. 17–22 illustrate the fourth embodiment of the stepless automatic variable transmission according to the present invention.

Referring to FIG. 17, the low speed brake means 496 for applying a brake force to the control shaft 316 in the fourth embodiment is the same as the low speed brake means 396 of the third embodiment. The reverse rotation brake means 498 is also the same as in the third embodiment. However, the reference numerals for the low speed brake means 496 and the reverse rotation brake means 498 are different from those in the third embodiment, with the reference numerals for the remaining parts being the same as in the third embodiment.

The power transmitting procedure and the speed change state of the fourth embodiment of the stepless automatic variable transmission of the present invention constructed as described above are same as for the third embodiment and therefore are explained only briefly below.

Figure 18:
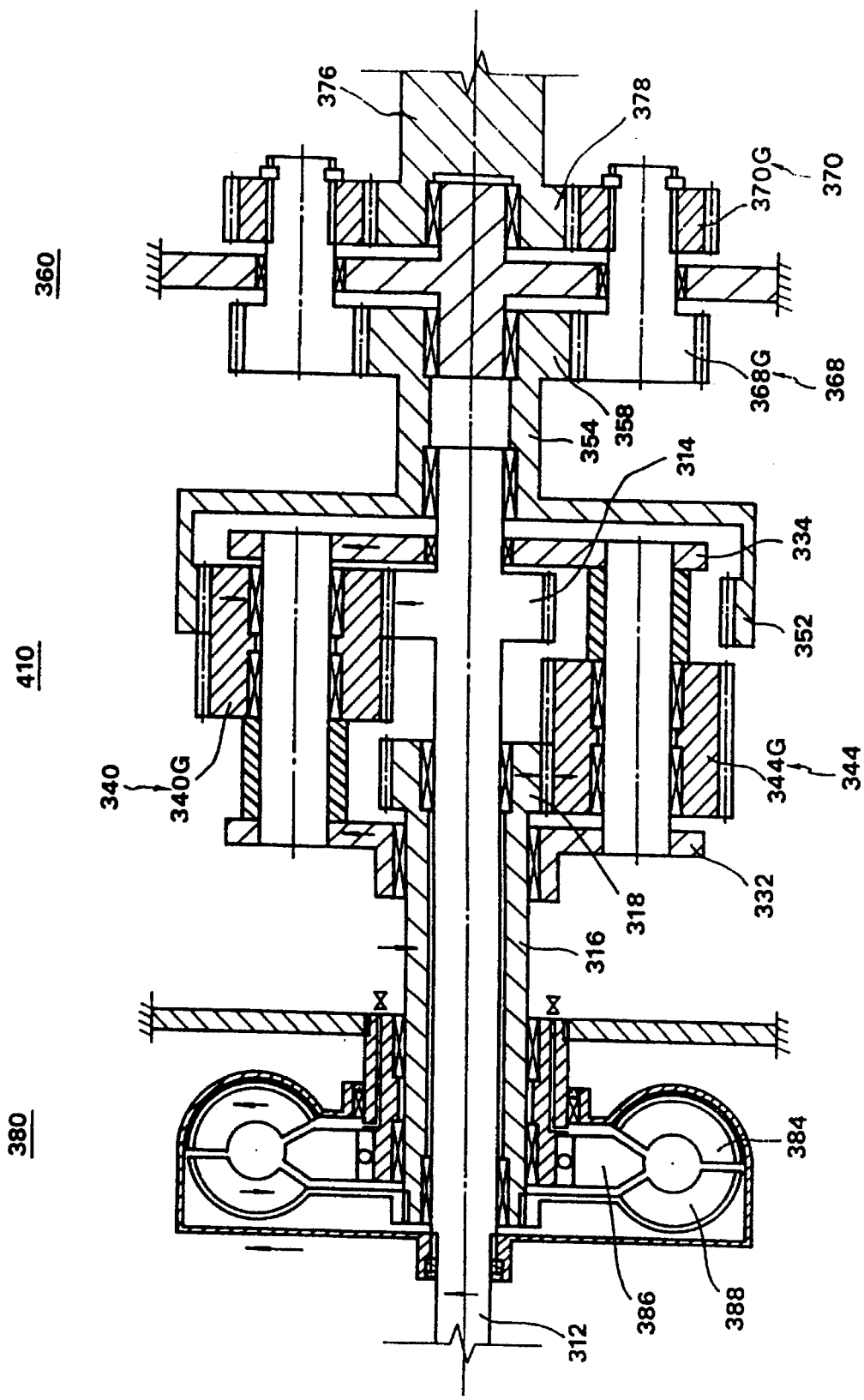

III-A. Neutral State (FIG. 18)

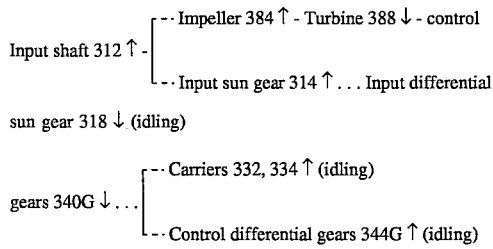

sun gear 318 ↓ (idling)

gears 340G ↓ ... [── Carriers 332, 334 ↑ (idling)
                  ── Control differential gears 344G ↑ (idling)

In the neutral state, as shown in FIG. 18, there is no rotation of the medium speed differential gear 346 and the medium speed sun gear 322 in the neutral state as shown in FIG. 12 of the third embodiment.

Since the state of other parts is similar to the third embodiment, the description thereof is omitted.

III-B. Low Speed State (FIG. 19): Until the Control Sun Gear 318 is Stopped

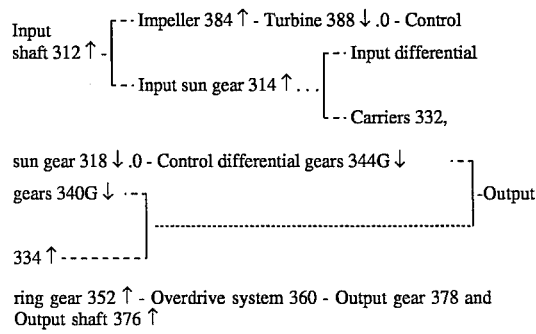

ring gear 352 ↑ - Overdrive system 360 - Output gear 378 and Output shaft 376 ↑

Figure 19:
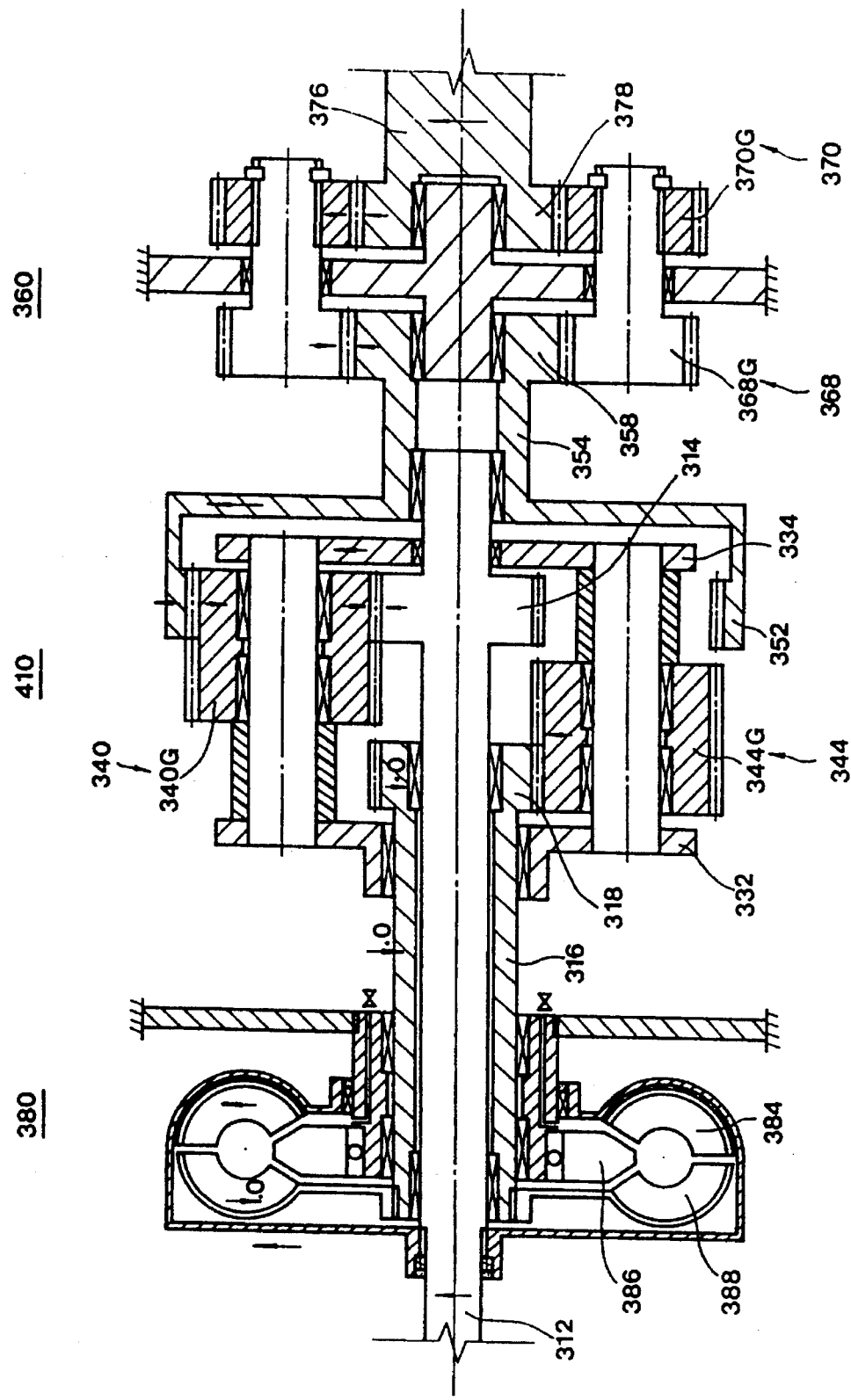

For a discussion of the low speed state as shown in FIG. 19, refer to the description of the low speed state "II-B" in the third embodiment which is equally applicable for the low speed state of this embodiment.

III-C. Medium State (FIG. 20)

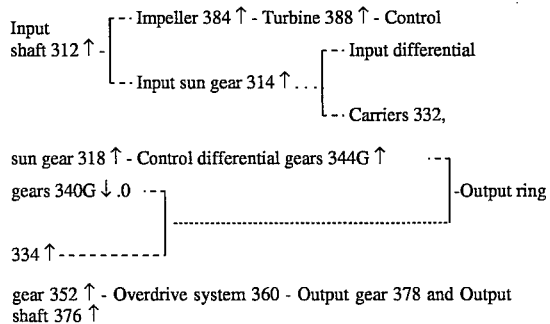

gear 352 ↑ - Overdrive system 360 - Output gear 378 and Output shaft 376 ↑

Figure 20:
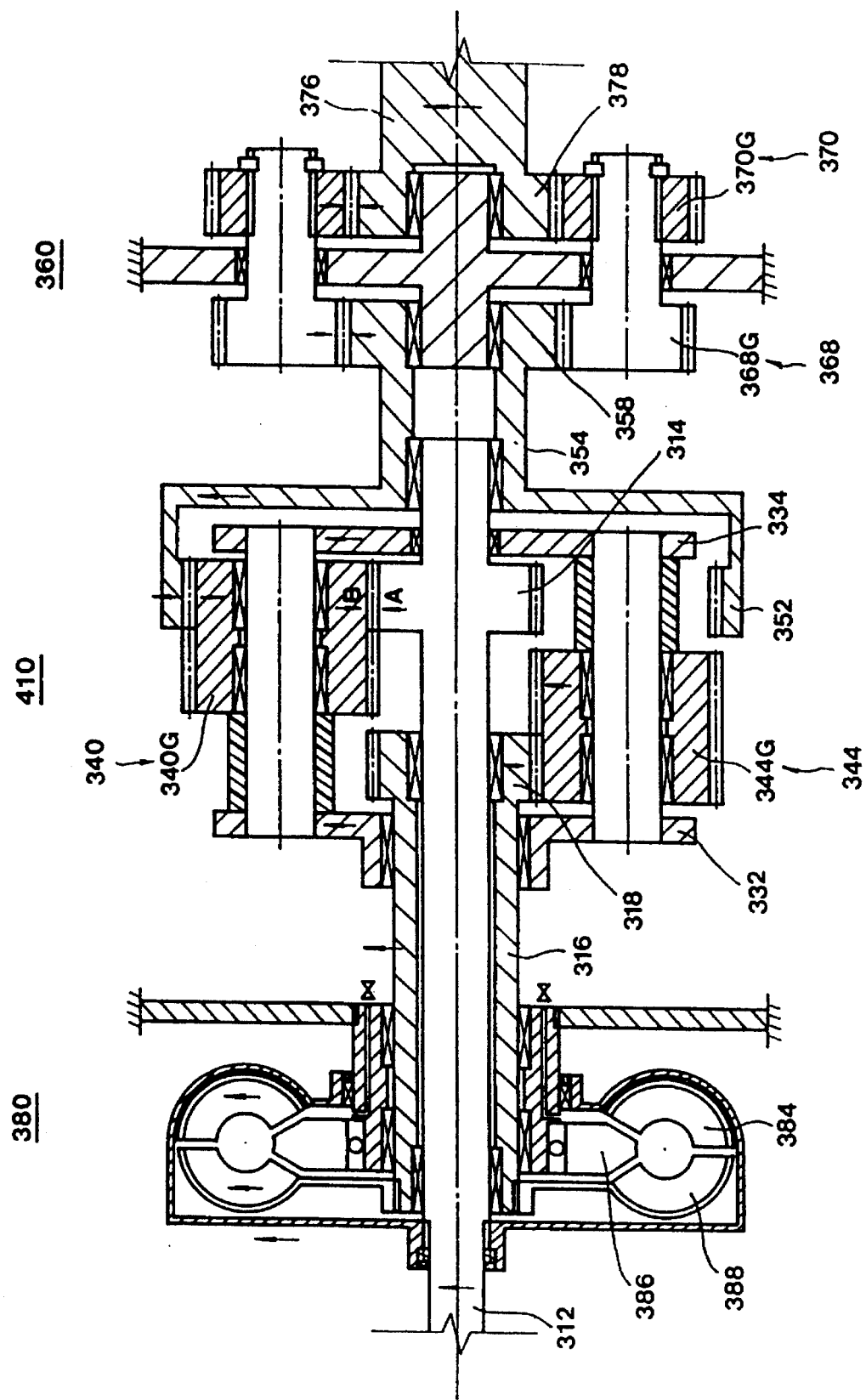

For a discussion of the medium speed state as shown in FIG. 20, refer to the description of the medium speed state "II-C" for the third embodiment, above, which is equally applicable for the medium speed state of this embodiment.

III-D. High Speed State (FIG. 21): Until the Rotation Ratio of the Input Shaft and the Speed Change System Becomes 1:1

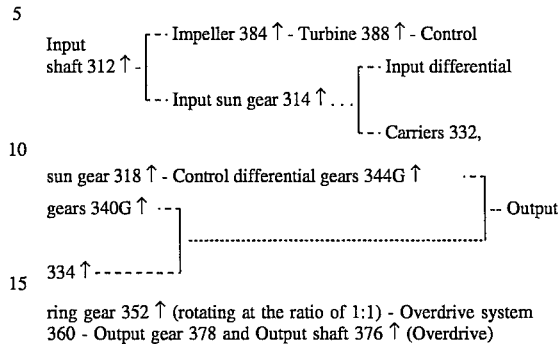

ring gear 352 ↑ (rotating at the ratio of 1:1) - Overdrive system 360 - Output gear 378 and Output shaft 376 ↑ (Overdrive)

Figure 21:
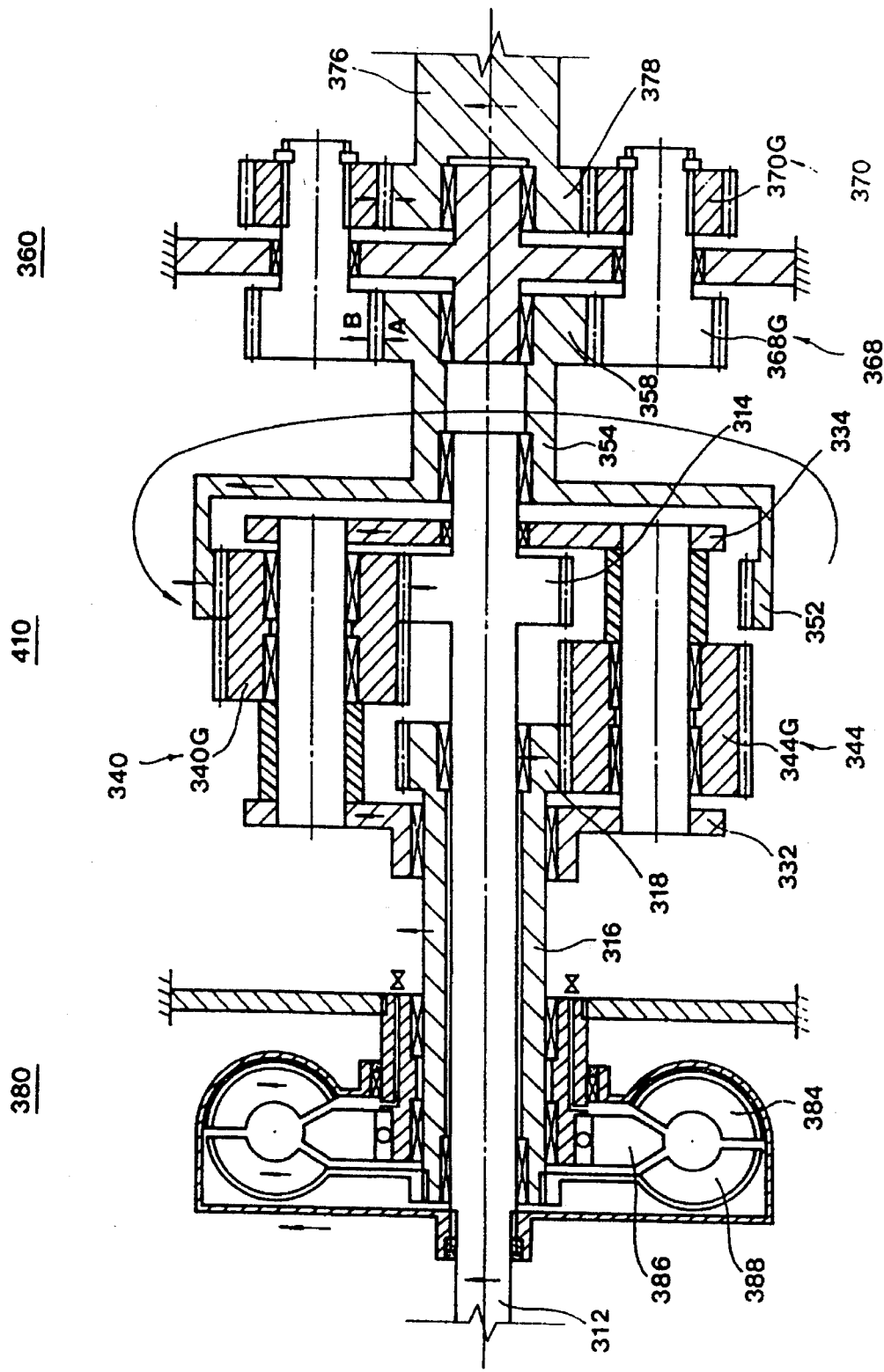

For a discussion of the high speed state as shown in FIG. 21, refer to the description of the high speed state "II-D" for the third embodiment, above, which is equally applicable for this high speed state.

Figure 22:
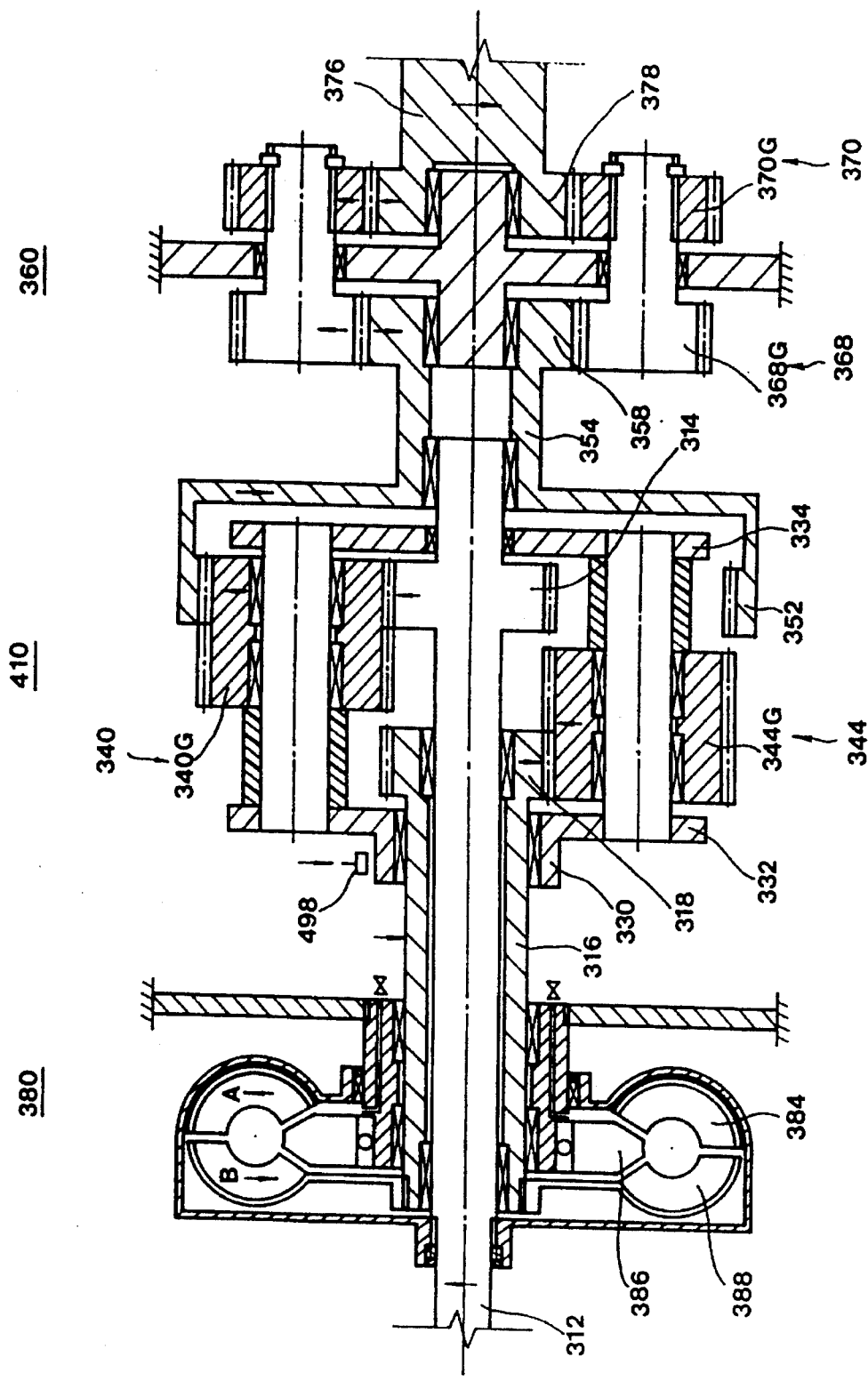

III-E. Reverse Rotation State (FIG. 22)

Input shaft 312↑—Input sun gear 314↑—Input differential gears 340G↓—Output ring gear 352↓—Ring gear shaft 354↓— Link gear 358↓—Overdrive gears 368G↑— Transmitting gears 370G↑—Output gear 378↓—Output shaft 376↓(opposite direction to the input shaft)

In the reverse rotation state the carriers 332, 334 are stopped by the reverse rotation brake means 498 installed on the tube shaft boss 330 of the carrier 332, and is similar to the reverse rotation state of FIG. 16 of the third embodiment, therefore the description hereat is omitted.

A description of the fifth embodiment of the stepless automatic variable transmission of the present invention combines the speed change system 510 and speed change controlling system 550 with reference to FIGS. 23–26 follows.

In the stepless automatic variable transmission 500 of the fifth embodiment of the present invention, the speed change controlling system 550 is same as the speed change controlling system 180 as described for the second embodiment and as illustrated at FIG. 9. The speed change system 510 utilizes a planetary gear set, and the variable transmission is driven by only a stepless automatic speed change operating without the need for a clutch. An overdrive system can be added, if desired.

SPEED CHANGE SYSTEM

Figure 23:
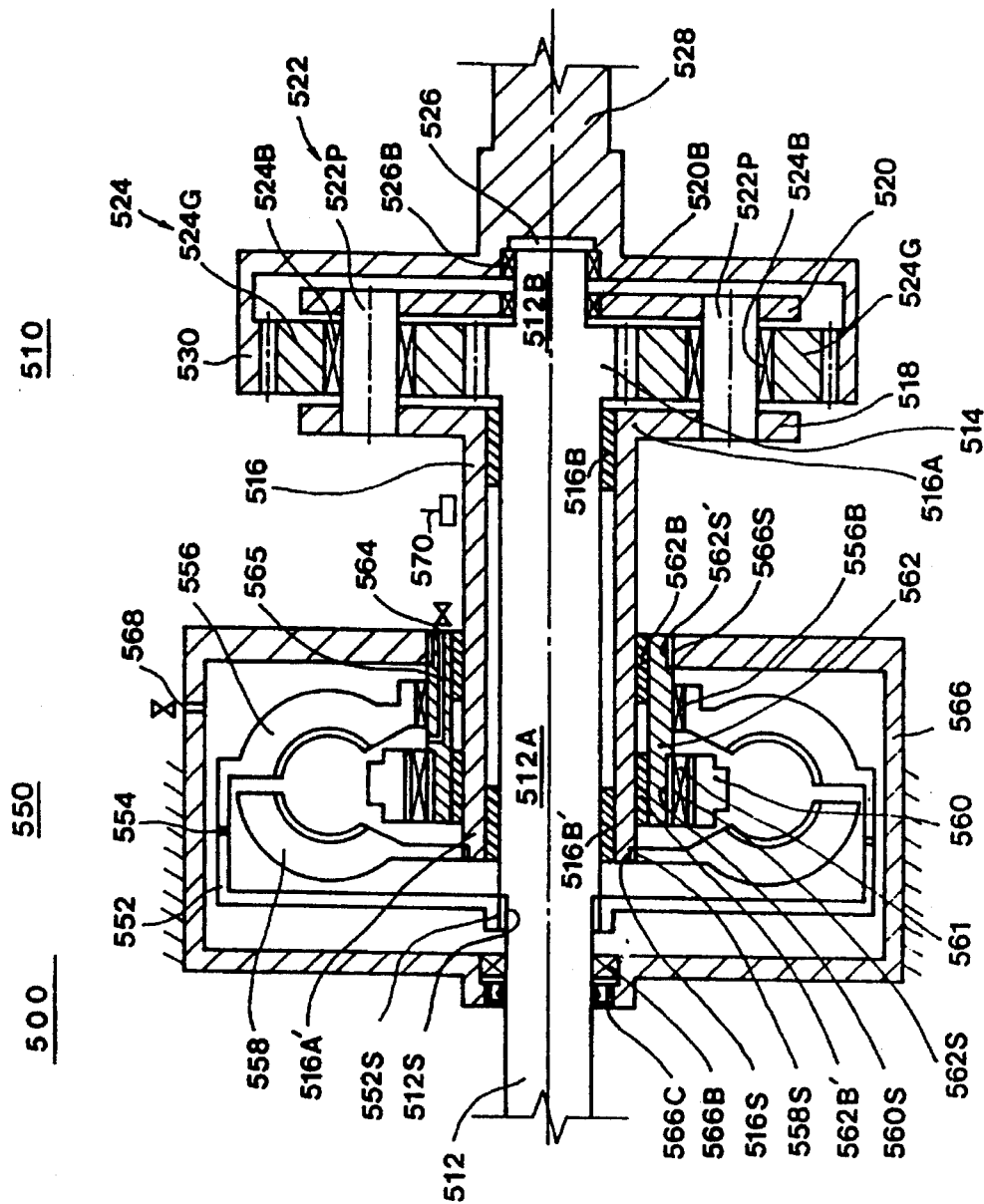
FIG. 23–26 illustrate the fifth embodiment of the stepless automatic variable transmission according to the present invention.

The stepless automatic variable transmission 500 of the fifth embodiment of the present invention is illustrated at FIG. 23 and includes an input shaft 512 to which rotational driving force is input from the driving shaft of an engine. The input shaft 512 includes a first section 512A and a terminal section 512B with an input sun gear 514 integrally formed on the input shaft 512 between the first section 512A and the terminal section 512B.

The speed change control shaft 516 of a predetermined length is rotatably and coaxially mounted on the first section 512A of the input shaft 512, as illustrated at FIG. 23. The speed change control shaft 516 includes the carrier 518 positioned at the first end 516A and with a plurality of splines 516S formed at the second end 516A' of the speed change control shaft 516 to engage the coaxial splined hub 558S of the turbine 558 to enable the speed change control shaft 516 to be rotated simultaneously with the turbine 558 of the speed change controlling system 550. Bushings 516B, 516B' are used to ensure that the input shaft 512 and the speed change control shaft 516 can independently rotate.

Carrier 520 has a coaxial bore formed therethrough to rotatably receive the terminal section 512B of the input shaft. Bearing 520B is used to ensure that the carrier 520 can freely rotate about the terminal section 512B of the input shaft. The plurality of locking pins 522 interlink and secure the two carriers 518, 520 together to ensure simultaneous rotation of the carriers 518, 520 about the input shaft. A plurality of planetary gears 524 are used with each locking pin 522P rotatably receiving a planetary gear 524G. Each planetary gear is meshed with the input sun gear 514. A bearing 524B may be used to mount each planetary gear en each of the plurality of locking pins 522 to ensure rotation of the planetary gear about its respective locking pin. The output ring gear 530, which has a coaxial bore 526 formed therein to rotatably receive the terminal section 512B of the input shaft, terminates in the output shaft 528. The output ring gear meshes with the outside of each of the plurality of planetary gears 524. Bearing 526B is inserted between the bore 526 and the terminal section 512B so that the output ring gear 530 can rotate freely about the input shaft 512.

The composite planetary gear set of the speed change system such as system 510 as described above, is a basic or fundamental instrument for changing the engine torque according to the present invention. And because the gears of the planetary gear set are in a constant state of being meshed, it transmits a more powerful force to the output shaft 528.

SPEED CHANGE CONTROLLING SYSTEM 550

The speed change controlling system 550 is the same as that of the speed change controlling system 180 described in the second embodiment. However, different reference numbers are used to separate this embodiment from the second embodiment.

As shown in FIG. 23, the disk cover 552 is secured to the first section 512A of the input shaft 512. The input shaft 512 passes through the middle of the cover 552. A splined hub 552S is coaxially formed in the cover 552 which meshes with the splines 512S formed in the input shaft 512 so that the cover 552 can be rotated integrally with the input shaft 512. The cover 552 is connected to the impeller 556 by a weld or a dog clutch at the periphery of tile cover 552 so that the cover rotates integrally with the impeller 556. An optimum number of fluid outlets 554 are formed through the cover 552 to enable the flow of fluid therethrough To secure the turbine 558 to the end 516A' of the speed change control shaft 516 splines 516S are formed on the speed change control shaft 516 to receive the coaxial splined hub 558S formed in the turbine 558 to enable the turbine 558 and the speed change control shaft 516 to rotate simultaneously. Bushings 516B, 516B' are used to ensure that the input shaft 512 independently rotates relative to the speed change control shaft 516 coaxially positioned thereon.

The impeller 556 and the turbine 558 are installed facing each other in such a manner so as to be spaced apart only a very small distance but sufficiently apart to permit rotation without direct mechanical engagement, i.e. contact. A stator 560 is positioned between the impeller 556 and the turbine 558 and secured to a one-way bearing 561 having a coaxial formed splined hub 560S for receiving the splines 562S formed on the fixed shaft 562.

Bushings 562B, 562B' are used to ensure that the speed change control shaft 516 rotates independently relative to the fixed shaft 562. Bearing 556B secures the fixed shaft 562 to the impeller 556 to permit independent rotation of the impeller 556. A fluid passageway 565 is formed in the fixed shaft 562, with the fluid passageway 565 terminating between the stator 560 and the impeller 556 to permit circulation of the fluid of the speed change controlling system 550, as illustrated in FIG. 23. A fluid inlet 564 is operatively secured to the fluid passageway 565.

The housing 566, for containing the fluid, is secured to the fixed shaft 562 by means of a splined hub 566S formed therein which receives the splines 562S' of the fixed shaft 562. The housing encloses the speed change control system 550 and includes a fluid outlet 568 formed therein to enable fluid to pass therethrough. A bearing 566B is used so that the input shaft 512 can rotates freely within the housing 566. A fluid-seal 566C is also used to prevent leakage of the fluid. The housing 566 is secured against rotation by an external fixing means.

To achieve reverse rotation of the output shaft relative the rotation of the input shaft, a reverse rotation brake means 570 is used to apply a braking force to the speed change control shaft 516 so that the speed change control shaft 516 and the carriers 518, 520 of the speed change system 510 can be slowed and stopped by inhibiting the rotation of the speed change control shaft 516.

The characteristics and advantages of the speed change controlling system 550 simply constructed as above are that part of the rotational power of the engine controls the rotation of the turbine 558 through the impeller 556, that is, the rotation is always controlled at a speed change point at which the driving force of the engine and the running resistance of the output shaft 528 always reach an equilibrium state.

The power transmission process and the speed change status of the present embodiment constructed as above are explained below in the neutral, forward rotation and reverse rotation states.

IV-1. Neutral State (FIG. 24): Output Ring Gear 530 is Stopped.

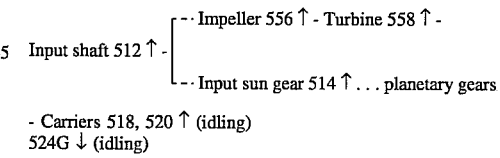

- Carriers 518, 520 ↑ (idling)
524G ↓ (idling)

Figure 24:
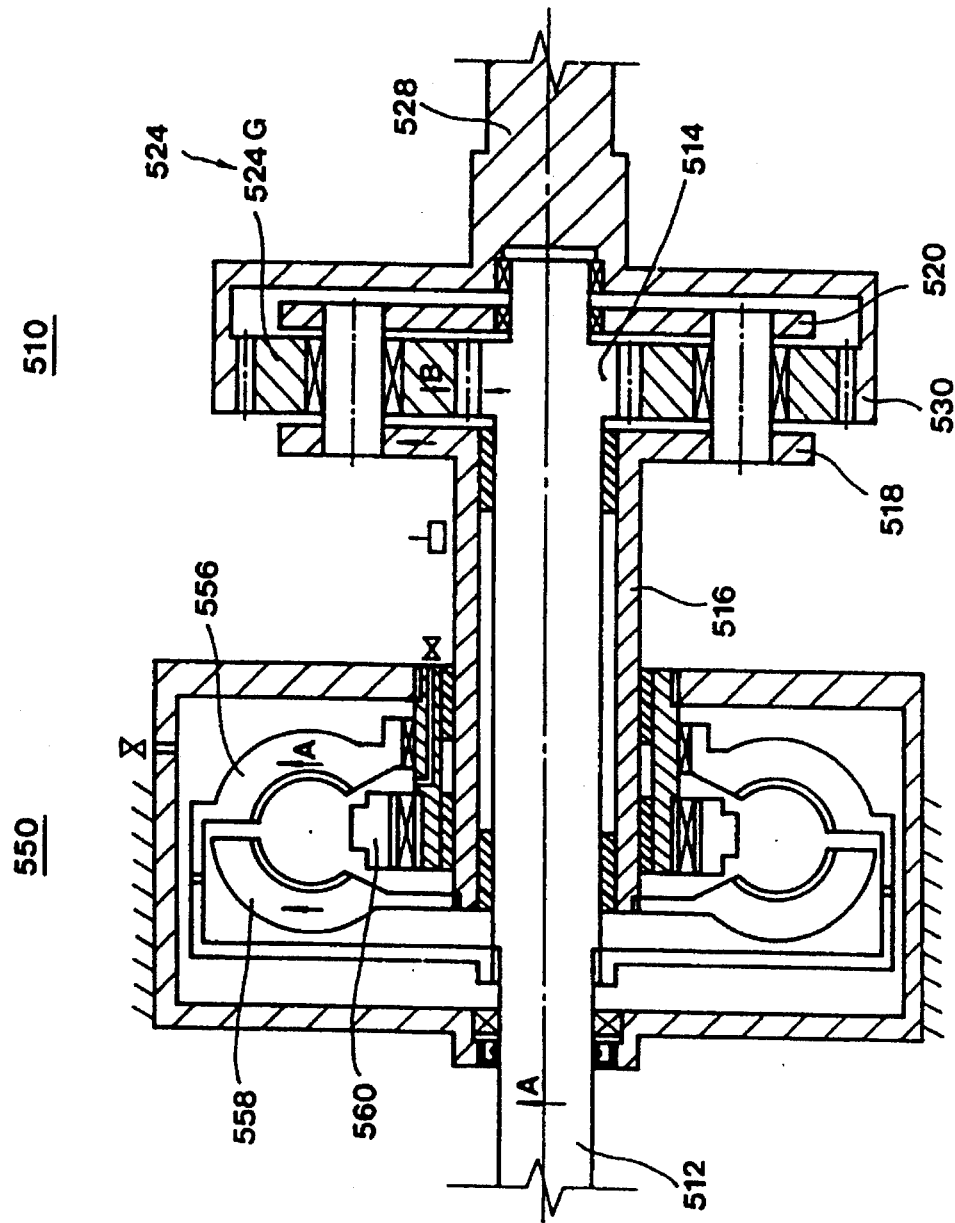
Figure 25:
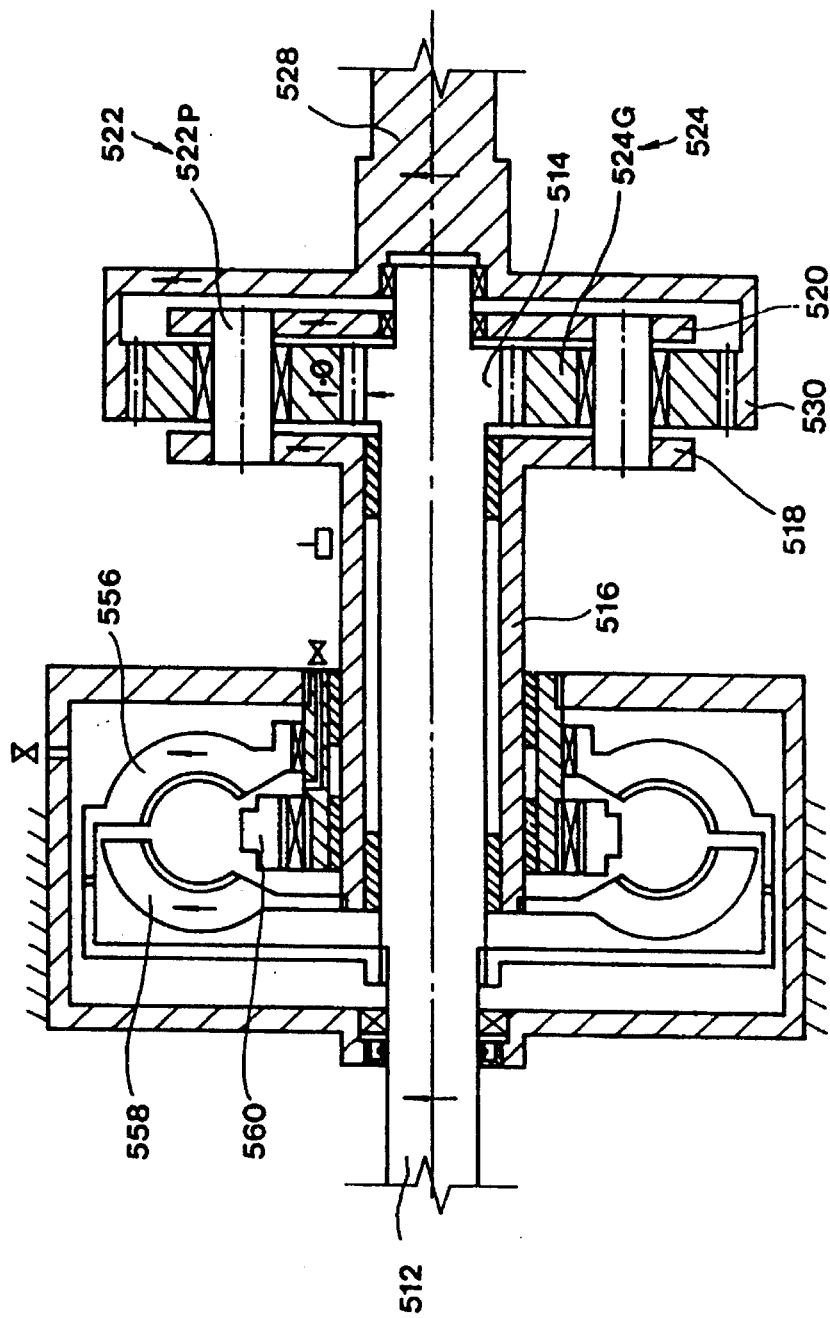
Figure 26:
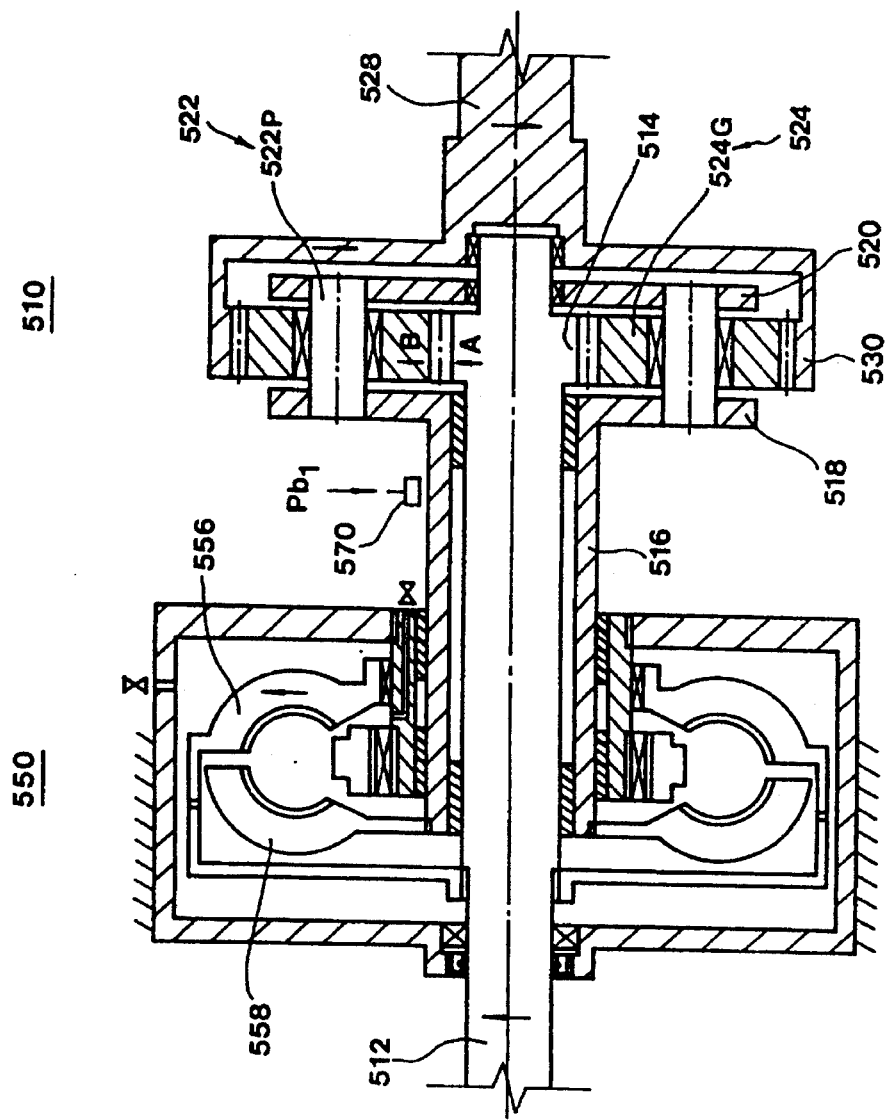

In the neutral state the driving force of the engine is not output to the output shaft 528 and the transmission idles as shown in FIG. 24. That is, when the output shaft 528 is in a stationary state due to a load, a portion of driving force of the engine through the input shaft 512 rotates the impeller 556 of the speed change controlling system 550 in direction "A". As the blades of the impeller 556 rotate together with the fluid, the fluid discharged from the blades strikes the blades of the turbine 558 which tends to increase the rotation of the turbine 558 in direction "A". However, when the load of the output shaft 528 is large and the engine idles at a low speed, the torque is relatively small, then the fluid discharged from the impeller 556 cannot produce a force sufficient to increase the rotation of the turbine 558 and therefore the turbine slips. Therefore, the power input to the input sun gear 514 cannot decrease the rotation of the planetary gears 524 which are rotating in direction "B" and the transmission idles.

Reviewing the rotation of the turbine 558 which slips in direction "A", the turbine 558 rotates, not by the force of fluid discharged from the impeller 556, but by the characteristics of the planetary gear set and the influence (load) of the output ring gear 530 through the speed change control shaft 516.

As described above, when the engine idles at a low speed, the force of the fluid discharged from the impeller 556 does not produce sufficient force to cause an increase in the speed of the turbine 558 for controlling the rotation of the carriers 518, 520. Therefore the carriers 518, 520 and the planetary gears idle in the direction "A" and "B", respectively, which results in the neutral state.

IV-2. Forward Rotation State (FIG. 25): Until the Rotation Ratio of the Input Shaft and the Output Shaft Becomes 1:1

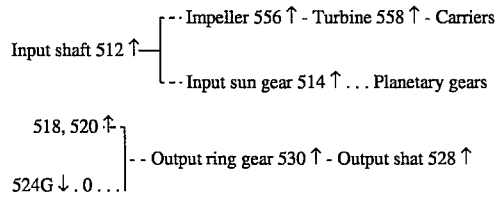

( ↓ . 0 indicates the rotation of planetary gears in which they decrease the rotation in direction "B" and finally become the equilibrium state)

In the forward rotation state the output shaft 528, which was stopped in the neutral state as described above, the rotation is initiated and gradually increases until the rotation of the output shaft becomes same as that of the input shaft (rotation ratio 1:1).

When rotational speed of the engine is gradually increased from that of the neutral state, the rotational speed of the impeller 556 increases which increases the force of fluid being discharged by the impeller blades. The increasing fluid force increases the rotation of the turbine 558 and gradually increases the rotation of the output shaft 528 as the rotation of the turbine 558 increases.

That is, if the rotational output of the engine is increased, the force of the fluid discharged by the impeller 556 is increased which increases the rotation of the turbine 558 which was rotating in direction "A" into the speed change point at which the rotational force of the turbine is equilibrated with the load of the output shaft 528. Therefore, the rotation of the carriers 518, 520, which were rotating in direction "A" through the speed change shaft 516 integrally connected with the turbine 558, increases gradually over the neutral state, and the rotation of planetary gears 524 meshed with the input sun gear 514, about their respective axes in direction "B", decreases gradually and finally stops. At this time, the gradual decrease of the rotation of the planetary gears 524 in direction "B" is proportional to the gradual increase of in their revolutions with the carriers 518, 520. The rotation of the output ring gear 530, meshed with the planetary gears 524, increases in proportion to the decrease of the rotation of the planetary gears about their own axes. When the rotation of the planetary gears 524 about their axes is decreased and finally stops, the driving force of the engine and the running resistance of the output shaft 528 constitutes a state of equilibrium. That is, in this state all the gears of the speed change system 510 form a rotating body which rotates together with the carriers 518, 520.

As described above, the characteristic of the present embodiment is that the transmission always reaches a state of equilibrium according to the driving force of the engine of the running vehicle and the load of the output shaft 528 which can vary at any time, by simple construction and method.

IV-3. Reverse Rotation State (FIG. 26): Turbine 558 and Carriers 518, 520 are Stopped Input shaft ↑ - [ -- Impeller 556 ↑ - Turbine 558 Carriers
                 -- Input sun gear 514 ↑ ... Planetary gears 518, 520 are stopped 524G ↓ ... Output ring gear 530 ↓ ... Output shaft 528 ↓

(opposite direction to the input shaft)

In the reverse rotation state the output shaft 528 rotates in a direction opposite to that of the input sun gear 514. A brake force Pb1 applied by the reverse rotation brake means 570 installed on the speed change control shaft 516 during the above described neutral state, then the carriers 518, 520 and the turbine 558 which were rotating in direction "A", stop and the output ring gear 530 rotates in a direction opposite to that of the input sun gear 514. That is, as the rotation of the carriers 518, 520, which were rotating in direction "A" in the neutral state, gradually decreases because of the brake force Pb1, the rotation of the planetary gears 524 in direction "B" is increased and therefore the output ring gear 530 rotates in direction which is opposite to that of the input shaft 512.

A description of the sixth embodiment of the stepless automatic variable transmission of the present invention combines the speed change system 610, overdrive system 660 and speed change controlling system 680 with reference to FIGS. 27–32 follows.

In this embodiment, the overdrive system is located between the speed change system 610 and the speed change controlling system 680.

SPEED CHANGE SYSTEM 610

Figure 27:
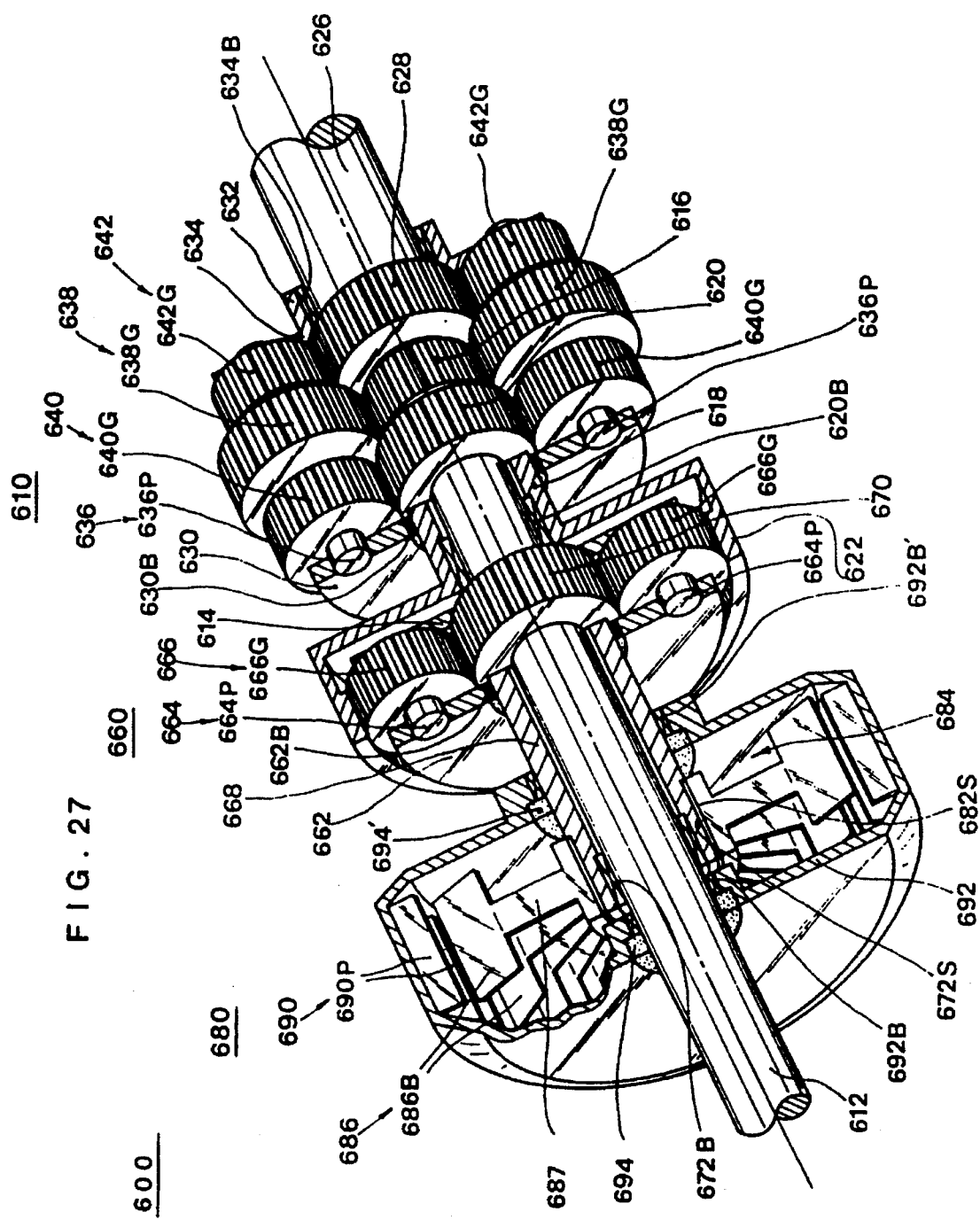
Figure 28:
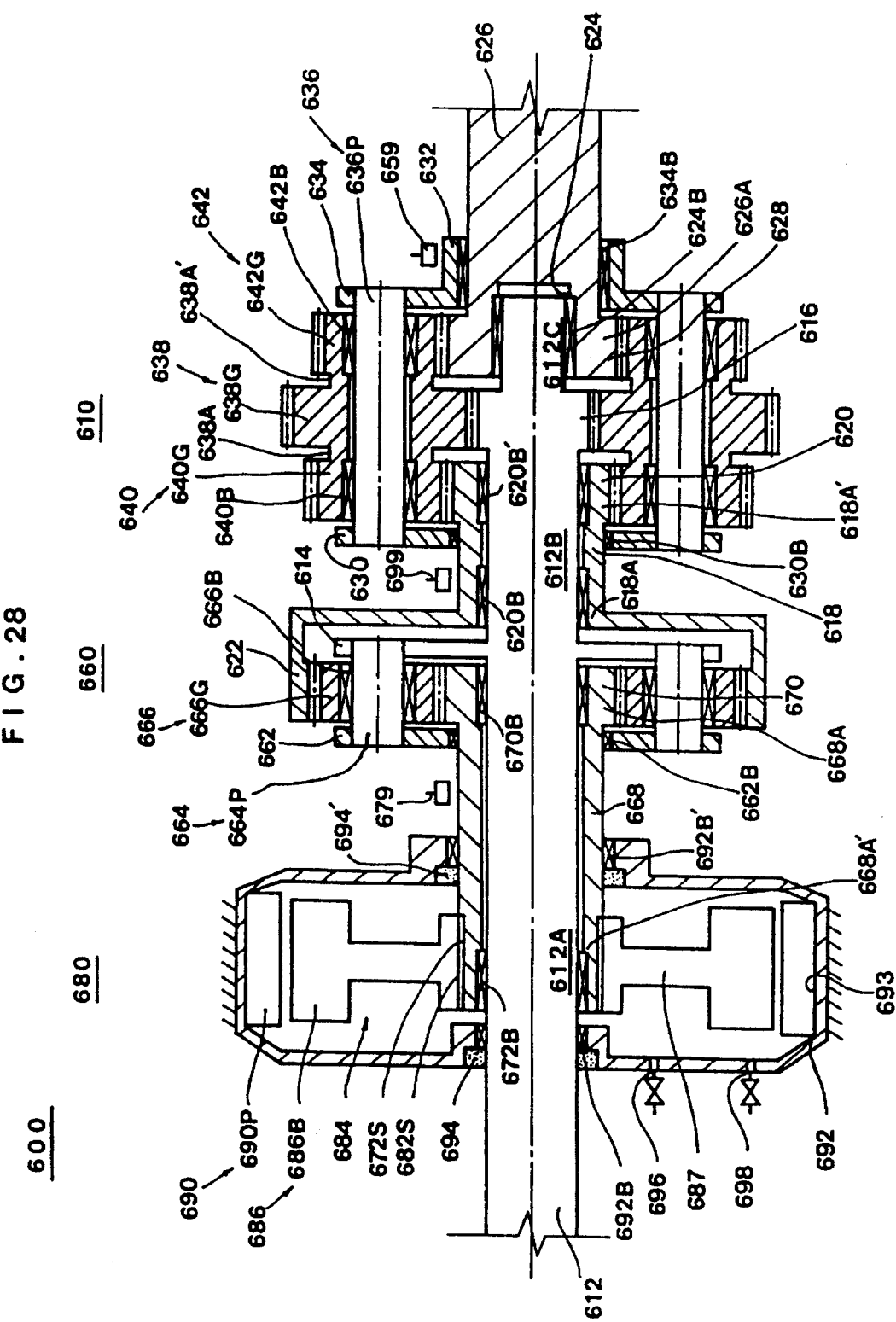

The stepless automatic variable transmission 600 of the sixth embodiment of the present invention, as shown in FIGS. 27 and 28, includes an input shaft 612 to which rotational driving force is input from the driving shaft of an engine. The input shaft 612 consists of a first section 612A, a second section 612B, and a terminal section 612C.

The input carrier 614 and an input sun gear 616 are integrally formed with the input shaft 612 between the first section 612A and the second section 612B, and between the second section 612B and the terminal section 612C, respectively. The speed change shaft 618A' of a predetermined length, is rotatably and coaxially mounted on the second section 612B of the input shaft 612. The reverse rotation sun gear 620 is integrally formed at the first and 618A' of the speed change shaft 618, and a control ring gear 622 is integrally formed at the second end 618A of the speed change shaft 618. Bearings 620B, 620B' are used so that the input shaft 612 and the speed change shaft 618 can independently rotate. The output shaft 626 includes a coaxial bore 624 formed therein. Bearing 624B is installed in the bore 624 to ensure that the output shaft 626 and the input shaft 612 rotate independently. The output shaft 626 includes an output sun gear 628 positioned at the first end 626A of the output shaft 626.

The carrier 630 is rotatably positioned on the speed change shaft 618 near the reverse rotation sun gear 620. Bearing 630B is used to ensure that the speed change shaft 618 and the carrier 630 can independently rotate. Disk carrier 634 having a tube shaft boss 632 is rotatably positioned on the output shaft 626 near the output sun gear 628. Bearing 634B is used to ensure that the output shaft 626 and the carrier 634 can independently rotate. The plurality of locking pins 636 interlink and secure each of the carriers 630, 634 together, as see FIG. 27, in order to enable the two carriers 630, 634 to simultaneously rotate about the shaft 618 and the output shaft 626, respectively.

A plurality of reverse rotation planetary gears 640, input planetary gears 638 and output planetary gear 642, are used. A reverse rotation planetary gear 640G, input planetary gear 638G and output planetary gear 642G, which are integrally formed, are rotatably positioned on each locking pin 636P of the plurality of locking pins 636. The reverse rotation planetary gear 640 is spaced apart 638A from the input planetary gear 638 and the input planetary gear 638 is spaced apart 638A' from the output planetary gear 642 which may be integrally formed and coaxially mounted on each locking pin 636P using bearings 640B, 642B to ensure simultaneous rotation about the locking pin, as illustrated at FIG. 28. The input planetary gear 638, the reverse rotation planetary gear 640 and the output planetary gear 642 are meshed with the input sun gear 616, the reverse rotation sun gear 620 and the output sun gear 628, respectively.

Two sets are used with a set consisting of a locking pin 636P and composite planetary gears 638G, 640g, 642G, however, the number of such sets is not limited.

OVERDRIVE SYSTEM 660

The control shaft 668 is coaxially and rotatably mounted on the input shaft 612 proximate the input carrier 614 which is secured between the first section 612A and the second section 612B of the input shaft, as see FIG. 28. The control shaft 668 includes a first end 668A with a control sun gear 670 positioned thereat and a second end 668A' with a plurality of splines 672S formed thereat. Bearings 670B, 672B are used to ensure that the input shaft 612 and the control shaft 668 can independently rotate. The carrier 662 is rotatably positioned on the control shaft 668 near the control sun gear 670 with a bearing 662B to ensure that the carrier 662 and the control shaft 668 can independently rotate. A plurality of locking pins 664 interlink and secure the two carriers 614, 662 together in order that carriers 614, 662 simultaneously rotate together, with the control sun gear 670 in the center, as see FIG. 27.

A plurality of overdrive planetary gears 666 are used with each overdrive planetary gear 666G being rotatably mounted via bearing 666B on each locking pin 664P so as to enable independent rotation. Each overdrive planetary gear 666G is meshed with the control sun gear 670 and the control ring gear 622, respectively.

SPEED CHANGE CONTROLLING SYSTEM 680

The construction of the speed change controlling system utilizes the principle of the action and reaction to maintain equilibrium.

A control blade member 684 having a plurality of control blades 686 extending radially therefrom and including a coaxial splined hub 682S formed therein is used. The splined hub 682S engages the plurality of splines 672S formed in the control shaft 668, which is rotatably and coaxially mounted on the first section 612A of the input shaft 612, to enable the control shaft 668 and the control blade member 684 to simultaneously rotate about the input shaft 612. Each control blade 686B of the plurality of control blades 686 extends radially at a constant angle so as to possess grater rotational resistance. Each control blade 686B preferably includes a connecting portion 687 which has less surface area relative to the blade, as illustrated at FIG. 28. The housing 692 is rotatably secured to the input shaft 612 and to the control shaft 668, via bearings 692B, 692B', in order to operatively enclose the control blade member 684 to prevent fluid contained in the housing from leaking out. Fluid-seals 694, 694' can also be used, for example. The housing further includes an internal surface 693 spaced apart from the plurality of control blades radially extending from the splined hub 682S, with a plurality of resistance plates 690 secured to the internal surface of the housing such that each resistance plate 690P is positioned proximate the control blades 686 as see FIG. 28.

The housing 692 is secured against rotation to, for example, the housing of the speed change system 610 or the overdrive system 660. A fluid inlet 696 and a fluid outlet 698 are formed in the housing 692 so that the amount of fluid in the housing can be regulated. In use, the housing 692 is filled to only about 90% of capacity, and in the state in which the automatic speed change is not required, e.g. in the neutral, reverse rotation, and starting state, the fluid is discharged from the housing by a pump or the like.

The structural characteristics and operating status of the speed change controlling system 680 as constructed above are that the variable transmission by itself can form a new speed change ratio continuously so that the engine's driving force of the moving vehicle corresponds to the load exerted on the output shaft. That is, the characteristics is that the speed change controlling system is constructed as a self-operated control type which utilizes the rotational force of the object of the rotation control.

Before describing the operation, because in the neutral, reverse, overdrive and starting states the transmission is operated at a fixed speed change ratio, each brake means is used, while under normal driving conditions after starting, the fluid in the housing is regulated in the speed change controlling system 680 in order that the automatic speed change can be made.

Reviewing the operating state, the control blades 686 which are installed in the housing 692 of the speed change controlling system 680, rotate and at the same time cause the fluid to be centrifugally forced against the resistance plates 690. Ultimately the fluid is forced back against the control blades 686, causing a decrease in the rotation of the control blades.

That is, the force which the control blades 686 tend to push out the fluid and force which the resistance plates 690 counterflow the fluid hinder the rotation of the control blades 686.

The rotation of the reverse rotation sun gear 620 increases in proportion to the gradual decrease in the rotation of the control blades 686 and therefore the rotation of the output shaft 626 increases. To the contrary, when the driving force of the engine is constant and the load of the output shaft 626 is large, the rotation of the control blades is gradually increased, but the rotation of the output shaft 626 decreases.

As described above, before the change of the load exerted on the output shaft has influence on the input shaft 612, the speed change ratio corresponding to the load is continuously determined and therefore the equilibrium state in which the driving force and the load are consistent can be made.

To change the speed of the output shaft the brake means for applying rotational braking force is used at each step.

First, the forward rotation brake means 659, which also includes a one-way clutch to enable rotation in only one rotational direction, is installed on the tube shaft boss 632 of the carrier 634 to apply the brake force to the carrier 634 in the low speed state. The overdrive brake means 679 is installed on the control shaft 668 to control the control sun gear 670 in the overdrive state. The reverse rotation brake means 699 is installed on the speed change shaft 618 to control the reverse rotation sun gear 620 in the reverse rotation state.

Although the brake means are illustrated as being installed on the tube shaft boss, the speed change shaft or the control shaft, the position of the installation or the construction can vary as appreciated by one skilled in the art. Although a one-way clutch is used in the forward rotation brake means 659 to eliminate the inconvenience of releasing the brake force again after applying the brake force at the time of speed change and to prevent the reverse direction rotation of the carriers 630, 634, other means may be used to accomplished this purpose.

A description of the power transmission procedure and speed variation conditions of this embodiment as constructed above is set forth below with the speed variation conditions classified into a natural, forward rotation, high speed and reverse rotation states.

Here, the rotational force received by the input shaft 612 is transmitted in two paths. In one path the rotational force is transmitted to the input carrier 614 of the overdrive system 660, and in the second path the rotational force is transmitted to the input sun gear 616 of the speed change system 610. For the convenience of explanation, the procedure is described according to each path the power is transmitted.

Figure 29:
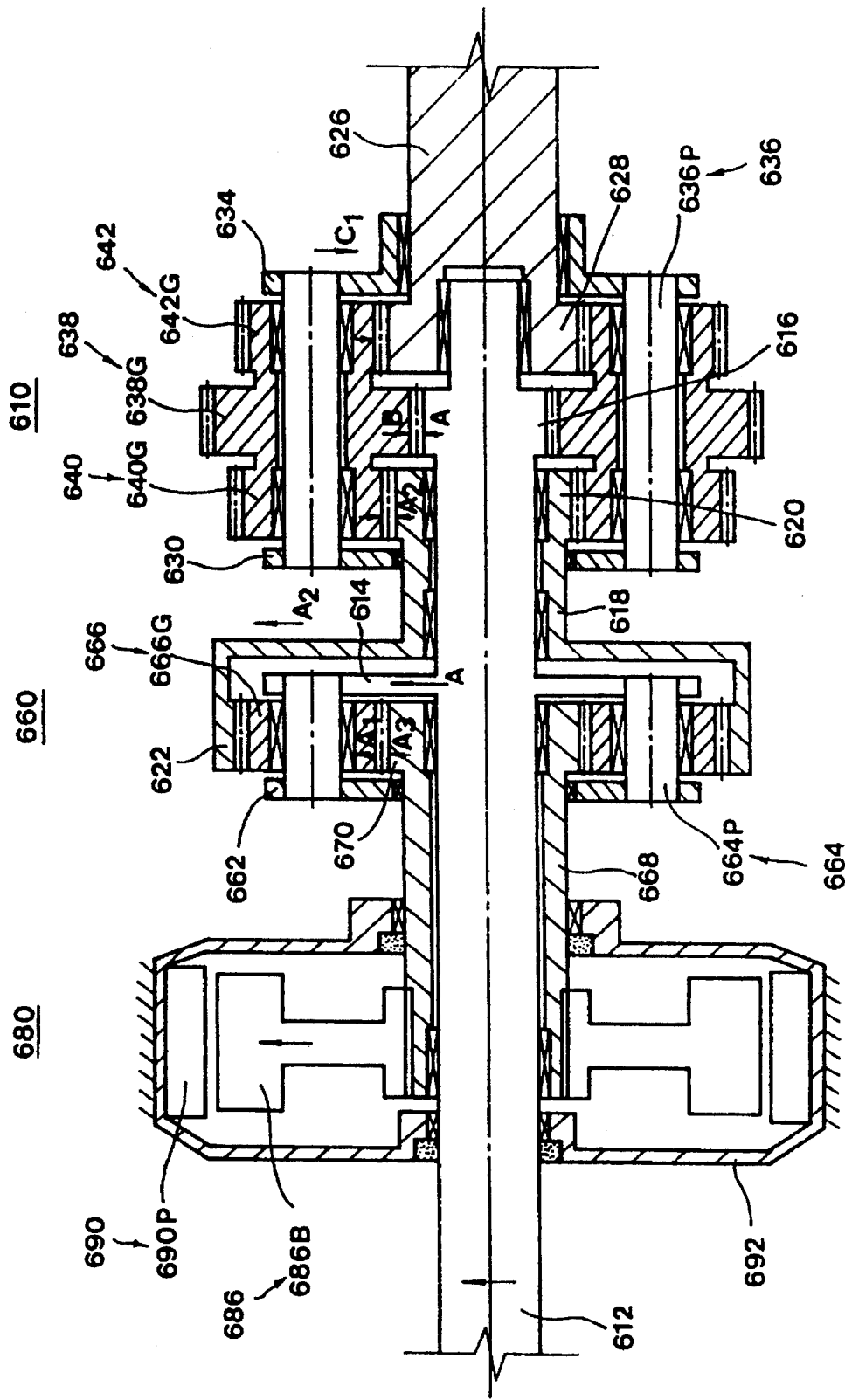

V-I. Neutral State (FIG. 29)

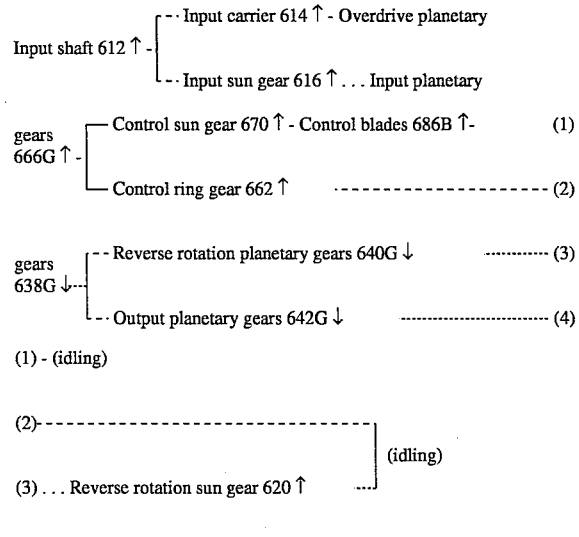

(1) - (idling)

(2)------------------------⎤
                           ⎥ (idling)
(3) ... Reverse rotation sun gear 620 ↑ ---⎦

(4) ... Output sun gear 628 stops - carriers 630, 634 ↓ (idling)

In the neutral state the driving force of the engine is not output to the output shaft 626 and the transmission idles as shown in FIG. 29. That is, if the rotational force from the driving shaft of the engine is input with a load applied on the output shaft 626, then the input shaft 612 rotates and the input carrier 614 of the overdrive system 660 integrally formed on the input shaft is rotated in direction "A". As the input carrier 614 is rotated, the overdrive planetary gears 666 are rotated about each locking pin 664P, of the plurality of locking pins 664, in direction A1 which is the same as that of the input carrier 614. The control ring gear 622, meshed with the overdrive planetary gears 666, is rotated in direction A2 which is the same as that of the input carrier 614. Also the control sun gear 670 meshed with overdrive planetary gears 666 and the control blades 686 integrally formed with the control sun gear 670, idles in direction A3 which is the same as that of the input carrier 614.

Here, reviewing the rotational direction of each gear in the overdrive system 660, all the gears rotate in the same direction as that of the input shaft 612 since the input carrier 614 is rotated concurrently with input shaft, the rotational force of each of the respective overdrive planetary gear 666G about its own axis is small, and the revolutionary force of carriers 614, 662 is large. The control blades 686 of the speed change controlling system 680 idle. That is, the control blades 686 do not receive more resistance in rotation thereof because the housing 692 of the speed change controlling system is not filled with the fluid as described above.

Next, simultaneously with the rotation of the input carrier 614 according to the rotation of the input shaft, the input sun gear 616 of the speed change system 610 is rotated in direction "A". As the input sun gear 616 is rotated, the input planetary gears 638P meshed with the input sun gear 616, are rotated about the locking pin 636P in direction "B" opposite to the rotational direction of the input sun gear 616. Therefore, the reverse rotation planetary gear 640G and the output planetary gears 642G, which are integrally formed with the input planetary gears 638G, rotate in direction "B" which is the same as that of the input planetary gears 638. However, because the output sun gear 628, meshed with the plurality of output planetary gears 642, is stationary due to the load, the plurality of output planetary gears 642 revolve around the output sun gear 628 while at the same time, rotating about their respective axes. Therefore carriers 630, 634 are rotated in direction C1, which is opposite to the rotational direction of the input shaft 612. The reverse rotation sun gear 620 meshed with each of the reverse rotation planetary gears 640G which are rotated in direction "B" opposite to the rotational rotation of the input shaft 612. Here, the reverse rotation sun gear 620 and the control ring gear 622 are rotated integrally.

Because the output shaft 626 is stationary due to the load, the rotational force through the input shaft 612 is not transmitted to the output shaft and makes the control blades 686, the reverse rotation sun gear 620, the control ring gear 622 and the carriers 630, 634 idle, which results in the neutral state.

Figure 30A:
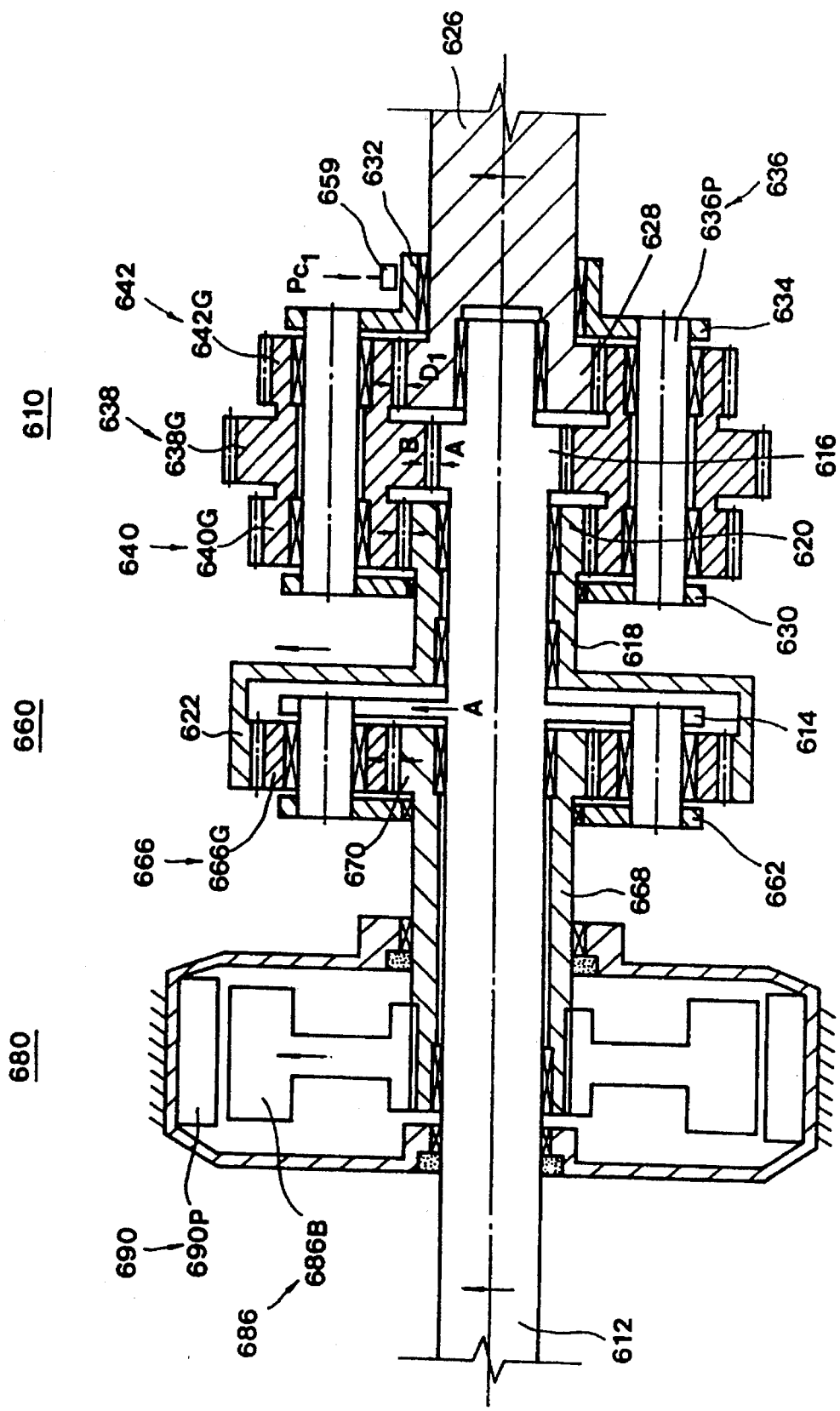
FIG. 30A is a sectional view of the sixth embodiment in the forward rotation driving state according to the present invention.
Figure 30B:
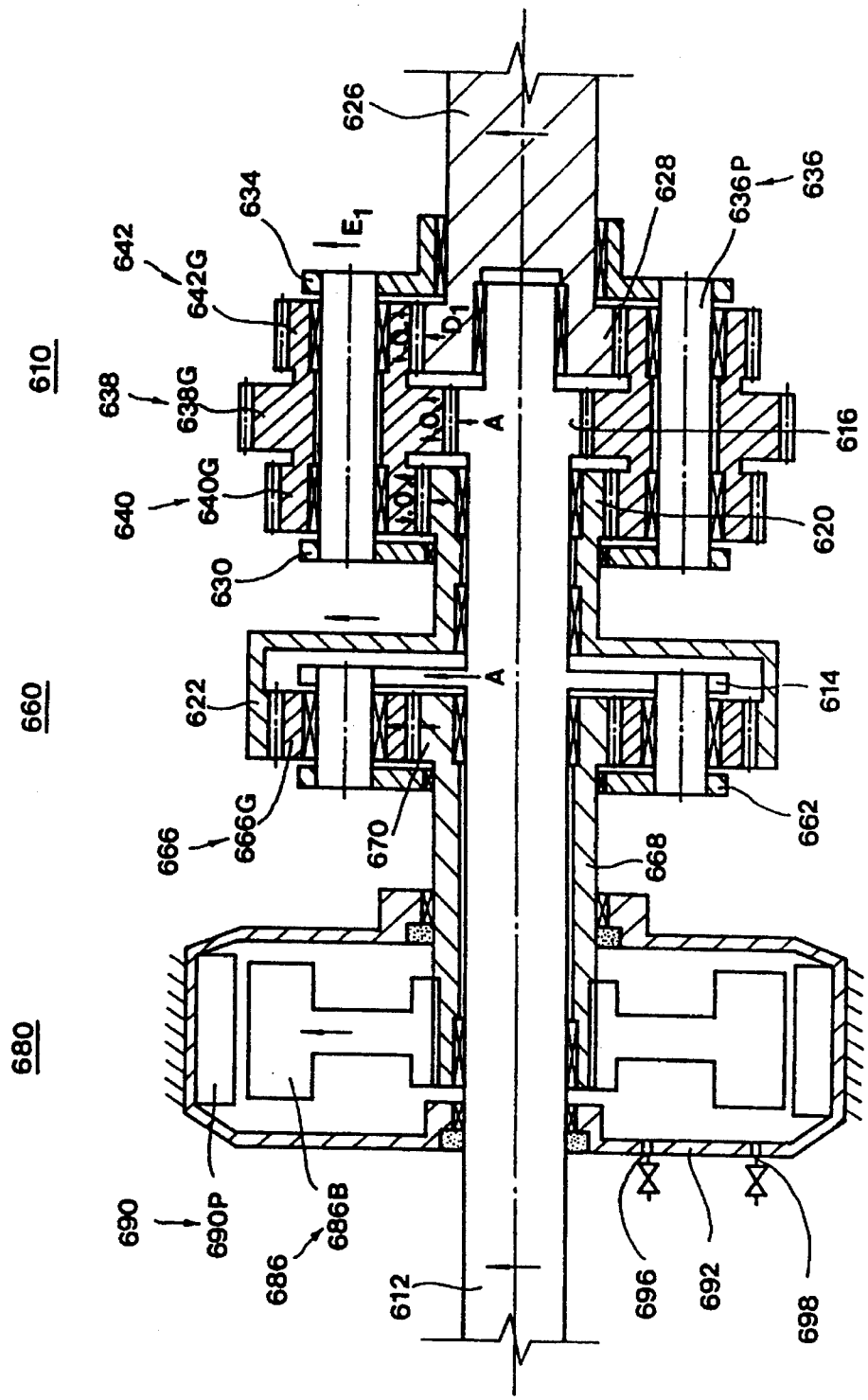
FIG. 30B is a sectional view of the sixth embodiment in the forward speed increasing state according to the present invention.

V-2. Forward Rotation State (FIGS. 30A and 30B)

Input shaft 612 ↑ - ⎡ -- Input carrier 614 ↑ - Overdrive planetary ge-
                    ⎣ -- Input sun gear 616 ↑ ... Input planetary gears -continued

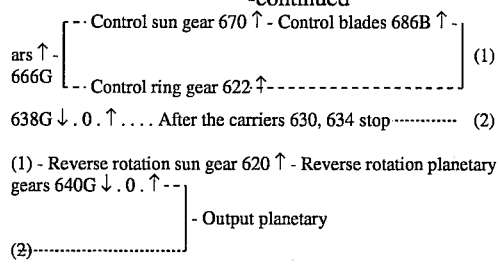

(1) - Reverse rotation sun gear 620 ↑ - Reverse rotation planetary gears 640G ↓ . 0 . ↑ --

```
                                      ⎤
                                      ⎥ - Output planetary
(2)-----------------------------------⎦
``` gears 642G ↓ . 0 . ↑ - Output sun gear 628 ↑ - Output shaft 626 ↑ (Direction ↓ . 0 . ↑ illustrates the rotational direction of the planetary gears, until the carriers stop, the equilibrium state, and the speed increasing state after the equilibrium state, respectively)

In the forward rotation low speed state the rotation of the output shaft 626 is gradually increased from the neutral state. If in the above described neutral state a brake force Pc1 is applied by the forward rotation brake means 659 installed on the tube shaft boss 632 of the carrier 634, the rotation of the carriers 630, 634, which were rotating in a direction C1 opposite to that of the input shaft 612, decreases and stops. Therefore the rotation of output shaft 626 gradually increases in proportion to the decrease of the rotation of the carriers 630, 634.

FIG. 30A illustrates the transmission of rotational power as accomplished by the operation of only the speed change system 610. As the input sun gear 616 is rotated, the input planetary gears 638 meshed with it are rotated in the same direction "B", which is as in the neutral state, and the rotation about the locking pin 636P decreases until the carriers 630, 634 stop. Therefore, the rotation of each of the output planetary gears 642G integrally formed with the input planetary gears 638 about their own axes also decreases.

As the rotational force of the output planetary gears 642 becomes greater than the revolving force, the output sun gear 628 meshed with the output planetary gears 642 and the output shaft 626 integrally formed with it are rotated in direction D1 which is the same as that of the input shaft 612. In this speed change procedure, the output shaft 626 is rotated at a fixed speed change ratio according to given teeth ratio when the carriers 630, 634 stop.

Thereafter the fluid is drawn into the speed change controlling system 680. In this procedure, the rotation is automatically controlled by the control blades 686 of the speed change controlling system 680 according to the load exerted on the output shaft 626 and such controlled rotational force increases the rotation of the control ring gear 622 in the rotational direction of the input shaft, and also increases the rotation of the reverse rotation sun gear 620 integrally formed with the control ring gear 622 in the same direction.

FIG. 30B illustrates the state where the rotation of the output shaft is increasing over the state illustrated at FIG. 30A. In this case, the rotation of the carriers 630, 634 is increased in direction E1, which is the same as that of the input shaft 612. As the rotation of the reverse rotation sun gear 620 continuously increases, the rotational direction of the reverse rotation planetary gear 640G, which is meshed with the reverse rotation sun gear 620 and is rotating in direction "B" opposite to that of the input shaft, changes into direction "A", which is the same as that of the input shaft 612. Just as the reverse rotation planetary gears 640G which change rotational direction from direction "B" into direction "A" same as that of the input shaft, the revolving force of the carriers 630, 634 increases and the input planetary gears 638 and the output planetary gears 642 change rotational direction and rotate in the same direction "A" as that of the input shaft 612.

In this state, the rotation of the control blades 686 in the speed change controlling system 680 decreases due to the resistance force of the resistance plates 690 and therefore the rotation of the output shaft is gradually increased.

At this time each planetary gear 638G, 640G, 642G revolves with the carriers 630, 634 while at the same time rotating about its respective locking pin 636P. The driving force which is transmitted to the input planetary gears 638 through the input sun gear 616 of the speed change system 610 and the driving force which is transmitted to the reverse rotation planetary gears 640 through the input carrier 614 of the overdrive system 660 join together at the output planetary gears 642 to further increase the rotation of the output sun gear 628 meshed with the output planetary gears and the output shaft 626 integrally formed with the output sun gear in the direction D1 which is the same as that of the input shaft 612.

In this state, in proportion to the increase of the rotation of the output shaft 626, the rotation of each planetary gear 38G, 640G, 642G about its own axis is decreased and the revolution thereof with the carriers 630, 634 is increased.

For reference, as the revolution of each planetary gear 38G, 640G, 642G revolving together with the carriers 630, 634 is increased, the output sun gear 628 meshed with the output planetary gears 642 cannot be rotated in a direction opposite to that of the input shaft 612 but is rotated in the same direction D1 as the input shaft. This occurs because the influence of the increasing revolutionary force becomes larger than the influence of the rotational force of the output planetary gears 642. Because the influence of the increasing revolutionary force of the reverse rotation planetary gears 640 becomes relatively larger than that of the rotational force, it promotes the rotation of the reverse rotation sun gear 620 meshed with the reverse rotation planetary gears in the same direction as the input shaft, and owing to this the rotation of the control ring gear 622 decreases the rotation of the control sun gear 670.

Therefore, because the rotation of the control blades 686 integrally formed with the control sun gear 670 is decreased, a new speed change ratio which can correspond with the load variation of the output shaft 626 by only small resistance force of the control blades is determined, and this speed change ratio constitutes the optimum equilibrium state in which the engine driving force and the resistance of moving the automobile is equal.

Reviewing the rotational state, as the rotation of the output shaft 626 is increased, the revolving force of each planetary gear 638G, 640G, 642G revolving together with the carriers is increased, the rotation thereof about its own axis is decreased, and when the rotation of the output shaft is same as that of the input shaft 612, all the elements form a rotating body with the input and output shaft in the center.

Figure 31:
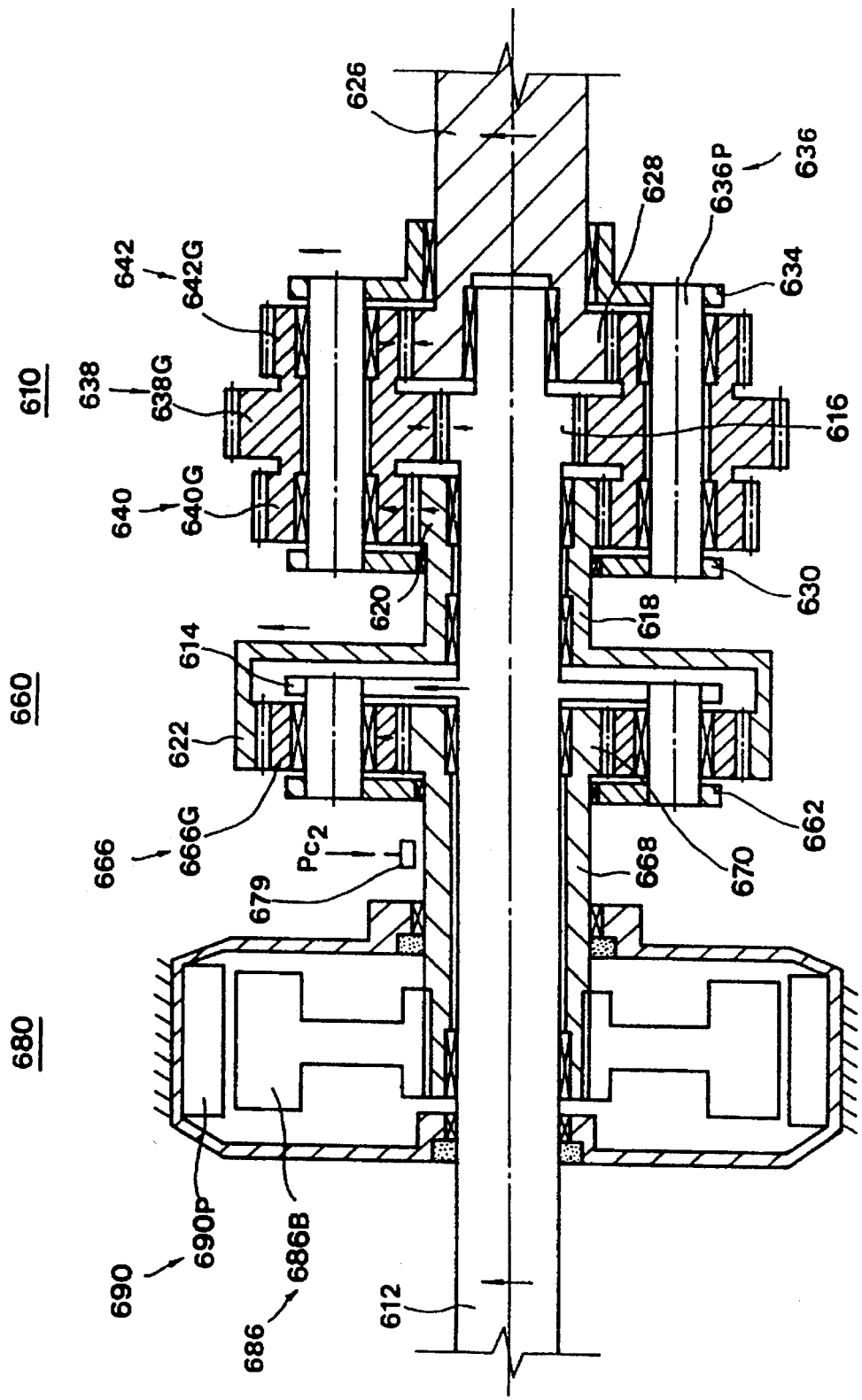

V-3. Overdrive State (FIG. 31)

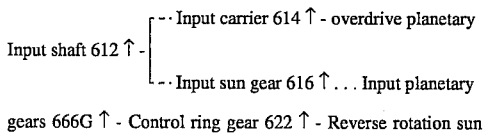

gears 666G ↑ - Control ring gear 622 ↑ - Reverse rotation sun

-continued gear 620 ↑ - Reverse rotation planetary gears 640G ↑ -- gears 638G ↑ ... carriers 630, 634 ↑ ----------------

Output planetary gears 642G ↑ - Output sun gear 628 ↑ - Output shaft 626 ↑

In the overdrive state a further acceleration from the forward rotation state described above takes place. If a brake force PC2 is applied by the overdrive brake means 679 installed on the control shaft 668, the rotation of the control blades 686 and the control sun gear 670 stops and the output shaft 626 rotates in an overdrive state.

In this state, the rotational force passing through the input shaft 612 is transmitted along two paths. In one path the rotational force is transmitted to the reverse rotation planetary gears 640 by passing through the input shaft 612, the input carrier 614 of the overdrive system 660, the overdrive planetary gears 666, the control ring gear 622, and the reverse rotation sun gear 620. In the other path the rotational force is transmitted to the input planetary gears 638 by passing through the input shaft 612 and the input sun gear 616 of the speed change system 610.

The rotational forces, after passing through these two paths, join together at the carriers 630, 634 and the output planetary gears 642, and increase the rotation of the output sun gear 628 and the output shaft 626 over that of the input shaft 612. At this time, because the revolutions input from the control ring gear 622 of the overdrive system 660 are greater and the revolutions input from the input sun gear 616 are less, in order to transmitted it to the output sun gear 628 by uniting the different revolutions from the two paths into one, the rotation of the carriers 630, 634 is increased more than that of the input shaft 612.

In this state, the rotational direction of all the gears and carriers is same as that of the input shaft 612, and each planetary gear 638G, 640G, 642G is rotated about its own axis by a difference in numbers of revolutions input from the two paths.

Figure 32:
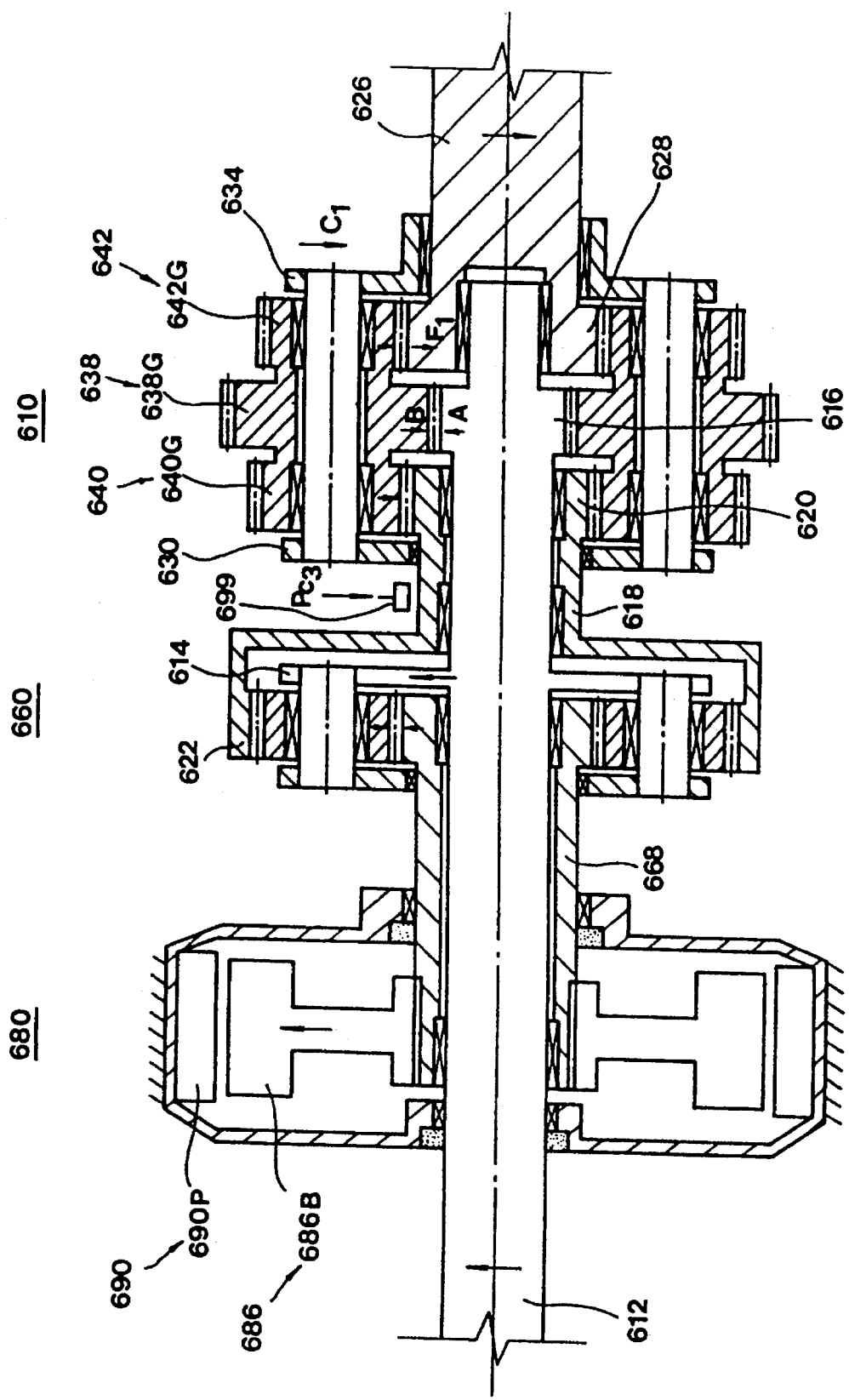

V-4. Reverse Rotation State (FIG. 32)

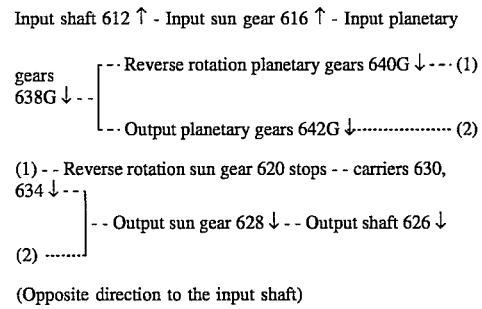

(Opposite direction to the input shaft)

A description of the overdrive system 660 and the speed change controlling system 680 is omitted because in the reverse state the output shaft 626 is rotated at a given fixed ratio by a compulsory speed change method which does not require an automatic speed change.

In the reverse rotation state the output shaft 626 rotates in a direction opposite to that of the input sun gear 616. Upon applying a brake force PC3 by the reverse rotation brake means to the speed change shaft 618 in the neutral state, then the reverse rotation sun gear 620, which was idling in direction A2 which is the same as the rotational direction as the input shaft 612, slows and stops and the output shaft 626 is rotated in direction F1 which is opposite to that of the input sun gear 616.

In operation as the input sun gear 616 is rotated, the input planetary gears 628 meshed with it are rotated in the same direction "B" as in the neutral state. Both the reverse planetary gears 640 and the output planetary gears 642 rotate in direction "B". However, as the reverse rotation sun gear 620 slows and stops, the reverse rotation planetary gears 640 meshed with it revolve around the reverse rotation sun gear 620.

Therefore, as the revolutions of the reverse rotation planetary gears 640 increases, the carriers 630, 634 which were rotating in direction C1 in the neutral state, rotate more rapidly. At the same time, the input planetary gears 638 and the output planetary gears 642, which are integral with the reverse rotation planetary gears 640G, also rotate about their own axes and increase their revolutions together with the carriers 630, 634. Therefore, as the revolutions of the output planetary gears 642 revolving together with the carriers increases, the output sun gear 628 meshed with it cannot rotate in the same direction as the input shaft 612 but is rotated in direction F1 which is opposite to that of the input shaft because the influence of the revolving force of the output planetary gears 642 becomes relatively greater than that of the rotational force.

Note that the relative magnitude between the revolving force and the rotational force varies according to the change in the number of teeth of each meshed gear.

A description of the seventh embodiment of the stepless automatic variable transmission of the present invention combines the speed change system 610, overdrive system 760 and speed change controlling system 780 with reference to FIGS. 33–38 follows.

In the stepless automatic variable transmission 700 of the seventh embodiment of the present invention only the overdrive system 760 and the speed change controlling system 780 are constructed different than similar systems in the sixth embodiment. The construction of the speed change system 610 is same as that in the sixth embodiment and is omitted hereat for the sake of brevity. The overdrive system and the speed change controlling system is described using the same reference numerals for similar parts. The brake means which applies a braking force to perform the speed change at each stage is the same as that of the sixth embodiment except for the fact that the position of installation is different due to the change in the construction of the overdrive system, therefore only a brief description is given. The operation of the overdrive system and the speed change controlling System is the same as that of the sixth embodiment, therefore only a brief description is given.

The speed change controlling system 780 utilizes an impeller and a turbine of a conventional torque converter but does not utilize either a stator or a fluid pump. Thus, the description of the system 780 is based on the construction of a conventional converter with certain changes it the names of the functioning elements.

The impeller (pump) disk of the torque converter is referred to as a resistance plate, the impeller blades are referred to as resistance blades, the turbine disk is referred to as a control plate, and turbine blades are referred to as control blades. The housing encloses the resistance plate, the control plate and control blades, prevents fluid leakage from the housing and includes a fluid outlet and fluid inlet.

The arrangement of the functioning elements is different than that of the conventional converter. That is, the resistance plate is installed near the engine and the control plate is installed near the speed change system, with the spacing between them being the same as in the conventional device, as see FIG. 34. The relative positions of the overdrive system and the speed change controlling system are same as for the sixth embodiment, as compare FIG. 27 and FIG. 33.

Below is given a detailed description of the overdrive system 760 and the speed change controlling system 780 of the seventh embodiment 700 according to the present invention in conjunction with accompanying drawings.

OVERDRIVE SYSTEM 760

Figure 33:
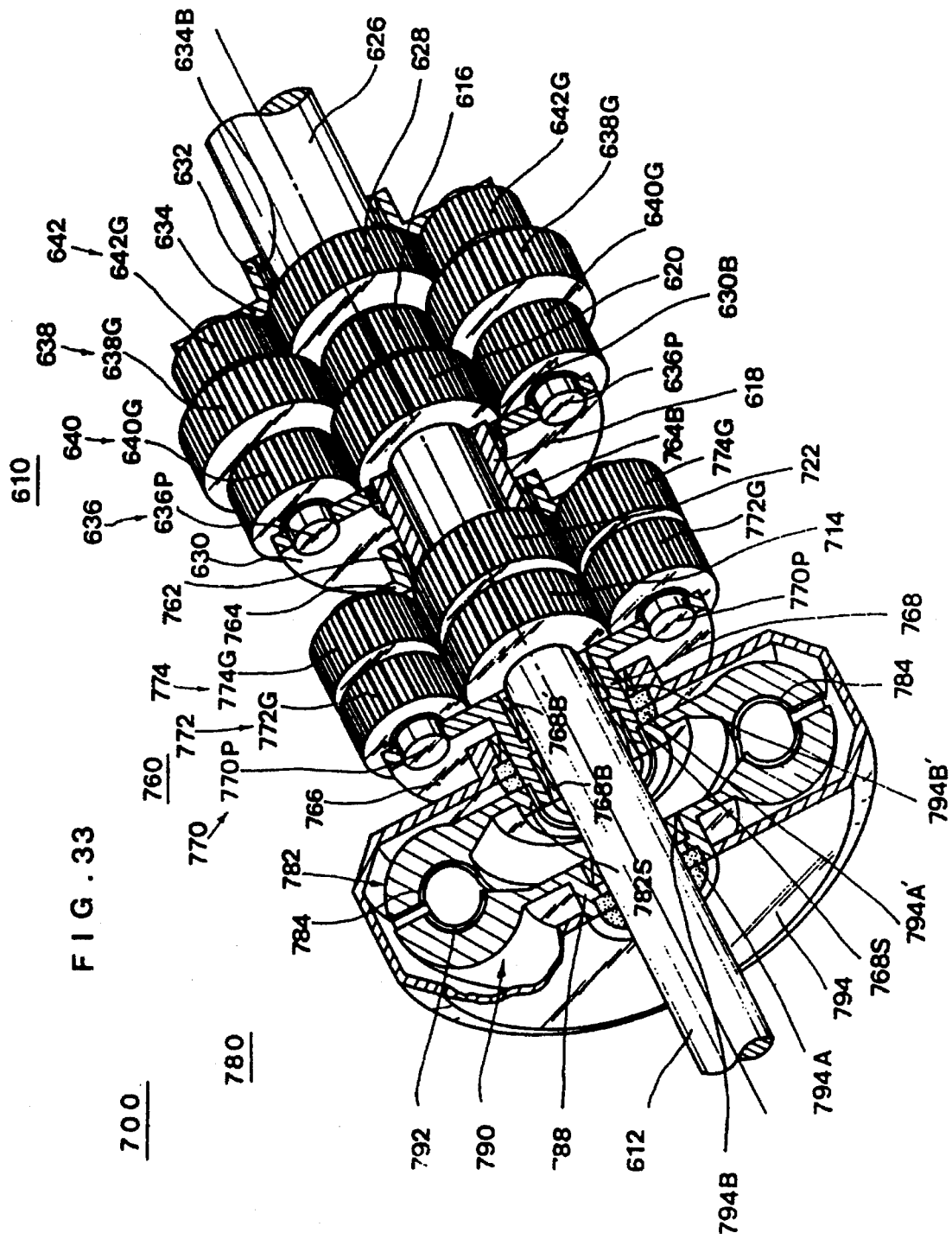
Figure 34:
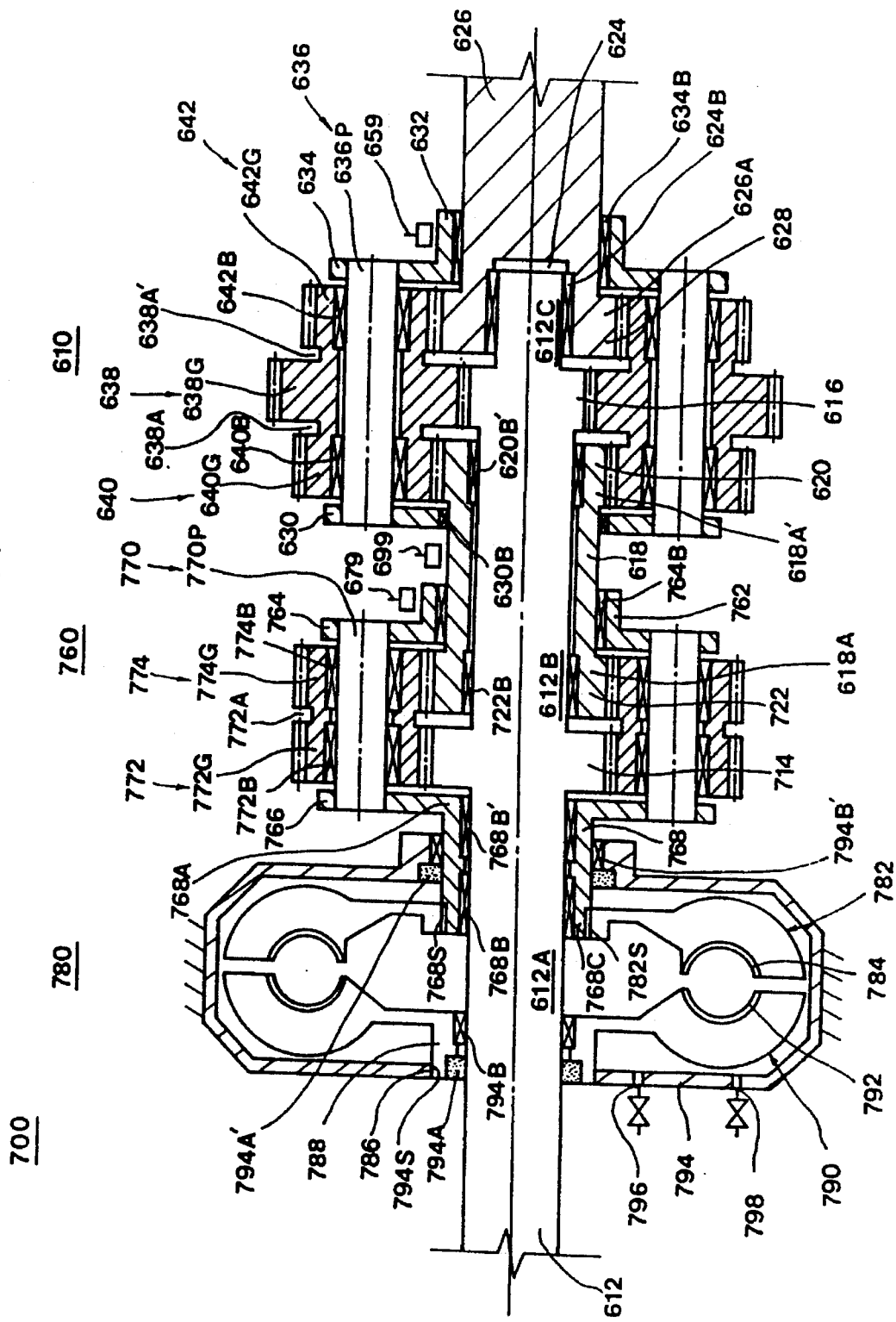

As shown in FIGS. 33 and 34, the overdrive sun gear 714 is integrally formed on the input shaft 612 between the first section 612A and the second section 612B. The speed change shaft 618 of a predetermined length is rotatably and coaxially mounted on the second section 612B of the input shaft 612. The control sun gear 722 is integrally formed at the second end 618A of the speed change shaft 618, and the reverse rotation sun gear 620 of the speed change system 610 is integrally formed at the first end 618A' of the speed change shaft 618. Bearings 620B', 722B are used to enable the input shaft 612 and the speed change shaft 618 to rotate independently.

The carrier 764, including a tube shaft boss 762, is rotatably and coaxially positioned on the speed change shaft 618 near the control sun gear 722 with bearing 764B being used to enable the carrier 764 to rotate independently about the speed change shaft 618. The control shaft 768 having a first end 768A and a second end 763C with the carrier 766 integrally formed at the first end 768A thereof and being rotatably and coaxially mounted on the first section 612A of the input shaft to enable independent rotation about the input shaft. Bearings 768B, 768B' are used to enable the control shaft 768 and carrier 766 to independently rotate about the input shaft 612 together. The control shaft 768 terminates with a plurality of splines 768S formed thereat to engage the coaxial splined hub 782S of the control plate 782 to enable the control plate 782 to rotate simultaneously with the control shaft 768.

A plurality of locking pins 770 interlink and secure together the two carriers 764, 766 to enable simultaneous rotation. A plurality of overdrive planetary gears 772 and a plurality of control planetary gears 774 are used. An overdrive planetary gear 772G and a control planetary gear 774G are spaced apart 772A relative to each other, are integrally formed and rotatably, via bearings 772B, 774B, and coaxially positioned on a locking pin 770P. While FIG. 34 shows the overdrive planetary gear 772G and the control planetary gear 774G as being the same size, their respective size can differ, as appreciated by one skilled in the art. The overdrive planetary gear 772G and the control planetary gear 774G are meshed with the overdrive sun gear 714 and the control sun gear 722, respectively.

To engage the overdrive system, the overdrive brake means 679 applies a rotational brake force to the tube shaft boss 762 of the carrier 764.

SPEED CHANGE CONTROLLING SYSTEM 780

The control shaft 768 terminates with a plurality of splines 768S formed thereat to securely engage the coaxial splined hub 782S of the control plate 782 to enable the control plate 782 to rotate simultaneously with the control shaft 768. The control plate 782 includes a plurality of control blades 784 extending radially therefrom at a angle so as to increase rotational resistance.

The resistance plate 790, having a plurality of resistance blades 792 extending radially therefrom in the same shape as the control blades 784, is rotatably and coaxially mounted on tile input shaft 612. One method of securing the resistance plate 790 to the input shaft 612 is to coaxially and rotatably mount a fixed shaft 788 of predetermined length on to the input shaft and to coaxially securely mount the resistance plate thereto.

The housing 794 encloses the control plate 782 and resistance plate 790 to contain and prevent fluid from leaking out, as see FIG. 34. The housing 794 includes a splined hub 794S to receive the plurality of splines 786 formed onto the fixed shaft. Bearing 794B is used to enable the input shaft 612 to rotate independently from the fixed shaft 788. Also, a fluid-seal 794A is used proximate the bearing 794B to prevent fluid from leaking out of the housing during use. In like manner, the housing is rotatably secured to the control shaft 768 by the use of bearing 794B' and a fluid-seal 794A' is used to prevent fluid from leaking out of the housing during use.

The plurality of control blades 784 are positioned across from the plurality of resistance blades 792, such that they are spaced apart a very small distance in order to ensure there is no frictional engagement between the blades.

The housing 794 which fixes the resistance plate 790 is secured to the outside, for example, the housing of the speed change system. Fluid inlet 796 and fluid outlet 798 are formed in the housing 794 so that the amount of fluid in the housing can be regulated. For example, in use, the housing is 90% filled with fluid. However, where the automatic speed change is not required, e.g. in the neutral, reverse rotation, and starting state, the fluid is discharged into a reservoir.

In view of the fact that the power transmission procedure and the principle of the speed change state of the seventh embodiment of the stepless automatic variable transmission are similar to those of the sixth embodiment, only a brief description follows.

Figure 35:
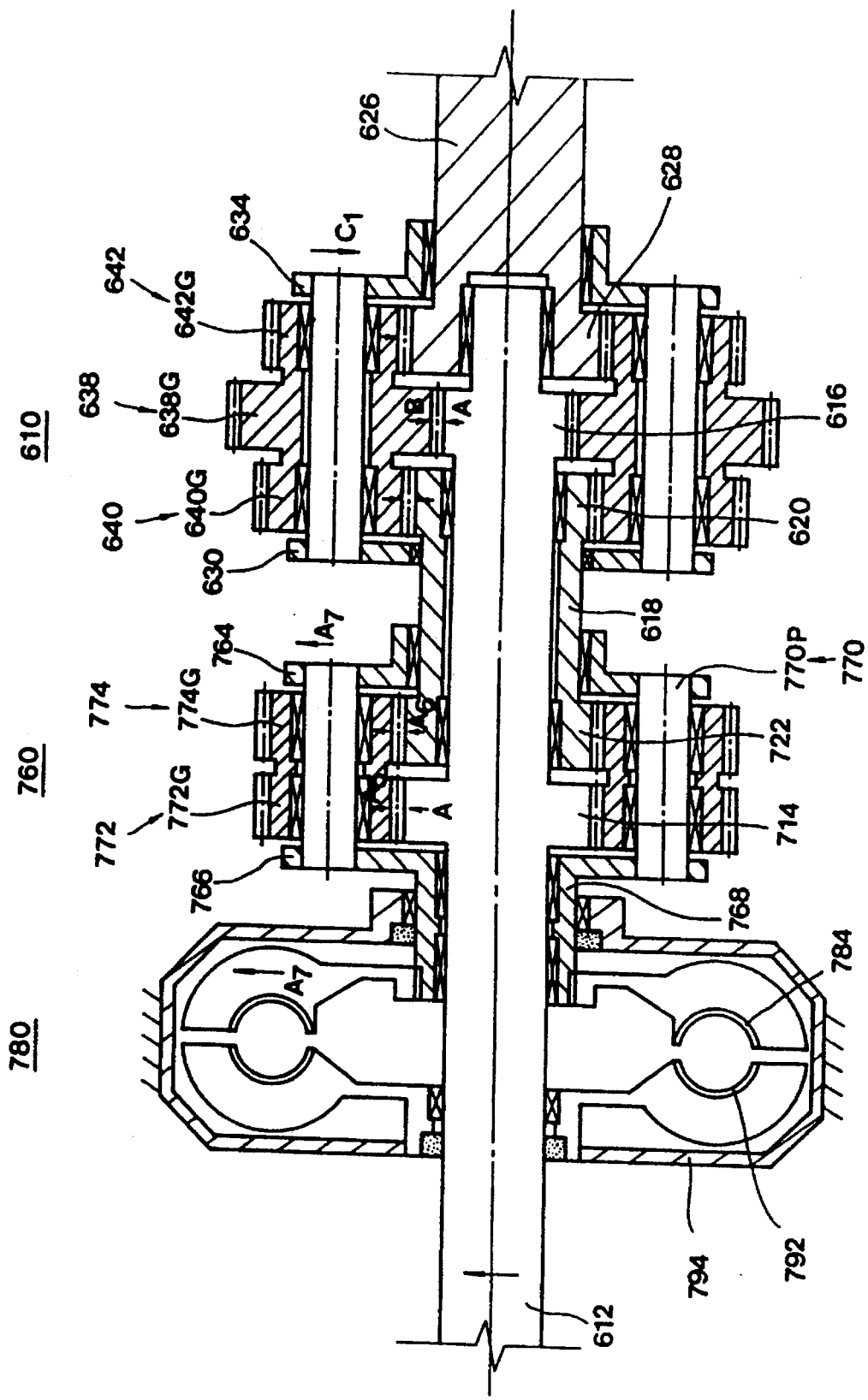

VI-1. Neutral State (FIG. 35)

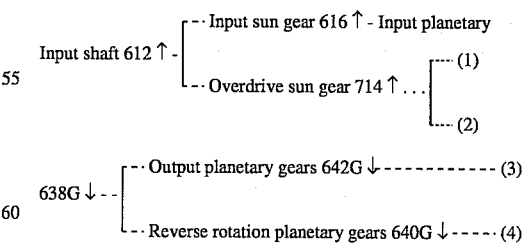

-continued (3) - Output sun gear 628 stops - carriers 630, 634 ↓ (idling)

(4) - Reverse rotation sun gear 620 ↑ ─────────────┐
(5) ········→ planetary gears 774G ↑ . . . Control sun gear 722G ↑ ──┘  (idling)

(6) . . . Control blades 784 ↑ (idling)

Since the operation and the rotational direction of the speed change system 610 in the neutral state are same as in the neutral state of the sixth embodiment and, therefore, a further description is not considered necessary.

A description of the overdrive system 760 follows. In the neutral state the driving force of the engine is not output to the output shaft 626 and the transmission idles as shown at FIG. 35. That is, if the rotational force from the driving shaft of the engine is input where a load is applied on the output shaft 626, the input shaft 612 is rotated and the overdrive sun gear 714 of the overdrive system 760 integrally formed on the input shaft is rotated in direction "A". A plurality of overdrive planetary gears 772, of control planetary gears 774 and locking pins 770 are used in this embodiment. As the overdrive sun gear 714 is rotated, each of the overdrive planetary gears 772G meshes with it and each of the control planetary gears 774G, integrally formed with the overdrive planetary gears, rotates about each locking pin 770P, respectively, in a direction A5 which is the same as that of the overdrive sun gear 714. The control sun gear 722, meshed with the control planetary gears 774, is rotated in direction A6, which is the same as that of the overdrive sun gear 714. Because the output shaft 626 is stationary, the carriers 764, 766 are rotated more rapidly in direction A7, and therefore the control shaft 768, integrally formed with the carriers and the control blades 784, are rotated in the same direction A7.

Here, reviewing the rotational direction of each gear in the overdrive system 760, all the gears are rotated in the same direction as that of the input shaft 612. The reason is that the revolutionary force of the overdrive planetary gear revolving together with the carriers 764, 766 is greater than the rotational force of that about its own axis. The control blades 784 of the speed change controlling system 780 idle. This is because the control blades 784 do not receive more rotational resistance because the housing 794 of the speed change controlling system is not filled with the fluid as described in the sixth embodiment.

Figure 36A:
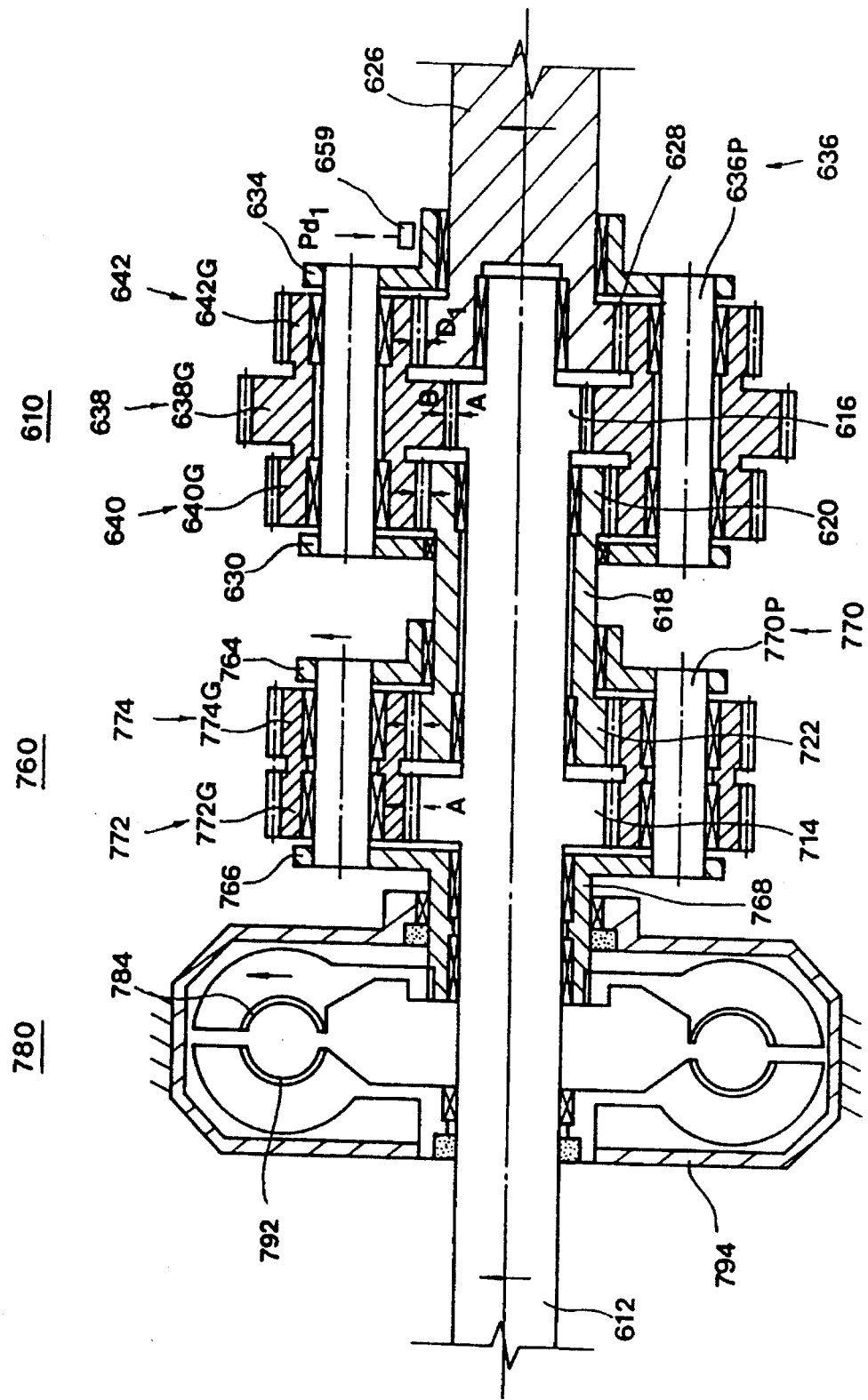
FIG. 36A is a sectional view of the seventh embodiment in the forward rotation driving state according to the present invention.

VI-2. Forward Rotation State (FIGS. 36A and 36B)

Input shaft 612 ↑ ─┬── Overdrive sun gear 714 ↑ ─┬── Overdrive → (1)
                  │                              └── Carriers → (2)
                  └── Input sun gear 616 ↑ . . . Input ────→ (3)

(1) → planetary gears 772G ↑ - Control planetary gears 774G ↑ ────┐
(2) → 764, 766 ↑ - control of rotation of control blades 784 ↑ ──┤ - (4)
(3) ····→ planetary gears 638G ↓ . 0 .↑ ─────────────────── (5)

-continued (4) - Control sun gear 722 ↑ - Reverse rotation sun gear

620 ↑ - Reverse rotation planetary gears 640G ↓ . 0 . ↑ ──┐
(5) . . . after carriers 630, 640 stop ─────────────────┤ -- Output planetary gears 642 ↓ . 0 . ↑ - Output sun gear 628 ↑ - output shaft 626 ↑ (direction ↓ . 0 . ↑ illustrates the rotational direction of the planetary gears, until the carriers stop, the equilibrium state, and speed increasing state after the equilibrium state, respectively).

The application of the brake force Pd1 to achieve forward rotation in the low speed state is same as that of in the sixth embodiment, as see FIG. 36A. A description of the procedure from when the fluid is sucked or drawn into the speed change controlling system 730 is set forth blow.

From the time when the fluid is sucked or drawn into the housing 794 of the speed change controlling system 780, the rotation is automatically controlled by the control blades 784 according to the load exerted on the output shaft 626 and such controlled rotational force increases the rotation of the control sun gear 722 in the rotational direction of input shaft, and also increases the rotation of the reverse rotation sun gear 620 of the speed change system 610 integrally formed with the control sun gear 722. As shown at FIG. 36B, the rotation of the carriers 630, 634 is increased in direction E1, which is the same as that of the input shaft 612. As the rotation of the reverse rotation sun gear 620 continuously increases, the rotational direction of the reverse rotation planetary gear 640G, which is meshed with the reverse rotation sun gear 620 and is rotating in direction "B" opposite to that of the input shaft, changes into direction "A", which is the same as that of the input shaft 612. In this state, the rotation of the control blades 784 in the speed change controlling system 780 decreases due to the resistance force of the resistance blades 792 and therefore the rotation of the output shaft is gradually increased.

Just as the reverse rotation planetary gears 640G which change rotational direction from direction "B" into direction "A" the revolving force of the carriers 630, 634 increases and the input planetary gears 638 and the output planetary gears 642 also change rotational direction and rotate in the same direction "A" as that of the input shaft 612. At this time each planetary gear 638G, 640G, 642G revolves with the carriers 630, 634 while at the same time rotating about each locking pin 636P. The driving force which is transmitted to the input planetary gears 638 through the input sun gear 616 of the speed change system 610 and the driving force which is transmitted to the reverse rotation planetary gears 640 through the overdrive planetary gears 772 of the overdrive system 760 join at the output planetary gears 642 and further increase the rotation of the output sun gear 628 meshed with the output planetary gears and the output shaft integrally formed with the output sun gear in direction D1, which is the same as that of the input shaft 612.

In this state, in proportion to the increase of the rotation of the output shaft 626, the rotation of each planetary gear 638G, 640G, 642G about its axis decreases and the revolution thereof with the carriers 630, 634 increases.

Reviewing the rotational direction in this state, the control blades 784, all the gears and carriers 764, 766 in the overdrive system 760, and all the gears in the speed change system 610 are rotating in the same direction as the input shaft 612.

Figure 37:
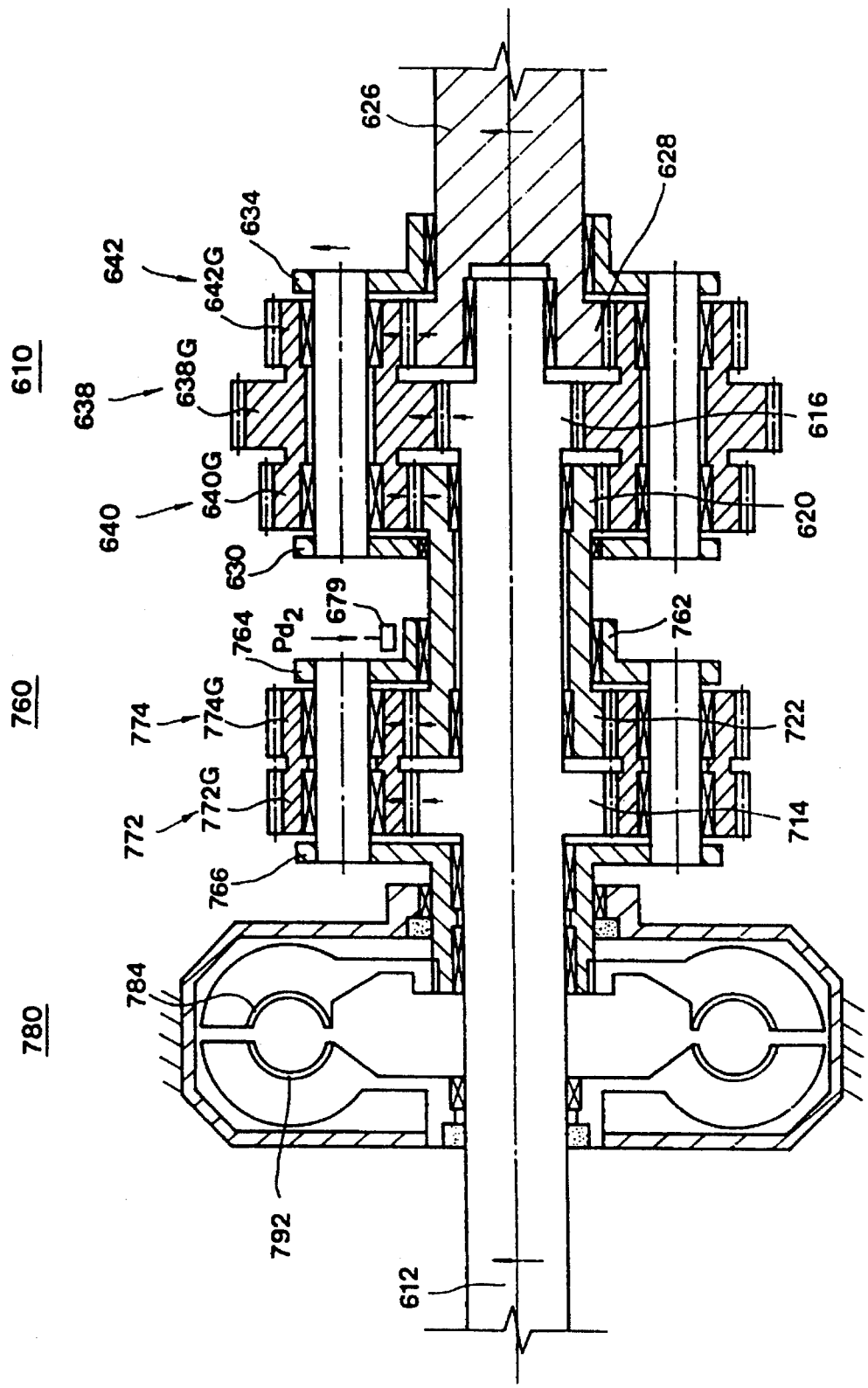

VI-3. Overdrive State (FIG. 37)

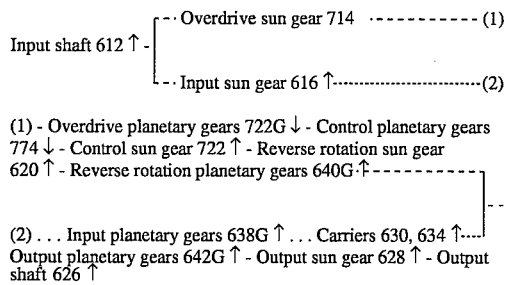

(1) - Overdrive planetary gears 722G ↓ - Control planetary gears 774 ↓ - Control sun gear 722 ↑ - Reverse rotation sun gear 620 ↑ - Reverse rotation planetary gears 640G ↑ ─────┐
(2) ... Input planetary gears 638G ↑ ... Carriers 630, 634 ↑ ──┘
Output planetary gears 642G ↑ - Output sun gear 628 ↑ - Output shaft 626 ↑

In the overdrive state a further acceleration from the forward rotation state described above takes place. Application of a brake force Pd2 by the overdrive brake means 679 to the tube shaft boss 762 of the carrier 764, causes the rotation of the control blades 784 of the speed change controlling system 780 and the carriers 764, 766 of the overdrive system 760 to glow and stop and the output shaft 626 rotates in the overdrive state. In this state, the rotational force passing through the input shaft 612 is transmitted along two paths. In one path rotational force rotates the overdrive sun gear 714 of the overdrive system 760 by passing through the input shaft 612, rotates the overdrive planetary gears 772 in a direction opposite to that of the input shaft, and rotates the control planetary gears 774 integrally formed with the overdrive planetary gears 772 in a direction opposite to that of the input shaft, rotates the control sun gear 722 meshed with the control planetary gears 774 and the reverse rotation sun gear 620 integrally formed with the control sun gear in the same direction as that of the input shaft, and is transmitted to the reverse rotation planetary gears 640 meshed with the reverse rotation sun gear 620. In the other path the rotational force rotates the input sun gear 616 by passing through the input shaft 612 and is transmitted to the input planetary gears 638.

The rotational forces, after passing along these two paths, join at the carriers 630, 634 and the output planetary gears 642, and increase the rotation of the output sun gear 628 and the output shaft 626 greater than that of the input shaft 612. At this time, because the revolutions input from the control sun gear 722 of the overdrive system 760 is greater and the revolutions input from the input sun gear 616 of the speed change system 610 is less, in order to transmit it to the output sun gear 628 by uniting the different revolutions from the two paths to one, the rotation of the carriers 630, 634 is increased to more than the rotational speed of the input shaft 612, which results in the overdrive state in which the rotation of the output shaft 626 is increased so as to be greater than that of the input shaft 612.

Figure 38:
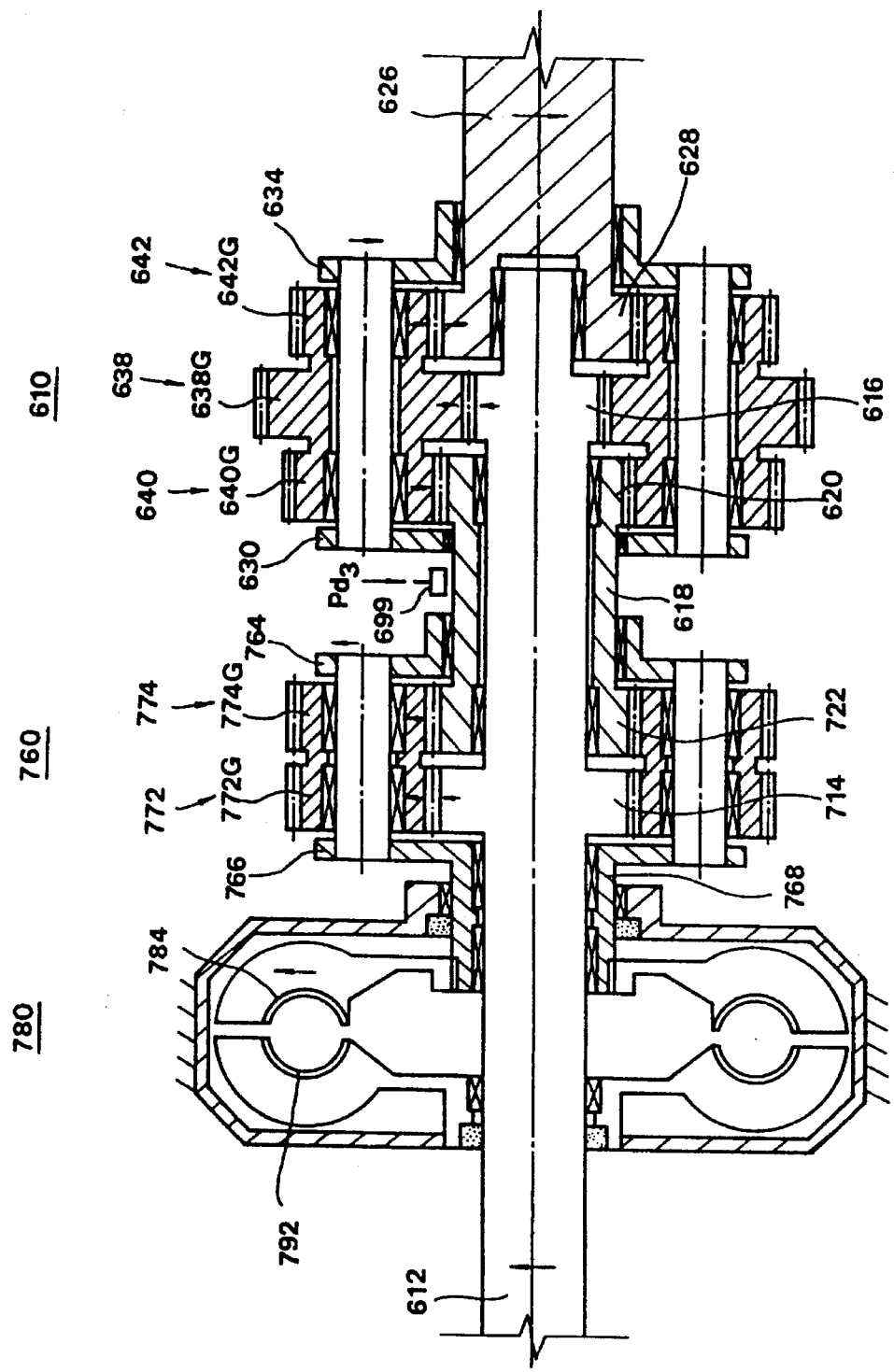

VI-4. Reverse Rotation State (FIG. 38)

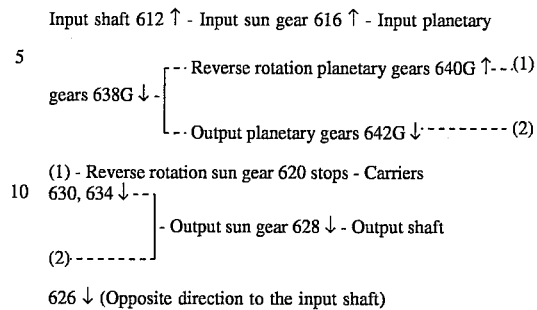

(1) - Reverse rotation sun gear 620 stops - Carriers 630, 634 ↓ ──┐
                                                                   ├ - Output sun gear 628 ↓ - Output shaft
(2) ──────────────────────────────────────────────────────────────┘
626 ↓ (Opposite direction to the input shaft)

This state is same as the reverse rotation state at FIG. 32 of the sixth embodiment, and therefore a description thereof is omitted. For reference, note that the carriers and each gear in the speed change controlling system 780 and the overdrive system 760 rotate in the same direction as that of the input shaft 612.

On the one hand, an appropriate adjustment of the numbers of teeth of the gears used in the present invention according to the desired purpose can obtain the required numbers of revolutions of the output shaft. For reference, Table 1 represents the number of teeth of each gear in the first embodiment, Table 2 represents the number of revolutions of the speed change system, e.g. the number of revolutions of the output ring gear per 1 revolution of the input shaft according to Table 1, and Table 3 represents the number of revolutions of each part in the operating state of Table 2. Likewise, Table 4 refers to the number of teeth of each gear in the third embodiment, and table 5 shows the number of revolutions of the output shaft (per 1 revolution of the input shaft) according to the number of teeth in Table 4. For convenience, each gear in the overdrive system represents only one example of the number of teeth. However, as appreciate by those skilled in the art the number of teeth can vary.

Table 6 represents the number of revolutions of each part (per 1 revolution of the input shaft) in the operating state of Table 5. In like manner, Table 7 represents the number of teeth of each gear in the sixth embodiment, and Table 8 represents the number of revolutions of the output shaft (per 1 revolution of the input shaft) according to Table 7. Likewise, Table 9 refers to the number of teeth of each gear in the seventh embodiment, and Table 10 shows the number of revolutions of the output shaft (per 1 revolution of the input shaft) according to Table 9.

TABLE 1

(First embodiment)

| | Speed change system (10) | | | | | | | Overdrive system (50) | | |
|---|---|---|---|---|---|---|---|---|---|---|
| | Input sun gear (14) | Input differ- ential gear (34) | Control differ- ential gear (36) | Output differ- ential gear (38) | Control sun gear (22) | Medium speed ring gear (44) | Output ring gear (46) | Over- drive sun gear (56) | Plane- tary gear (68) | Ter- minal ring gear (74) |
| 1 | 21 | 30 | 18 | 30 | 33 | 81 | 81 | 27 | 27 | 81 |
| 2 | 21 | 33 | 20 | 33 | 34 | 87 | 87 | 27 | 27 | 81 |

TABLE 1-continued (First embodiment)

| | Speed change system (10) | | | | | | | Overdrive system (50) | | |
| --- | --- | --- | --- | --- | --- | --- | --- | --- | --- | --- |
| | Input sun gear (14) | Input differential gear (34) | Control differential gear (36) | Output differential gear (38) | Control sun gear (22) | Medium speed ring gear (44) | Output ring gear (46) | Overdrive sun gear (56) | Planetary gear (68) | Terminal ring gear (74) |
| 3 | 24 | 36 | 21 | 36 | 39 | 96 | 96 | 27 | 27 | 81 |

TABLE 2

| | Low speed state (Carriers 26, 28 stop) | Medium speed state (Medium speed ring gear 44 stops) | Reverse rotation state (Control sun gear 22 stops) |
| --- | --- | --- | --- |
| 1 | 0.2593 | 0.412 | −0.198 |
| 2 | 0.24 | 0.39 | −0.21 |
| 3 | 0.25 | 0.4 | −0.17 |

*"−" indicates the opposite direction to the input shaft.

TABLE 3

| | Neutral State | | | Low speed state (Carriers 26, 28 stop) | | Medium speed state (Medium speed ring gear 44 stops) | | Reverse rotation state (Control sun gear 22 stops) | |
| --- | --- | --- | --- | --- | --- | --- | --- | --- | --- |
| | Carriers (26, 28) | Medium speed ring gear (44) | Control sun gear (22) | Medium speed ring gear (44) | Control sun gear (22) | Carriers (26, 28) | Control sun gear (22) | Carriers (26, 28) | Medium speed ring gear (41) |
| 1 | −0.35 | −0.7 | 0.165 | −0.2592 | 0.382 | 0.21 | 0.51 | −0.62 | −1.04 |
| 2 | −0.32 | −0.64 | 0.175 | −0.24 | 0.37 | 0.19 | 0.406 | −0.598 | −0.984 |
| 3 | −0.33 | −0.66 | 0.145 | −0.25 | 0.36 | 0.33 | 0.487 | −0.56 | −0.95 |

*"−" indicates the opposite direction to the input shaft
Indication about the high speed state is not made because the rotation ratio of the input shaft and output shaft is 1:1.

TABLE 4

(Third embodiment)

| | Input sun gear (314) | Input differential gear (340) | Control differential gear (344) | Medium speed differential gear (346) | Control sun gear (318) | Medium speed sun gear (322) | Output ring gear (352) | Link gear (358) | Overdrive gear (368) | Transmitting gear (370) | Output gear (378) |
| --- | --- | --- | --- | --- | --- | --- | --- | --- | --- | --- | --- |
| 1 | 20 | 30 | 20 | 30 | 30 | 20 | 80 | 30 | 24 | 27 | 27 |
| 2 | 21 | 33 | 21 | 34 | 33 | 20 | 87 | 30 | 24 | 27 | 27 |
| 3 | 25 | 35 | 25 | 39 | 35 | 21 | 95 | 30 | 24 | 27 | 27 |

TABLE 5

| | Low speed state (Control sun gear 318 stops) | | Medium speed state (Medium speed sun gear 322 stops) | | Reverse rotation state (Carriers 332, 334 stop) | |
|---|---|---|---|---|---|---|
| | Rotation of output ring gear 352 | Rotation of output shaft 376 | Ratation of output ring gear 352 | Rotation of output shaft 376 | Rotation of output ring gear 352 | Rotation of output shaft 376 |
| 1 | 0.25 | 0.31 | 0.5 | 0.63 | −0.25 | −0.31 |
| 2 | 0.241 | 0.30 | 0.54 | 0.68 | −0.241 | −0.30 |
| 3 | 0.263 | 0.33 | 0.56 | 0.7 | −0.263 | −0.33 |

*The rotation of the output ring gear 352 is the output roetation of the speed change system 310.
* When the rotation of the speed change system 310 is overdrived in the overdrive system 360, the rotation of the final output shaft 376 is obtained.

TABLE 6

| | Neutral state | | | Low speed state | | Medium speed state | | Reverse rotation state | |
|---|---|---|---|---|---|---|---|---|---|
| | Carriers (332,334) | Control sun gear (318) | Medium speed sun gear (322) | Carriers (332,334) | Medium speed sun gear (322) | Carriers (332,334) | Control sun gear (318) | Control sun gear (318) | Medium speed sun gear (322) |
| 1 | 0.2 | −0.33 | −1 | 0.4 | −0.5 | 0.6 | 0.33 | −0.66 | −1.5 |
| 2 | 0.194 | −0.32 | −1.175 | 0.389 | −0.6 | 0.63 | 0.39 | −0.64 | −1.7 |
| 3 | 0.208 | −0.357 | −1.262 | 0.416 | −0.66 | 0.65 | 0.4 | −0.714 | −1.857 |

TABLE 7

(Sixth embodiment)

| | Overdrive system (660) | | | Speed change system (610) | | | | | |
|---|---|---|---|---|---|---|---|---|---|
| | Overdrive planetary gear (666) | Control ring gear (622) | Control sun gear (670) | Input sun gear (616) | Input planetary gear (638) | Reverse rotation planetary gear (640) | Reverse rotation sun gear (620) | Output planetary gear (642) | Output sun gear (628) |
| 1 | 27 | 81 | 27 | 24 | 36 | 26 | 34 | 18 | 42 |
| 2 | 25 | 80 | 30 | 25 | 35 | 24 | 36 | 20 | 40 |
| 3 | 30 | 84 | 24 | 21 | 29 | 21 | 29 | 18 | 32 |

TABLE 8

(Fixed speed Change ratio)

| | Low speed state Carriers 630, 634 of the speed change system 610 stop | Overdrive state Control shaft 668 of the overdrive system 660 stops | Reverse rotation state Speed change shaft 618 of the speed change system 610 stops |
|---|---|---|---|
| 1 | 0.285 → | 1.485 | −0.457 |
| 2 | 0.357 → | 1.460 | −0.227 |
| 3 | 0.407 → | 1.356 | −0.246 |

TABLE 9

(Seventh embodiment)

| Overdrive system (760) | | | Speed change system (610) | | | | | | |
|---|---|---|---|---|---|---|---|---|---|
| Overdrive sun | Overdrive Planetary | Control planetary | Control sun | Input sun | Input planetary | Reverse rotation planetary | Reverse rotation sun | Output planetary | Output sun |

| | gear (714) | gear (772) | gear (774) | gear (722) | gear (616) | gear (638) | gear (640) | gear (620) | gear (642) | gear (628) |
|---|---|---|---|---|---|---|---|---|---|---|
| 1 | 34 | 26 | 30 | 30 | 21 | 32 | 22 | 31 | 18 | 35 |
| 2 | 33 | 24 | 27 | 30 | 24 | 30 | 21 | 33 | 18 | 36 |
| 3 | 35 | 25 | 31 | 29 | 24 | 34 | 24 | 34 | 20 | 38 |

TABLE 10

(Fixed speed change ratio)

| | Low speed state Carriers 630, 634 of the speed change system 610 stop | Overdrive state Carriers 764, 766 of the overdrive system 760 stop | Reverse rotation state Speed change shaft 618 of the speed change system 610 stop |
|---|---|---|---|
| 1 | 0.3137→ | 1.381 | −0.24 |
| 2 | 0.4 → | 1.290 | −0.22 |
| 3 | 0.49 → | 1.621 | −0.25 |

As described above, the advantages of the present invention include a stepless automatic variable transmission of a simple construction which can be operated in a stepless automatic speed change method which can transmit the power to the output shaft with an optimum speed change ratio by obtaining an equilibrium of the driving force and the load before a change of the load exerted on the output shaft gives an influence on the input shaft under a condition in which all the gears are in a constant state of engagement without the need for changing gears by disengaging and engaging the gears when the power of the engine is to be changed in its speed and output to the output shaft via an input shaft. In the other method the fixed speed change ratios are continuously modified such that a maximum engine braking effect is obtained and transmits it to the output shaft when running in a mountainous area or on an icy road or when a rapid starting is required, or by combining the two methods.

It is obvious that the stepless automatic variable transmission of the present invention is not limited to the present embodiments; but can be applied to all the apparatuses which can change a speed of a driving force and output it to the output shaft in all the vehicles and industrial machines based on the purpose of the present invention, and that various revisions and alterations can be made in the scope of the present invention.

For example, it is described that in the first and second embodiments an apparatus constructed by combining the speed change controlling system 80, 180 and the overdrive system 50 is connected to the speed change control shaft 20 of the speed change system 10, 110 and is also connected to the output ring gear 46 to overdrive. It is described that in the third and fourth embodiments an apparatus constructed by combining the speed change controlling system 380 and the overdrive system 360 is connected to the control shaft 316 of the speed change system 310, 410 and is also connected to the output ring gear 352 to overdrive, and likewise it is also described that in the sixth and the seventh embodiments an apparatus constructed by combining the speed change controlling system 680, 780 and the overdrive system 660, 760 is connected to the speed change shaft 618 of the speed change system 610, however, it is of course that the present invention is not limited to the above embodiments, and the same function can be performed even when the above described combination apparatus is connected to various transmissions (stepless automatic variable transmissions previously filed by the present applicant).

In addition, same function can be performed even when the number and the positions of teeth of the control sun gear 318 and the medium speed sun gear 322 in the third embodiment are changed and the medium speed control shaft 320 is connected to the speed change controlling system 380, and same function can be performed even when the speed change controlling system 680 of the sixth embodiment and the speed change controlling system 780 of the seventh embodiment are changed to each other.

Furthermore, a simple pressurized brake lining braking method is used as a method for applying a frictional brake force with a brake means in the embodiments of the present invention, however, the construction, embodying method and installation position of such apparatus can be varied in various ways, and a variety of circuit constructions for automatic control utilizing an electric, electromagnetic brake and hydraulic and pneumatic pressure can be used for such apparatus, and this does not limit the scope of the present invention.

And the speed change controlling system which is an apparatus using a fluid for speed change control is used in the embodiments of the present invention, however, the construction, embodying method and installation position of such apparatus can be varied in various ways, and a fluid coupling, variable motor, powder clutch, powder coupling, electric and electromagnetic clutch, etc. can be used for such apparatus, and this does not limit the scope of the present invention.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention. The reference numerals in the claims are used to more clearly illustrate the invention when considered with the figures and are not intended to limit the scope of the claims or imply that the scope of the claims is limited to the exact means so referred to by the respective numeral.

What is claimed is:

1. A speed change system 610 comprising:
   an input shaft 612 with a first section 612A, a second section 612B and a terminal section 612C for receiving rotational input with an input sun gear 616 integrally formed between said second section 612B and said terminal section 612C of said input shaft to enable simultaneous rotation with said input shaft:
   a speed change shaft 618 with a first end 618A' and a second end 618A rotatably and coaxially mounted on said input shaft 612 and having a reverse rotation sun gear 620 integrally formed at said first end 618A';

an output shaft 626 having a first end 626A with an output sun gear 628 integrally formed thereat and with said first end of said output shaft being rotatably and coaxially mounted on said terminal section 612C of said input shaft to enable independent rotation about said input shaft;

a carrier 630 rotatably and coaxially mounted on said speed change shaft 618 to enable independent rotation about said speed change shaft 618;

a carrier 634 rotatably and coaxially mounted on said output shaft 626 to enable independent rotation about said output shaft 626;

a plurality of locking pins 636 with each locking pin 636P secured to and interlinking said carriers 630, 634 to enable simultaneous rotation of said carriers 630, 634;

a plurality of input planetary gears 638 with each said input planetary gear 638G being rotatably mounted on each said locking pin 636P and being meshed with said input sun gear 616;

a plurality of reverse rotation planetary gears 640 with each said reverse rotation planetary gear 640G being rotatably mounted on each said locking pin 636P and being meshed with said reverse rotation sun gear 620;

a plurality of output planetary gears 642 with each said output planetary gear 642G being rotatably mounted on each said locking pin 636P and being meshed with said output sun gear 628;

said input planetary gear 638G, said reverse rotation planetary gear 640G and said output planetary gear 642G being integrally formed to enable simultaneous rotation about each respective said locking pin 636P;

a forward rotation brake means 659 for applying a braking force to said carriers 630, 634; and a reverse rotation brake means 699 for applying a braking force to said speed change shaft 618.

2. The speed change system of claim 1 further comprising an overdrive system for increasing rotational output of said output shaft.

3. The speech change system of claim 2, wherein said overdrive system comprises:

an input carrier 614 integrally formed proximate second section 612B of said input shaft 612 to enable simultaneous rotation with said input shaft 612;

a control shaft 668 having a first end 668A and a second end 668A' with a control sun gear 670 integrally formed at said first end 668A and being rotatably and coaxially mounted on said input shaft;

a carrier 662 rotatably and coaxially mounted on said control shaft 668 to enable independent rotation about said control shaft 668;

a plurality of locking pins 664 with each said locking pin 664P secured to and interlinking said carriers 614, 662 to enable simultaneous rotation of said carriers 614, 662 with said input shaft 612;

a plurality of overdrive planetary gears 666 with each said overdrive planetary gear 666G being rotatably mounted on each said locking pin 664P and being meshed with said control sun gear 670;

a control ring gear 622 integrally formed at said second end 618A of said speed change shaft 618' and being meshed with each said overdrive planetary gear 666G; and an overdrive brake means 679 for applying a braking force to said control shaft 668.

4. The speed change system of claim 2 further including a speed change controlling system for adjusting the speed change to correspond to the load exerted on said output shaft 626 to define a stepless automatic variable transmission.

5. The speed change system of claim 4, wherein said speed change controlling system comprises:

a control blade member 684 secured to said second end 668A' of said control shaft 668 to enable simultaneous rotation with said control shaft and having a plurality of control blades 686 positioned thereon with each said control blade 686B extending radially from said control blade member;

a housing 692 rotatably secured to said input shaft 612 and to said control shaft 668 to operatively enclose said plurality of control blades 686 to prevent unintended fluid loss therefrom;

said housing further including an internal surface 693 spaced apart from said plurality of radially extending control blades with a plurality of resistance plates 690 secured to said internal surface of said housing such that each said resistance plate 690P is positioned proximate the control blades 686 and being secured against rotation; and a fluid inlet 696 and a fluid outlet 698 for controlling, in use, the amount of fluid in said housing.

6. An overdrive system for increasing rotational output for use with a speed change system, comprising:

an input shaft 612 for receiving rotational input with an input carrier 614 integrally formed thereon to enable simultaneous rotation with said input shaft;

a control shaft 668 having a first end 668A and a second end 668A' with a control sun gear 670 integrally formed at said first end 668A and being rotatably and coaxially mounted on said input shaft;

a carrier 662 rotatably and coaxially mounted on said control shaft 668 to enable independent rotation about said control shaft 668;

a plurality of locking pins 664 with each said locking pin 664P secured to and interlinking said carriers 614, 662 to enable simultaneous rotation of said carriers 614, 662 with said input shaft 612;

a plurality of overdrive planetary gears 666 with each said overdrive planetary gear 666G being rotatably mounted on each said locking pin 664P and being meshed with said control sun gear 670;

a speed change shaft 618 rotatably mounted on said second section 612B of said input shaft for receiving rotational input from a speed change system;

a control ring gear 622 integrally formed with said speed change shaft 618 and being meshed with each said overdrive planetary gear 666G; and an overdrive brake means 679 for applying a braking force to said control shaft 668.

7. The overdrive system for increasing rotational output for use with a speed change system of claim 6 further comprising a speed change controlling system for adjusting the speed change to correspond to the load exerted on said output shaft to define a stepless automatic variable transmission.

8. The overdrive system for increasing rotational output for use with a speed change system of claim 7, wherein said speed change controlling system comprises:

a control blade member 684 secured to said second end 668A' of said control shaft 668 to enable simultaneous rotation with said control shaft and having a plurality of control blades 686 positioned thereon with each said control blade 686B extending radially from said control blade member;

a housing 692 rotatably secured to said input shaft 612 and to said control shaft 668 to operatively enclose said plurality of control blades 686 to prevent unintended fluid loss therefrom;

said housing further including an internal surface 693 spaced apart from said plurality of radially extending control blades with a plurality of resistance plates 690 secured to said internal surface of said housing such that said resistent plates 690P are positioned proximate the control blades 686 and being secured against rotations; and a fluid inlet 696 and a fluid outlet 698 for controlling, in use, the amount of fluid in said housing.

9. The overdrive system for increasing rotational output for use with a speed change system of claim 7, wherein said speed change controlling system includes a control plate 782 integrally combined at an end 668A' of said control shaft 668 and being provided with a plurality of control blades 784;

a housing 794 with one side mounted on said first section 612A in order that said first section rotatably passes through a central portion of said side and the other side mounted on said control shaft 668 in order that said control shaft rotatably passes through a central portion of said other side, and being secured by an external fixing means;

a resistance plate 790 being opposite to said control plate 782 at a predetermined interval, being fixedly secured to said housing 794, and being provided with a plurality of resistance blades 792;

fluid seals 794A, 794A' for preventing the leakage of the fluid in said housing 794; and a fluid inlet 796 and a fluid outlet 798 for controlling the quantity of the fluid in said housing.

* * * * *

UNITED STATES PATENT AND TRADEMARK OFFICE
CERTIFICATE OF CORRECTION

PATENT NO. : 5,484,349

DATED : January 16, 1996

INVENTOR(S) : Ra et al.

It is certified that error appears in the above-identified patent and that said Letters Patent is hereby corrected as shown below:

ON THE TITLE PAGE:

Item 75, line Inventors, insert --Do-- after the word "Kyungki"

Item 75, line Inventors, insert --City-- after the word "Incheon"

Column 3, line 60, "speed:" should read --speed--

Column 4, line 46, insert --a-- after the word "utilizes"

Column 5, line 6, insert --a-- after the word "in"

Column 5, line 24, "brake:" should read --brake--

Column 8, line 27, "Fig." should read --Figs.--

Column 18, line 26, "Carriers 26,28↓,0" should read --Carriers 26,28↓.0"--

Column 20, line 60, "tile" should read --the--

Column 22, line 8, "136" should read --186--

Column 24, line 61, "impellets" should read --impellers--

Column 30, line 44, insert "A," after the word "direction"

Column 30, line 63, insert "B" after the word "direction"

Column 38, line 32, insert "B" after the word "direction"

Column 33, line 36 "344G↓" should read --344G↑--

Column 34, line 50, insert --510-- after the word "SYSTEM"

UNITED STATES PATENT AND TRADEMARK OFFICE
CERTIFICATE OF CORRECTION

PATENT NO. : 5,484,349

DATED : January 16, 1996

INVENTOR(S) : Ra et al.

It is certified that error appears in the above-identified patent and that said Letters Patent is hereby corrected as shown below:

Column 35, line 15, "en" should read --on--

Column 37, line 26, "shat" should read --"shaft"--

Column 38, line 56, "618A" should read --618--

Column 38, line 59, "and" should read --end--

Column 44, lines 24 and 27, "38G" should read --638G--

Column 45, line 67, insert --699-- after the word --means--

Column 46, line 7, "628" should read --638--

Column 46, line 52, "System" should read --system--

Column 46, line 59, "it" should read --in--

Column 51, line 21, "glow" should read --slow--

Column 51, line 22, "In" starts a new paragraph

Column 52, line 6, "640G↑" should read --640G↓--

Column 53, line 23 "0.2592" should read --0.2593--

Column 54 line 11, "0.406" should read --0.496--

Column 55, heading 6, "Ratation" should read --Rotation--

Column 56, heading 6, "Ratation" should read --Rotation--

UNITED STATES PATENT AND TRADEMARK OFFICE
CERTIFICATE OF CORRECTION

PATENT NO. : 5,484,349

DATED : January 16, 1996

INVENTOR(S) : Ra et al.

It is certified that error appears in the above-identified patent and that said Letters Patent is hereby corrected as shown below:

Note 56, line 1, "roetation" should read --rotation--

Column 57, column 15 "0.3137→" should read --0.337→--

Column 57, column 39, delete ";" after the word "embodiments"

Column 59, line 43, "speech" should read --speed--

Column 59, line 65, "618'" should read --618--

Signed and Sealed this

Twenty-ninth Day of October 1996

Attest:

BRUCE LEHMAN

*Attesting Officer*   *Commissioner of Patents and Trademarks*